United States Patent
Sampemane et al.

(10) Patent No.: US 10,296,732 B1
(45) Date of Patent: May 21, 2019

(54) COMPUTER SOFTWARE PRODUCT GRANT MANAGEMENT SYSTEM

(71) Applicant: INTUIT INC., Mountain View, CA (US)

(72) Inventors: Leena Sampemane, Foster City, CA (US); Michael A. Meagher, Cary, NC (US); Lise Caron, Pickering (CA); Almira H. Niciu-Chiuaru, San Diego, CA (US); David Kemme, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 131 days.

(21) Appl. No.: 15/364,826

(22) Filed: Nov. 30, 2016

(51) Int. Cl.
  *G06F 21/32* (2013.01)
  *G06F 21/31* (2013.01)
  *G06Q 40/00* (2012.01)
  *G06Q 30/04* (2012.01)

(52) U.S. Cl.
  CPC ............. *G06F 21/31* (2013.01); *G06Q 30/04* (2013.01); *G06Q 40/12* (2013.12)

(58) Field of Classification Search
  CPC ......... G06F 21/31; G06Q 30/04; G06Q 40/12
  See application file for complete search history.

(56) References Cited

U.S. PATENT DOCUMENTS

| | | | |
|---|---|---|---|
| 6,252,964 B1 * | 6/2001 | Wasilewski | H04L 63/04 348/E5.004 |
| 6,292,568 B1 * | 9/2001 | Akins, III | H04L 63/0428 348/E5.004 |
| 7,636,742 B1 * | 12/2009 | Olavarrieta | G06F 17/30395 |
| 8,364,951 B2 * | 1/2013 | Peterka | H04L 63/062 380/279 |
| 2003/0065597 A1 * | 4/2003 | Smith | G06Q 30/02 705/36 R |
| 2004/0186809 A1 * | 9/2004 | Schlesinger | G06F 21/6218 705/50 |
| 2005/0131833 A1 * | 6/2005 | Martinelli | G06Q 20/367 705/59 |
| 2006/0041930 A1 * | 2/2006 | Hafeman | G06F 21/6245 726/2 |
| 2009/0150981 A1 * | 6/2009 | Amies | H04L 63/102 726/5 |

(Continued)

*Primary Examiner* — Robert B Leung
*Assistant Examiner* — Thomas Ho
(74) *Attorney, Agent, or Firm* — DLA Piper LLP US

(57) ABSTRACT

Runtime computer software product management system including a computer database, an access control system and a composite model including an integrated entitlement-service state model with first state data specifying access to a subscription of a computer software product of a host and second state data specifying permissible actions involving the subscription based at least in part upon the first state data. The access control system is in communication with the computer database and generates grants for an accountant and client based on the entitlement-service state model and receives a request from the computer software product for the client to access the product. The access control system determines a grant status based at least in part upon the first grant status and the second grant status and responds to the request with the determined grant status which governs client access to the computer software product.

23 Claims, 71 Drawing Sheets

(56) References Cited

U.S. PATENT DOCUMENTS

| | | | |
|---|---|---|---|
| 2010/0131973 A1* | 5/2010 | Dillon | G06F 21/10 725/27 |
| 2014/0053277 A1* | 2/2014 | Biswas | G06F 21/10 726/27 |
| 2014/0089201 A1* | 3/2014 | Jakulin | G06Q 20/1235 705/64 |
| 2015/0135333 A1* | 5/2015 | Biswas | G06F 21/12 726/28 |

* cited by examiner

FIG. 4B

PRODUCT

PRODUCT_ID(PK)
CODE(Unique)
NAME
DESCRIPTION
GRANT_OFFERING_TYPE (eg: Intuit.sbe.salsa.default)
BILLING_SERVICE_TYPE (eg: /service/intuit/qbo)
ITEM_CLASSIFICATION (software, SaaS, collateral...)
TAX_CLASSIFICATION
DATA_RETENTION_RULE (placeholder)
TRIAL_LOCK_OUT_RULE (placeholder)

FIG. 6A

Products

| PRODUCT_ID | CODE | NAME | DESCRIPTION | GRANT_OFFERING_TYPE | BRM_SERVICE_TYPE | ITEM_CLASSIFICATION | TAX_CLASSIFICATION |
|---|---|---|---|---|---|---|---|
| 01-01 | QBO | QuickBooks Online | QuickBooks Online | Intuit.sbe.salsa.default | /service/intuit/qbo | SaaS | ASPB |

FIG. 6B

Feature Sets & Features

QBO Essentials

*Feature Set*

| FEATURE_SET_ID | PRODUCT_ID | CODE | NAME | DESCRIPTION | STATUS |
|---|---|---|---|---|---|
| 02-01 | 01-01 | QBO_ESSENTIALS | QBO Essentials | QuickBooks Online Essentials | Active |

504 →

*Feature*

| FEATURE_SET_ID | ATTRIBUTE_TYPE | ATTRIBUTE_CODE | ATTRIBUTE_NAME | LIMIT_UNIT_VALUE | LIMIT_UPGRADE_RULE | LIMIT_EXPIRE_PERIOD | LIMIT_EXPIRE_DATE |
|---|---|---|---|---|---|---|---|
| 02-01 | Feature Set | ESSENTIALS | Essentials | | | | |

QBO Plus

*Feature Set*

| FEATURE_SET_ID | PRODUCT_ID | CODE | NAME | DESCRIPTION | STATUS |
|---|---|---|---|---|---|
| 02-02 | 01-01 | QBO_PLUS | QBO Plus | QuickBooks Online Plus | Active |

504 →

*Feature*

| FEATURE_SET_ID | ATTRIBUTE_TYPE | ATTRIBUTE_CODE | ATTRIBUTE_NAME | LIMIT_UNIT_VALUE | LIMIT_UPGRADE_RULE | LIMIT_EXPIRE_PERIOD | LIMIT_EXPIRE_DATE |
|---|---|---|---|---|---|---|---|
| 02-02 | Feature Set | PLUS | Plus | | | | |

| CHARGE |
|---|
| CHARGE_ID(PK)<br>PRODUCT_ID(FK)<br>FEATURE_SET_ID(FK)<br>NAME<br>DESCRIPTION<br>STATUS (new, pending approval, active, inactive)<br>CHARGE_TYPE (usage, recurring, one-time, trial-no charge)<br>CHARGE_FREQUENCY (monthly, annually...)<br>REVENUE_GL_ACCT_CODE |

| CHARGE_ATTRIBUTES |
|---|
| CHARGE_ATTRIBUTES_ID(PK)<br>CHARGE_ID(FK)<br>REGION<br>CURRENCY<br>SALES CHANNEL<br>CUSTOMER SEGMENT<br>LIST PRICE<br>FAIR_VALUE_BASIS<br>FAIR_VALUE_METHOD<br>STRATIFICATION_SET<br>FAIR_VALUE_LOW<br>FAIR_VALUE_MED<br>FAIR_VALUE_HIGH |

QuickBooks Essentials ROW USD Monthly Trial

| CHARGE_ID | PRODUCT_ID | FEATURE_SET_ID | NAME (Used for on correspondence) | DESCRIPTION | CHARGE_TYPE | CHARGE_FREQUENCY | STATUS |
|---|---|---|---|---|---|---|---|
| 03-02 | 01-01 | 02-01 | QuickBooks Online Essentials | QuickBooks Essentials ROW USD Monthly Trial | Trial- No Charge | Monthly | Active |

*Charge Attributes*

| CHARGE_ATTRIBUTES_ID | CHARGE_ID | REGION | CURRENCY | CUSTOMER_SEGMENT | SALES_CHANNEL |
|---|---|---|---|---|---|
| 031-02 | 03-02 | ROW | * | Default | * |

Note - To allow for the trial charge to be re-usable across currencies, currency is set to *.

FIG. 8D

QuickBooks Plus ROW USD Monthly

| CHARGE_OFFER_ID | PRODUCT_ID | FEATURE_SET_ID | REGION | CURRENCY | NAME (Used for on correspondence) | DESCRIPTION | CHARGE_TYPE | CHARGE_FREQUENCY | STATUS |
|---|---|---|---|---|---|---|---|---|---|
| 03-03 | 01-01 | 02-02 | ROW | USD | QuickBooks Online Plus | QuickBooks Plus ROW USD Monthly | Recurring | Monthly | Active |

*Charge Attributes*

| CHARGE_ATTRIBUTES_ID | CHARGE_ID | REGION | CURRENCY | CUSTOMER_SEGMENT | SALES_CHANNEL |
|---|---|---|---|---|---|
| 031-03 | 03-03 | ROW | USD | * | * |

FIG. 8E

QuickBooks Plus ROW USD Monthly Trial

| CHARGE_ID | PRODUCT_ID | FEATURE_SET_ID | NAME (Used for on correspondence) | DESCRIPTION | CHARGE_TYPE | CHARGE_FREQUENCY | STATUS |
|---|---|---|---|---|---|---|---|
| 03-04 | 01-01 | 02-02 | QuickBooks Online Plus | QuickBooks Plus ROW USD Monthly Trial | Trial - No Charge | Monthly | Active |

*Charge Attributes*

| CHARGE_ATTRIBUTES_ID | CHARGE_ID | REGION | CURRENCY | CUSTOMER_SEGMENT | SALES_CHANNEL |
|---|---|---|---|---|---|
| 031-04 | 03-04 | ROW | USD | * | * |

FIG. 8F

DISCOUNT

DISCOUNT_ID(PK)
PRODUCT_ID(FK)
NAME
DESCRIPTION
STATUS(new, pending approval, active, inactive)
DISCOUNT_TYPE (usage, recurring, one-time)
DISCOUNT_FREQUENCY (monthly, annually...)
DISCOUNT_VALUE_TYPE (percent or amount)
DISCOUNT_VALUE

Discounts

| DISCOUNT_ID | PRODUCT_ID | NAME | DESCRIPTION | STATUS | DISCOUNT_TYPE | DISCOUNT_FREQUENCY |
|---|---|---|---|---|---|---|
| 04-01 | 01-01 | 30 Percent Discount | 30 Percent Discount | Active | Recurring | Monthly |
| 04-02 | 01-01 | 40 Percent Discount | 40 Percent Discount | Active | Recurring | Monthly |

```
┌─────────────────────────────────────────────────┐
│ PACKAGE                                         │
├─────────────────────────────────────────────────┤
│ PACKAGE_ID(PK)                                  │
│ PRODUCT_ID(FK)                                  │
│ NAME                                            │
│ DESCRIPTION                                     │
│ MANUAL_DISCOUNT_PACKAGE (Y,N)                   │
│ PRODUCT_LINE                                    │
│ SUB_PRODUCT_LINE                                │
│ STATUS(new, pending approval, active, inactive) │
└─────────────────────────────────────────────────┘
```
⎱ 514

FIG. 10A

```
┌──────────────────────────────────────────────────┐
│ PACKAGE_COMPONENT                                │
├──────────────────────────────────────────────────┤
│ PACKAGE_COMPONENT_ID(PK)                         │
│ PACKAGE_ID(FK) |package|                         │
│ COMPONENT_TYPE (Feature Set or                   │
│ Charge or Discount)                              │
│ COMPONENT_ID(FK) (feature_set_id or charge_id    │
│ or discount_id - for non-manual discount package │
│ must be at least one charge offer or feature set)│
│                                                  │
│ For charges and discounts:                       │
│ RELATIVE_START_UNIT (relative from purchase.     │
│ Null for 'Immediate or 'Month').                 │
│ RELATIVE_START_QTY (1, 2, etc.)                  │
│ RELATIVE_END_UNIT (relative from purchase.       │
│ Null for 'Never' or 'Month')                     │
│ RELATIVE_END_QTY(1, 2 etc.)                      │
└──────────────────────────────────────────────────┘
```
⎱ 516

FIG. 10B

Packages

QBO Essentials ROW USD Monthly Base

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-01 | 01-01 | QBO Essentials ROW USD Monthly Base | QuickBooks Essentials ROW USD Monthly Base | QBO | Essentials | Active |

← 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-01 | 05-01 | CHARGE | 03-01 | IMMEDIATE | | NEVER | |
| 051-02 | 05-01 | FEATURE_SET | 02-01 | IMMEDIATE | | NEVER | |

QBO Essentials ROW USD Monthly Trial Buy Now - 30 Percent Off For 12 Months

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-03 | 01-01 | QBO Essentials ROW USD Monthly Buy Now - 30 Percent for 12 Months | QuickBooks Essentials ROW USD Monthly Buy Now - 30 Percent Off For 12 Months | QBO | Essentials | Active |

← 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-07 | 05-03 | CHARGE | 03-01 | IMMEDIATE | | MONTH | |
| 051-08 | 05-03 | FEATURE_SET | 02-01 | IMMEDIATE | | NEVER | |
| 051-09 | 05-03 | DISCOUNT | 04-01 | IMMEDIATE | | NEVER | 12 |

QBO Plus ROW USD Monthly Base

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-04 | 01-01 | QBO Plus ROW USD Monthly Base | QuickBooks Plus ROW USD Monthly Base | QBO | Plus | Active |

↙ 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-10 | 05-04 | CHARGE | 03-03 | IMMEDIATE | | NEVER | |
| 051-11 | 05-04 | FEATURE_SET | 02-02 | IMMEDIATE | | NEVER | |

QBO Plus ROW USD Monthly Trial For One Month

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-05 | 01-01 | QBO Plus ROW USD Monthly Trial For One Month | QuickBooks Plus ROW USD Monthly Trial For One Month | QBO | Plus | Active |

← 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-12 | 05-05 | CHARGE | 03-04 | IMMEDIATE | | MONTH | 1 |
| 051-13 | 05-05 | FEATURE_SET | 02-02 | IMMEDIATE | | MONTH | 1 |
| 051-14 | 05-05 | CHARGE | 03-03 | MONTH | 1 | NEVER | |
| 051-15 | 05-05 | FEATURE_SET | 02-02 | MONTH | 1 | NEVER | |

QBO Plus ROW USD Monthly Buy Now - 40 Percent Off For 12 Months

*Package*

| PACKAGE_ID | PRODUCT_ID | NAME | DESCRIPTION | PRODUCT_LINE | SUB_PRODUCT_LINE | STATUS |
|---|---|---|---|---|---|---|
| 05-06 | 01-01 | QBO Plus ROW USD Monthly Buy Now - 40% Off For 12 Months | QuickBooks Plus ROW USD Monthly - 40% Off For 12 Months | QBO | Plus | Active |

← 514

*Package Component*

| PACKAGE_COMP-ONENT_ID | PACKAGE_ID | COMPONENT_TYPE | COMPONENT_ID | RELATIVE_START_UNIT | RELATIVE_START_QTY | RELATIVE_END_UNIT | RELATIVE_END_QTY |
|---|---|---|---|---|---|---|---|
| 051-15 | 05-06 | CHARGE | 03-03 | MONTH | IMMEDIATE | NEVER | |
| 051-16 | 05-06 | FEATURE_SET | 02-02 | MONTH | IMMEDIATE | NEVER | |
| 051-17 | 05-06 | DISCOUNT | 04-02 | MONTH | IMMEDIATE | MONTH | 12 |

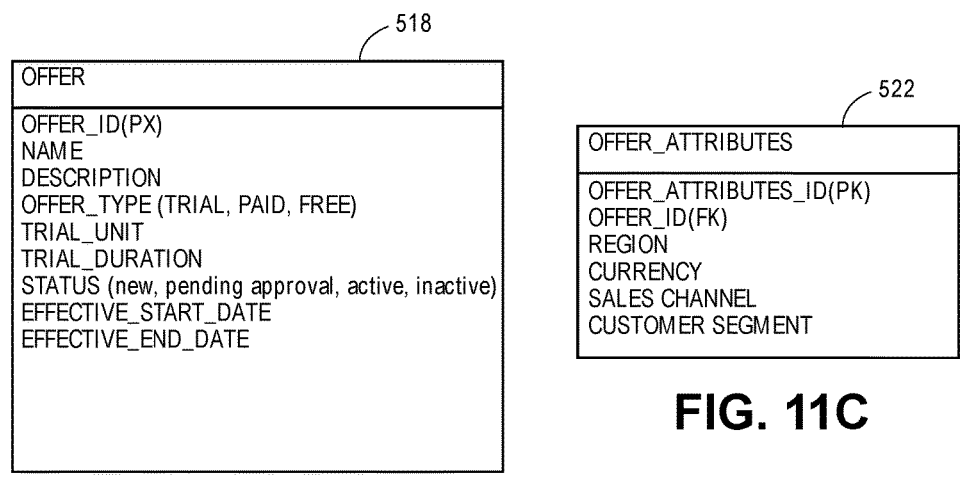
FIG. 11A
FIG. 11C
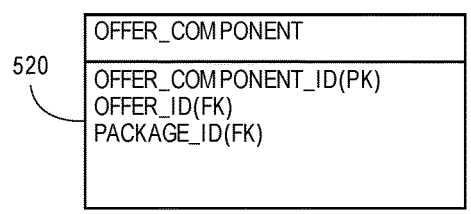
FIG. 11B
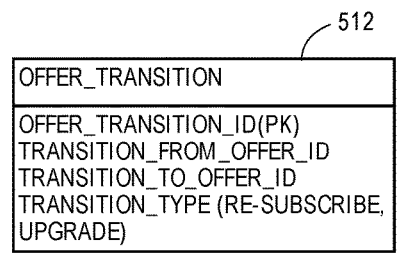
FIG. 11D

QBO Essentials ROW USD Monthly Trial (1 Month) Offer

Offer

| OFFER_ID | OFFER_TYPE | NAME | DESCRIPTION | TRIAL_UNIT | TRIAL_DURATION | STATUS | START_EFFECTIVITY_DATE | END_EFFECTIVITY_DA |
|---|---|---|---|---|---|---|---|---|
| 06-02 | TRIAL | QBO Essentials ROW USD Monthly Trial For One Month Offer | QuickBooks Essentials ROW USD Monthly Trial For One Month Offer | Month | 1 | Active | 10-01-2014 | |

← 518

Offer Component

| OFFER_COMPONENT_ID | OFFER_ID | PACKAGE_ID |
|---|---|---|
| 061-02 | 05-02 | 05-02 |

← 520

Offer Attributes

| OFFER_ATTRIBUTE_ID | OFFER_ID | REGION | CURRENCY | CUSTOMER_SEGMENT | SALES_CHANNEL |
|---|---|---|---|---|---|
| 062-02 | 06-02 | ROW | USD | Default | Direct |

← 522

Offer Transition

| OFFER_TRANSITION_ID | TRANSITION_FROM_OFFER_ID | TRANSITION_TYPE | TRANSITION_TO_OFFER_ID |
|---|---|---|---|
| 063-03 | 06-02 | RE-SUBSCRIBE | 06-01 |
| 063-04 | 06-02 | UPGRADE | 06-05 (Applicable only when customer is in trial period) |
| 063-05 | 06-02 | UPGRADE | 06-04 (Applicable only when customer is not in trial period) |

QBO Essentials ROW USD Monthly Buy Now Offer - With 30 Percent Off For 12 Months

Offer

| OFFER_ID | OFFER_TYPE | NAME | DESCRIPTION | TRIAL_UNIT | TRIAL_DURATION | STATUS | START_EFFECTIVITY_DATE | END_EFFECTIVITY_DA |
|---|---|---|---|---|---|---|---|---|
| 06-03 | PAID | QBO Essentials ROW USD Buy Now Offer - With 30 Percent Off For 12 Months | QuickBooks Essentials ROW USD Monthly Buy Now Offer - With 30 Percent Off For 12 Months | | | Active | 10-01-2014 | |

518 →

Offer Component

| OFFER_COMPONENT_ID | OFFER_ID | PACKAGE_ID |
|---|---|---|
| 061-03 | 05-03 | 05-03 |

520 →

Offer Attributes

| OFFER_ATTRIBUTE_ID | OFFER_ID | REGION | CURRENCY | CUSTOMER_SEGMENT | SALES_CHANNEL |
|---|---|---|---|---|---|
| 062-03 | 06-03 | ROW | USD | * | * |

522 →

Offer Transition

| OFFER_TRANSITION_ID | TRANSITION_FROM_OFFER_ID | TRANSITION_TYPE | TRANSITION_TO_OFFER_ID |
|---|---|---|---|
| 063-06 | 06-03 | RE-SUBSCRIBE | 06-01 |

QBO Plus ROW USD Monthly Trial (1 Month Offer)

Offer

| OFFER_ID | OFFER_TYPE | NAME | DESCRIPTION | TRIAL_UNIT | TRIAL_DURATION | STATUS | START_EFFECTIVITY_DATE | END_EFFECTIVITY_DA |
|---|---|---|---|---|---|---|---|---|
| 06-05 | PAID | QBO Plus ROW USD Monthly Trial Offer (1 Month) | QuickBooks Plus ROW USD Monthly Trial (1 Month) Offer | Month | 1 | Active | 10-01-2014 | |

← 518

Offer Component

| OFFER_COMPONENT_ID | OFFER_ID | PACKAGE_ID |
|---|---|---|
| 061-05 | 05-05 | 05-05 |

← 520

Offer Attributes Map

| OFFER_ATTRIBUTE_ID | OFFER_ID | REGION | CURRENCY | CUSTOMER_SEGMENT | SALES_CHANNEL |
|---|---|---|---|---|---|
| 062-05 | 06-05 | ROW | USD | Default | Direct |

← 522

Offer Transition

| OFFER_TRANSITION_ID | TRANSITION_FROM_OFFER_ID | TRANSITION_TYPE | TRANSITION_TO_OFFER_ID |
|---|---|---|---|
| 063-08 | 06-05 | RE-SUBSCRIBE | 06-04 |

| Field | System Generated, Defied in ICS (310a) |
|---|---|
| Code | Revstream Key - systematically generated by the publish process TAG+Charge Record ID+Start Date (QBO1-121114) |
| Meaning | Revstream Key - systematically generated by the publish process (same value as Code) |
| Description | Defined in ICS - Charge Name |
| Tag | Defined in ICS |
| Start Date Active | Defined in ICS - has to be published - Charge date Creation |
| End Date Active | None - this will be set in price change scenario (see above) |
| Enabled Flag | Defaulted - Yes |
| Item | Defined in ICS - has to be published - Charge ID |
| Category One | Defined in ICS - QBO |
| Fair Value Basis | Defined in ICS - BESP (other value is VSOE) |
| FV Method | Defaulted - Amount[Mid]No Test (not clear if we need other vales in drop down) |
| Currency | Defined in ICS |
| Strat Set | Defaulted - Intuit Stratification Set |
| FV Low | Defined in ICS |
| FV Medium | Defined in ICS |
| FV High | Defined in ICS |

FIG. 14

| Grant Status for Accountant's QBOA service (entitlement state - service state) | Grant Status for Accountant-Paid (Bill-Me) client service (entitlement state - service state) | Logical Grant Status returned for the respective Accountant Paid (bill-me) grant (entitlement state - service state) | |
|---|---|---|---|
| Active - Paid | Active - Paid | Active - Paid | |
| | Active - Pending Cancellation | Active - Pending Cancellation | applicable for bill-me add-on |
| | Inactive - Paid | Inactive - Paid | applicable for bill-me add-on |
| | Closed | Closed | |
| Active - In Collection | Active - Paid | Active - In Collection | |
| | Active - Pending Cancellation | Active - In Collection Pending Cancellation | |
| | Inactive - Paid | Inactive - Paid | Only applicable for bill-me add-on |
| | Closed | Closed | |
| | | | |

FIG. 28

| Grant Status for Accountant's QBOA service (entitlement state - service state) | Grant Status for Accountant-Paid (Bill-Me) client service (entitlement state - service state) | Logical Grant Status returned for the respective Accountant Paid (bill-me) grant (entitlement state - service state) | |
|---|---|---|---|
| Inactive - Paid | Active - Paid | Inactive - Paid | |
| | Active - Pending Cancellation | Inactive - Paid | applicable for bill-me add-on - When Accountant (and all his bill-me clients) to be de-entitled due chargeback (or DD return). Handling as called out below for BRM. And as a result become Inactive - Paid. |
| | Inactive - Paid | Inactive - Paid | applicable for bill-me add-on |
| | Closed | Closed | |
| Closed | Active - Paid | Closed | |
| | Active - Pending Cancellation | Closed | applicable for bill-me add-on |
| | Inactive - Paid | Closed | applicable for bill-me add-on |
| | Closed | Closed | |

FIG. 28 (CONT.)

COMPUTER SOFTWARE PRODUCT GRANT MANAGEMENT SYSTEM

CROSS-REFERENCE TO RELATED APPLICATION

This application is related to U.S. application Ser. No. 15/011,326, filed Jan. 29, 2016, entitled SOFTWARE MANAGEMENT SYSTEM, and U.S. application Ser. No. 15/146,558, filed May 4, 2016, entitled RUNTIME COMPUTER SOFTWARE PRODUCT MANAGEMENT SYSTEM.

SUMMARY

Embodiments are related to computer-centric technologies such as computer databases, computer software product models, design time computer software product configuration and management, runtime computer software product management and deployment of computer software program products, end-to-end design time—runtime computer software product systems, user interfaces, computer software model publishing systems, computerized software entitlement and enforcement systems, reusable software product definition elements and Software as a Service (SaaS) systems.

Embodiments also relate to computer software product definitions and computer software product definition systems for design time computer software management, and certain embodiments involve runtime state models and runtime computer software management systems. Other embodiments involve end-to-end, design time to runtime computing systems for configuration, deployment and enforcement of computer software programs and use or access of same by a subscriber or customer at different runtime stages.

Embodiments are also related to design time and runtime computing systems for managing how computer software products, including Software as a Service (SaaS) and desktop software products (generally, computer software products), are activated, deployed or made accessible to a customer, using remote access or executing on a user's local computing device, which may be a desktop computer or mobile communication device, and how a customer may transition to a different computer software product configuration or feature set, controlling runtime access to computer software products and controlling which actions a customer can perform given runtime entitlement and service states of an integrated or hybrid state model that contains both entitlement state and service state data.

Embodiments are also related to systems for configuring managing computer software product monetization.

Embodiments are also related to computer software product management systems including systems that include data models that integrate entitlement definitions and monetization definitions that are related to and inextricably tied to each other and data models that integrate entitlement state data or definitions and service state data or definitions related to and inextricably tied to each other.

Embodiments are also related to computer software product management systems that include agnostic data models that integrate design time entitlement definitions and monetization definitions and runtime state models and that can be utilized to configure various computer software products and manage access thereto by a customer.

Embodiments are also related to computer software product management systems including systems that include data models that integrate entitlement definitions and monetization definitions and/or data models that integrate entitlement state and service state data or definitions.

Embodiments are also related to user interfaces generated by a computer software product management systems for configuring computer software products by configuration of data models that integrate entitlement definitions and monetization definitions.

Embodiments are also related to computer software product management systems that publish different elements of, or portions of, a data model that integrates entitlement definitions and monetization definitions of a computer software product.

Embodiments are also related to computer software product management systems that publish different portions of a data model that integrates entitlement definitions and monetization definitions, for runtime processing including processing of customer requests.

Embodiments are also related to adaptive computer software product management systems that involve design time integrated or hybrid entitlement-monetization models for software product configuration and runtime integrated or hybrid entitlement state—service state models.

Embodiments are also related to data models and computer software product management systems that utilize data model elements, modules, records or objects and that integrate entitlement and monetization definitions such that a feature set can be monetized differently based on factors such as charge type, charge frequency and currency, and whether a customer is eligible for certain pricing attributes is specified by other charge attribute portions of the data model.

One embodiment is directed to a computerized system for design time computer software product management, which involves an integrated or hybrid entitlement-monetization data model and that may be in a networked computing environment and involve different computing systems or platforms. A computing system constructed according to one embodiment includes a computer database, a hybrid entitlement-monetization data model, a publishing service and spoke computing systems. The data model is an integrated or hybrid entitlement-monetization data model in which an entitlement definition, which specifies a computer software product and attributes thereof, is inextricably tied to, or integrated with, a monetization definition, which specifies terms that govern use of the computer software product specified by the entitlement definition. The publishing service is in communication between the computer database and spoke computing systems and is configured to provide elements of the entitlement-monetization data model to respective spoke computing systems for subsequent runtime processing of a customer request made through a customer-facing application concerning a computer software product. The spoke computing systems are configured to process the request to deploy or provide access to the computer software product a network in response to the request.

Another embodiment is directed to a computing system for automated runtime computer software product management in a networked computing environment and that can operate across different computing systems. A runtime computer software product management system constructed according to one embodiment comprises a computer database, an event generation system, and a computer software product access control or enforcement system. The computer database is programmed or configured as a special purpose computing component that includes a runtime subscription model executed or processed by a host computer or the computer database to govern use of a computer software product by a customer and includes an integrated or hybrid runtime entitlement-service state model. According to one embodiment, the integrated or hybrid runtime entitlement-service state model comprises first state data specifying access to the computer software product by the customer and second state data specifying a service state and utilized to indicate permissible customer actions involving the computer software product based at least in part upon the first state data. The event generation system is programmed or configured as a special purpose computing component that is in communication with the database of the host computer and is programmed or configured to automatically generate and publish system generated events to which the computer database is subscribed to receive. An automatic runtime modification to the entitlement-service state model is executed based at least in part upon a published event. The access control or enforcement system is programmed or configured as a special purpose computing component that is in communication with the computer database and a computing apparatus of the customer and is configured or programmed to receive data of the integrated entitlement-service state model from the database or host computer, receive a request to access the computer software product through a customer facing application accessible by the customer's computer, and automatically respond to the request through the customer-facing application based at least in part upon the received runtime subscription model data.

Other system embodiments include a host computer or database comprising an integrated or hybrid runtime subscription model for automatically governing use of a computer software product by a customer and that includes a runtime integrated or hybrid entitlement state—service state model. Embodiments may also include one or more other computing systems or components such as one or more of an event generation system, an access control or enforcement system, and a customer facing application for interacting with the customer.

Further embodiments are directed to integrated or hybrid data models utilized in a computerized system for design time and/or runtime computer software product management. In one embodiment, an integrated or hybrid design time data model includes an entitlement definition, which specifies a computer software product and attributes thereof. The entitlement definition is inextricably tied to, or integrated with, a monetization definition that specifies terms that govern use of the computer software product specified by the entitlement definition. In another embodiment, an integrated or hybrid runtime subscription model governs runtime use of a computer software product by a customer and includes an integrated or hybrid entitlement-service state model. A hybrid state is reflected by the integrated or hybrid entitlement-service state model including first state data specifying access to the computer software product by the customer (such as whether access is permitted and access type such as full access or read only access) and second state data specifying permissible customer actions involving the computer software product based at least in part upon the first state data (e.g., during a service state of "trial" when the entitlement state is "active," a customer may opt-out of a trial subscription, opt-in to a paid subscription or opt to purchase the computer software produce immediately).

Additional embodiments involve an integrated or hybrid data model for computer software product management that provides for re-use of data model elements, records or objects, which may involve design time and/or runtime applications.

Further embodiments are directed to computer-implemented methods for design time and/or runtime computer software product management in a networked computing environment and that may involve different computing systems or platforms. Embodiments may utilize a design time data model that is an integrated or hybrid entitlement-monetization data model and/or a runtime data model that is an integrated entitlement state—service state data model.

Additional embodiments are directed to computer program products or articles of manufacture comprising a non-transitory computer readable medium embodying instructions executable by a computer to execute a process for design time and/or runtime computer software product management.

Another embodiment is directed to a runtime computing system including a computer database and an access control system in communication with each other and a runtime composite model. The runtime composite model elements of the computer database include an integrated entitlement-service state model. A first instance of the integrated entitlement-service state model includes first state data specifying access by an accountant to a subscription of a computer software product of a host and second state data specifying permissible accountant actions involving the subscription based at least in part upon the first state data, and a second instance of the integrated entitlement-service state model including first state data specifying access by a customer of the accountant to the subscription of the computer software product and second state data specifying permissible customer actions involving the subscription based at least in part upon the first state data of the second instance. The access control system is configured, structured or programmed to generate a first grant including a first grant status for the accountant based on a first instance of the entitlement-service state model and a second grant including a second grant status based on a second instance of the entitlement service state model. The access control system is further configured to receive a request from the computer software product by the customer to access the computer software product, determine a grant status based at least in part upon the first grant status and the second grant status and return the determined grant status to the computer software product in response to the request such that the customer is allowed to access the computer software product based at least in part upon the determined grant status Further embodiments are directed to computer-implemented methods for runtime grant management and access to computer software products.

Additional embodiments are directed to computer program products or articles of manufacture comprising a non-transitory computer readable medium embodying instructions executable by a computer to execute a process for runtime grant management and access to computer software products.

Additional embodiments are directed to runtime models that are composite models including elements distributed across different computing system components (e.g., across a computer database, an access control system and a billing system) and/or involve entitlement-service state and access grants.

Additional embodiments are directed to runtime composite models including a grant model element that includes attributes for specifying access by a customer and specifying that the accountant interfaces with the host for subscription or service fees, which may be a wholesale model.

In a single or multiple embodiments, the computer database is executed by a first computer that is in communication through a first network with the event generation system executed by a second computer and in communication through a second network with the access control system executed by a third computer. The event generation system automatically generates events in response to, for example, a user action of opting in from a trial subscription to another subscription, or as an indicator of subscription payment or non-payment or other pre-determined trigger. In one computing system configuration, the computer database, the event generation system and the access control system are independent of, and not accessible by, a customer or subscriber through the customer facing application utilized by the customer to transmit a request concerning a computer software product. Further, in embodiments involving an access control system, the computer database or subscription entitlement provisioning system and the access control system are not accessible by the client through a client facing application utilized by the client to request access to the computerized financial management system.

In a single or multiple embodiments, the runtime subscription model includes a customer account identification element comprising a unique identifier for the customer, a subscription element comprising the integrated or hybrid entitlement-service state model representing an instance of a computer software product to which the customer is entitled to access, an entitled product element associated with the subscription element and the customer account identification element and identifying an offer related to the entitled product, and an entitled product attribute element associated with the entitled product element and specifying a feature or feature set of the entitled product. According to one embodiment, the integrated or hybrid entitlement-service state model is exclusively contained within the subscription element such that no portion of the integrated entitlement-service state model is included in the entitled product element or the entitled product attribute element.

In a single or multiple embodiments, the runtime subscription model is adaptable to and modifiable for an add-on to a software product, which may be a separate, independent product that is made accessible to a customer when the customer has already subscribed to another computer software product. An integrated or hybrid runtime subscription model may include a subscription add-on element identifying an offer for an add-on to the computer software product, and the integrated entitlement-service state model or portions thereof may be included in the subscription add-on element. An entitled product element is associated with the subscription add-on element and the customer account identification element—and identifies the add-on product identified in the subscription add-on element offer, and an entitled product attribute element is associated with the add-on product and specifies a feature or feature set of the add-on product.

In a single or multiple embodiments, first state data of the integrated or hybrid entitlement-service state model includes, indicates or identifies a system generated entitlement state, system generated or selected first access data and system generated or selected second access data. First access data is associated with the entitlement state (such as "active," "inactive" and "closed" computer software product) and specifies whether the subscriber is granted access to the computer software product. The second access data of the integrated or hybrid entitlement-service state model is associated with the entitlement state and specifies a level of access to the computer software product (e.g., whether access is granted or not and level of same such as full access, read-only or restricted access or no access).

In a single or multiple embodiments, the second state data of the integrated or hybrid entitlement-service state model includes, indicates or identifies a service state of the computer software product applicable to the subscriber (such as trial subscription, trial with opt-in to purchase or transition to a paid subscription, paid subscription, pending cancellation, collection). Actions that a customer is allowed to perform are specified based at least in part upon pre-determined combinations of first and second state data, or pre-determined combinations of entitlement state and service state.

In a single or multiple embodiments, the integrated or hybrid entitlement-monetization data model includes a plurality of related model elements, objects, records, tables, or other data structures (generally, model element) including a product model element, a feature set model element, a charge model element, a package model element and an offer model element. The product model element identifies a core or primary computer software product (such as QUICKBOOKS ONLINE, or "QBO"), the feature set model element is associated with the product model element and defines a set of features or limitations of the core computer software product (e.g., a particular version of the software product, such as QBO ESSENTIALS computer software product). The charge model element is associated with the product model element and the feature set model element and defines monetization of the feature set model element. The package model element includes the feature set model element and the charge model element for the core computer software product, and an offer or promotion model element includes the package model element and offer terms for the user. A promotion based on the offer model element is presented to the user through a customer-facing offer application during runtime. With the discrete, modular configuration of the integrated model, various model elements can be used for different purposes, or repackaged, once they have been defined. For example, product, feature set, charge and package model elements can be reused. A feature set model element and a charge model element are reusable model elements or modules that can be incorporated into other package model elements, and after a feature set model element has been defined, that feature set model element can be monetized differently for different users, different markets, and other criteria.

In a single or multiple embodiments, the integrated or hybrid entitlement-monetization data model also includes a reusable discount model element that can be applied to the charge model element of the package model element such that a discount model element can be incorporated into other package model elements. In a single or multiple embodiments, the integrated or hybrid entitlement-monetization data model includes a promotion or offer transition model element that specifies other promotions to which a customer can transition from a currently active promotion or computer software product. Given the multiple model elements or objects, the entitlement definition is based at least in part upon a plurality of entitlement definition model elements, the monetization definition is based at least in part upon a plurality of monetization definition model elements, and certain model elements may involve both entitlement definition and monetization definition. For example, in an integrated or hybrid entitlement-monetization data model according to one embodiment, a feature set model element includes elements for only entitlement definition, a charge model element includes elements for only monetization definition, and a package model element includes elements for both entitlement definition and monetization definition (e.g., feature set charge (and discount if applicable)). The entitlement-monetization model may also include a charge attribute model element (or a charge attribute element may be integrated into a charge element) that includes elements of both the entitlement definition and the monetization definition and specifies a price and eligibility for the price (e.g., for users in different geographic locations, or different types of users such as an accountant versus a corporate entity).

In a single or multiple embodiments, spoke computing systems include a spoke computing system to which the entitlement-monetization data model is published and serves as an electronic catalog that is accessible by a customer through the customer facing application, a spoke computing system that hosts or utilizes a billing application and a spoke computing system that hosts or utilizes a revenue recognition application. According to embodiments, different parts of the integrated entitlement-monetization data model are published to different spoke computing systems. For example, the entire data model may be published to at least one spoke computing system (which may or may not utilize the entire data model), whereas selected or pre-determined portions of the data model are published to other spoke computing systems for billing and revenue recognition.

In a single or multiple embodiments, the second spoke computing system executes a billing application that is independent of the integrated entitlement-monetization data model such that it may be necessary transform the data model elements by mapping terms of the selected model elements to terms utilized by the billing application, whereas mapping may not be required when publishing data model elements to a spoke computing system that is accessed by the customer through the customer-facing application. Further, if necessary, the second spoke computing system may be configured to further modify or transform the received elements of the entitlement-monetization model by enriching received data model element data by adding one or more of pricing and discount data to create a new set of data for processing by the second spoke or billing computing system.

In a single or multiple embodiments, including those involving runtime access management, elements of the runtime composite model are distributed across the computer database and the access control system, and an element of the runtime composite model of the access control system specifies the first grant for the accountant and the second grant for the customer.

In a single or multiple embodiments, including those involving runtime access management, runtime composite model elements may also be distributed across the computer database, the access control system and a computerized billing system, and an element of the runtime composite model for the computerized billing system identifies the accountant as responsible to the host for the customer's access.

In a single or multiple embodiments, including those involving runtime access management, the runtime composite model includes multiple models that are selected or activated depending on access and ownership attributes. For example, in one embodiment, a runtime composite model includes multiple models—a first model for when the customer is specified as an entitled owner of the subscription to the computer software product and the customer is responsible to the host for access to the computer software product, a second model for when the customer is specified as the entitled owner of the subscription to the computer software product, the customer is responsible to the host for access to the computer software product, and the customer has affiliated with an accountant, and a third model for when the accountant is specified as the entitled owner of the subscription to the computer software product, and the accountant is responsible to the host for the customer's access to the computer software product.

In a single or multiple embodiments, including those involving runtime access management, the runtime composite model is structured such that the access control system may execute a migration or transition to and/or a migration or transition from certain models. For example, the runtime composite model may be structured for execution of a first migration or transition from the second model to the third model in response to a pre-determined action by the accountant, and execution of a second migration or transition from the third model to the second model in response to a pre-determined action by the accountant. As another example, the runtime composite model may be structured to preclude migration or transition from the third model to the first model and preclude migration or transition from the first model to the third model while allowing for execution of a migration or transition from the first model to the second model in response to a pre-determined action by the accountant or a pre-determined action by the customer. Migrations or transitions may involve modification of at least one of the first grant and the second grant based at least in part upon an update to the database reflecting the first migration or transition.

In a single or multiple embodiments, including those involving runtime access management, the access control system, not the database in communication with the access control system, receives the request generated by the computerized finical management system and that may be generated in response to the customer opening or attempting to log into the computer software product through a customer-facing user interface of the computing system. Neither the database nor the access control system are accessible by the client through the client facing application.

In a single or multiple embodiments, the access control system is configured to determine the grant status based at least in part upon a comparison or analysis of the first grant status and the second grant status. For example, when the accountant grant status and the client grant status are different, one is selected as the determined grant status based on pre-determined criteria (e.g., the lower ranking one). Otherwise, if they are the same, then the determined grant status is also the same and either one of the first and second grant statuses may be selected for the response to the access request.

With grant status determinations based on both the first and second grant statuses, embodiments may result in effectively modifying or reducing the second grant status of the second grant of the customer without actually modifying or reducing the second grant status, and this may be temporary if the accountant's grant status subsequently changes. Thus, the lower grant status may serve to override the customer's grant status. For example, while a grant status of a customer may be "active," the effective or determined grant status provided in response to the customer's request is not active and instead is "inactive" when the accountant's grant status is inactive. This logical, overriding grant status is particularly useful in cases in which multiple customer grant statuses are to be modified, in which case the customer grant statuses can be maintained and a different grant status is returned in response to the request to access the computer software product. This may eliminate the need to update thousands of grants and may involve all or some customer grants.

Thus, as will be understood by persons of ordinary skill in the art, computer-centric embodiments provide various technological improvements and improvements to various technical fields including, but not limited to, automated computer software product configuration, management, promotion, deployment and/or access control, one or more of which may occur during runtime, computer software product monetization, databases, data models including specifically configured or structured data models for computer software product configuration and data models for computer software product access and subscriber action management, and data models for managing grants of access to computer software products, data models with modular elements or objects that can be reused or repurposed for other applications, computerized entitlement definitions, computerized monetization definitions, computer-based publishing services, design time computer applications and runtime computer applications and implementation of effective grant modifications without having to actually modify grants for access to a computer software product.

Further, embodiments involve various types of modifications or transformations by generating or modifying computer software product configurations, e.g., by use of reusable entitlement-monetization data model elements and mapping and/or enriching selected portions of the entitlement-monetization data model for processing by spoke computing systems and by automatically modifying the state of an integrated or hybrid entitlement-service state model, for example, based on automatic modifications in response to system generated events and/or user actions.

Embodiments involve modification or transformation by generating a response to a request for access to a computer software product that embodies a client grant status that is effectively modified without having to actually modify grant status, thus resulting in the ability provide for a modified user experience or modified access restrictions while the client grant status remains unchanged. Thus, embodiments provide for transformation of grant status for purposes of responding to an access request without having to actually modify tens, hundreds or thousands of individual grants.

Embodiments also provide improvements to the functioning of one or more computing devices by, for example, providing for more efficient use of computing resources (including processor, memory, network communications, bandwidth consumption) by utilizing a single, centralized computer software product management system that executes based on an integrated or hybrid entitlement-monetization data model and/or an integrated or hybrid entitlement state—service state data model, and eliminating the need for additional computer processing and communications with additional configuration and deployment computing systems in design time and/or runtime applications.

Embodiments also provide improvements to the functioning of computing device by, for example, providing for an integrated or hybrid entitlement-monetization computer software product model that can be utilized during both design time and runtime to provide for end-to-end configuration to deployment of computer software products via an integrated or hybrid entitlement state—service state data model utilized to govern access to computer software products and actions that can be performed given a pre-determined combination of entitlement state and service state.

Embodiments also provide improvements to the functioning of computing device by, for example, providing for an integrated or hybrid computer software product model or models that include elements, objects or modules that can be re-used for other purposes or in other applications once defined.

Embodiments also provide improvements to the functioning of a computing device by, for example, implementing access grant status modifications without having to modify individual grant status indicators, thereby reducing the computing resources and time required to implement status changes for clients which would otherwise require updating individual grant status indicators for each client.

Embodiments also provide computer-centric embodiments involving automated computer software product configuration, management, promotion, deployment and/or access control utilizing specific data and logical structures, specific data model configurations and rule sets that provide for specific ways in which computing devices executing or embodying aspects of the invention operate, e.g., using runtime hybrid subscription model including first state data specifying entitlement to a subscription to a computerized financial management system and second state data specifying permissible customer actions involving the computerized financial management system based at least in part upon the first state data, a runtime access model distributed across the access control system and the subscription entitlement provisioning system, specific rules specifying when transitions occur between specific access data models and/or by specific rules for determining which access grant status should utilized for a response to an access request, which may involve effectively changing grant status without actually changing a grant status.

BRIEF DESCRIPTION OF THE DRAWINGS

FIGS. 4A-B are examples of a user interface generated for integrated entitlement-monetization model configuration;

FIGS. 6A-B illustrate a "Product" element of the embodiment of the entitlement-monetization model shown in FIGS. 5A-E and examples of how the "Product" element may be populated;

FIGS. 7A-D illustrate "Feature Set" and "Feature" elements of the embodiment of the entitlement-monetization model shown in FIGS. 5A-E and examples of how the "Feature Set" and "Feature" elements may be populated;

FIGS. 8A-F illustrate "Charge" and "Charge Attribute" elements of the embodiment of the entitlement-monetization model shown in FIGS. 5A-E, how monetization definition via a Charge Attribute can be used to define both price and eligibility for the specified price, and examples of how the "Charge" and "Charge Attribute" elements may be populated;

FIGS. 9A-B illustrate a "Discount" element of the embodiment of the entitlement-monetization model shown in FIGS. 5A-E, and how an example of how the "Discount" element may be populated;

FIGS. 10A-H illustrate "Package" and "Package Component" elements of the embodiment of the entitlement-monetization model shown in FIGS. 5A-E, and examples of how the "Package" and "Package Component" elements may be populated;

FIGS. 11A-J illustrate "Offer," "Offer Component," "Offer Attribute" and "Offer Transition" elements of the embodiment of the entitlement-monetization model shown in FIGS. 5A-E, and examples of how the "Offer," "Offer Component," "Offer Attribute" and Offer transition elements may be populated;

FIG. 14 is a table illustrating data utilized by a revenue management spoke computing system and which data is defined by an entitlement-monetization model;

FIG. 28 illustrates how a runtime computing system may be configured according to one embodiment to derive grant status that is included in a response to a request by a computer program product to allow the customer access to the computer program product.

DETAILED DESCRIPTION OF ILLUSTRATED EMBODIMENTS

Figure 1:
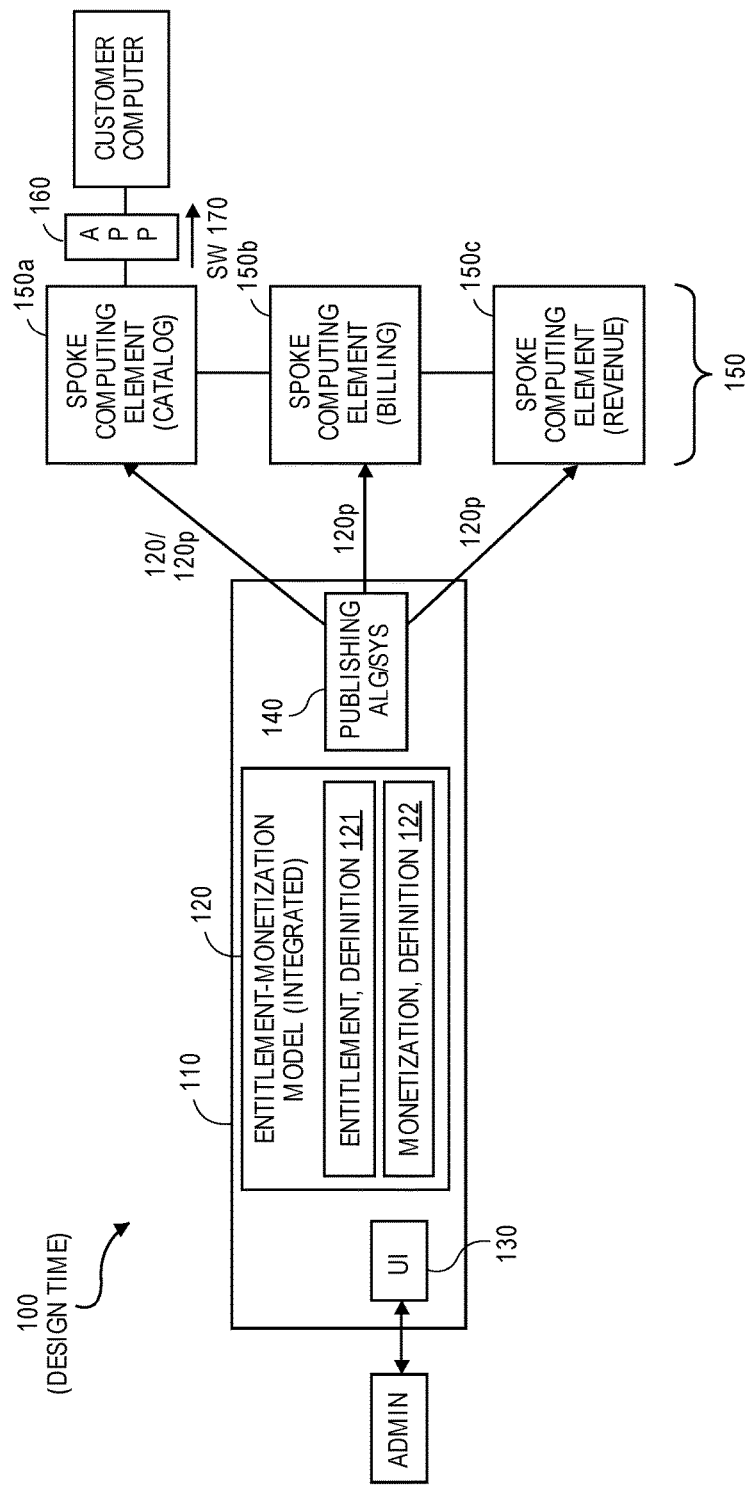
FIG. 1 is a system flow diagram illustrating a computerized software management system constructed according to one embodiment including an integrated entitlement-monetization model.

Certain embodiments of the invention relate to design time applications involve how computer software products, such as QUICKBOOKS ONLINE (QBO) financial management system as one example, are configured for different features, functions or capabilities and corresponding pricing and use restrictions for respective end users or customers. Embodiments of the invention involve a computer database that includes a data model that integrates entitlement definitions that specify the computer software product and features thereof and monetization definitions that specify the terms governing use of the computer software product (e.g., pricing, whether a free offer, whether a discount applies, end users or customers for which monetization terms apply, etc.). Given the manner in which the data model is structured, the integrated entitlement and monetization definitions are interwoven with each other, or tied together, rather than being different models or models that are managed by different computing systems, thus improving the functioning of computing systems utilized for computer software product configuration and deployment by, for example, eliminating the need for additional communications and processing associated with interfacing with other computing devices that utilize their own entitlement and monetization models. Given the manner in which systems are configured, the integrated entitlement-monetization model also provides for reuse of model elements for other software configurations and monetization.

Embodiments of the invention also involve specification of and management of access to or use of a computer software product, such as QUICKBOOKS ONLINE (QBO) financial management system as one example. Embodiments of the invention involve a computer database that includes a data model that integrates entitlement state and service state that govern subscriber access to computer software products and actions that are permitted by the subscriber. For example, a state generated or represented by the integrated entitlement state—service state data model may specify full access or restricted/read-only access and what actions, such as opt in from a trial subscription, are permitted given a current service state such as pricing, whether a free offer, whether a discount applies, end users or customers for which monetization terms apply, etc.). Given the manner in which the hybrid state model is structured, the entitlement state and service state data or attributes are interwoven with each other, or tied together, rather than being different models or models that are managed by different computing systems, thus improving the functioning of computing systems utilized for computer software product configuration and deployment by, for example, eliminating the need for additional communications and processing associated with interfacing with other computing devices that manage independent entitlement and service states.

Embodiments of the invention are also related to controlling how a customer accesses a computer software product by use of a runtime composite model that is includes the integrated entitlement-service state model (e.g., an instance for the accountant's subscription or use of QBO, and an instance for the customer's access or use of same). The accountant and the customer each have a "grant" that is used to govern their respective access to or use of the computer software product, and when processing customer requests to access the computer software products, grants of both the accountant and the customer are utilized, e.g., as part of a logical determination involving both accountant and customer grants, to determine a grant to return to the computer software product in response to a customer request for access. Thus, it may be the case that customers having a high level grant (e.g., "active") may be demoted to a lower level grant (e.g., inactive, or active with a pending cancellation) due to the accountant's grant. This effective modification is communicated to the computer software product without having to modify the actual grant of the customer. This is particularly useful when there are large numbers of customers and associated grants since embodiments eliminate or reduce the need to modify grants by instead utilizing a determined grant.

Embodiments are also related to design time—runtime systems that include both a data model that integrates entitlement definitions that specify the computer software product and features thereof and monetization definitions and a data model that integrates entitlement state and service state. Embodiments are also related to runtime access control by use of an access control model that may include different models based on whether a customer is entitled to a subscription of a computer software product, an accountant of a client is entitled to the subscription, and transitioning or migrating between different access control models.

Further aspects of embodiments including a design time model that integrates entitlement definitions monetization definitions and a runtime model that integrates entitlement state and service state are described with reference to FIGS. 1-22, and how embodiments can be structured and utilized for access control are described in further detail with reference to FIGS. 23-28.

Referring to FIG. 1, in a computerized software management system 100 constructed according to one embodiment, an item configuration system (ICS) 110 includes or is structured according to an integrated entitlement-monetization data model 120. According to embodiments, the entitlement-monetization data model 120 includes an entitlement definition 121 that specifies the computer software product 170 and attributes of the computer software product 170, and a monetization definition 122 that specifies terms governing use of or access to the specified software product 170 such as by attributes of price, use, discount, duration, customer and location. The entitlement definition 121 and the monetization definition 122 are integrated with each other, or inextricably tied together, within the entitlement-monetization model 120. The entitlement-monetization model 120 can be generated or modified in order to configure a software product 170 during design time via a generated user interface 130, which is presented to an administrator or host of the system 110 or source of the software product 170, and allows for entitlement-monetization data model 120 generation, configuration and modification.

Figure 2A:
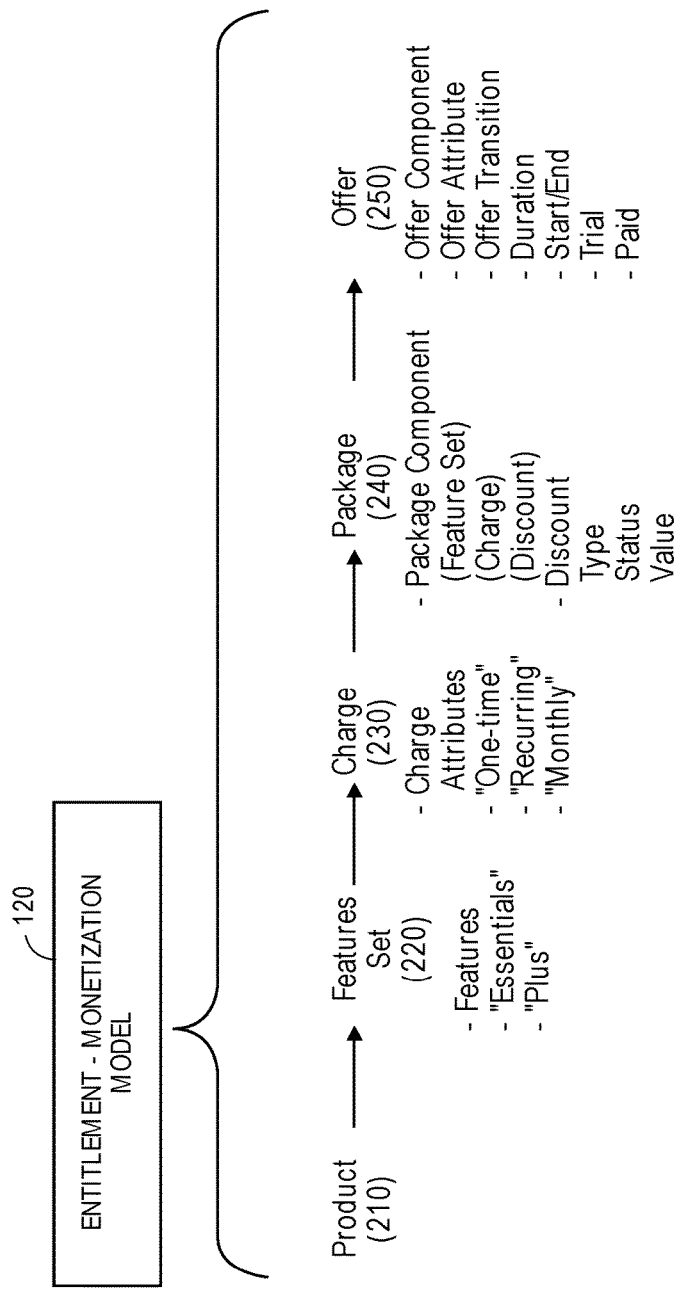
FIGS. 2A-C illustrate one manner in which entitlement-monetization model definitions may be structured and related to each other.
Figure 2B:
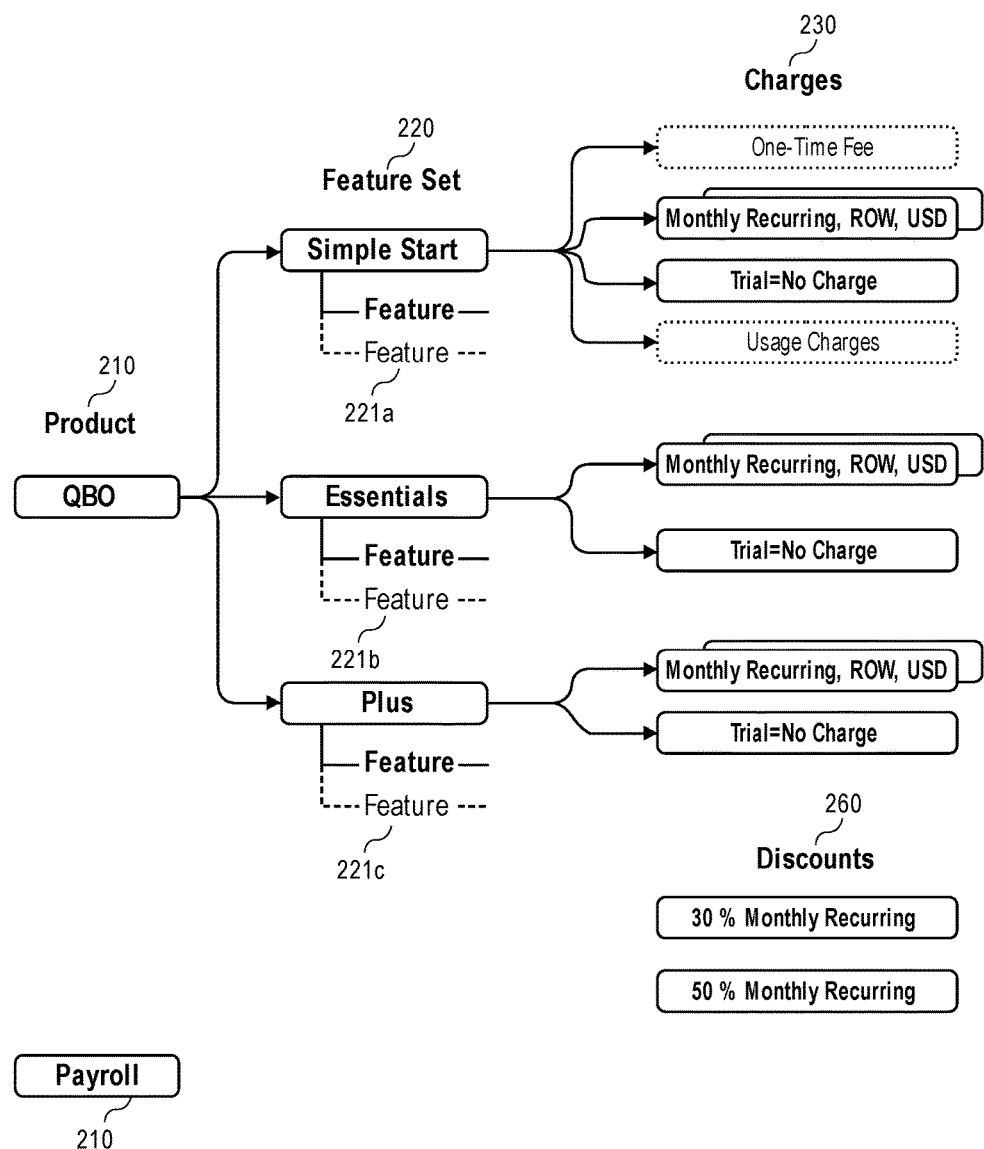
Figure 2C:
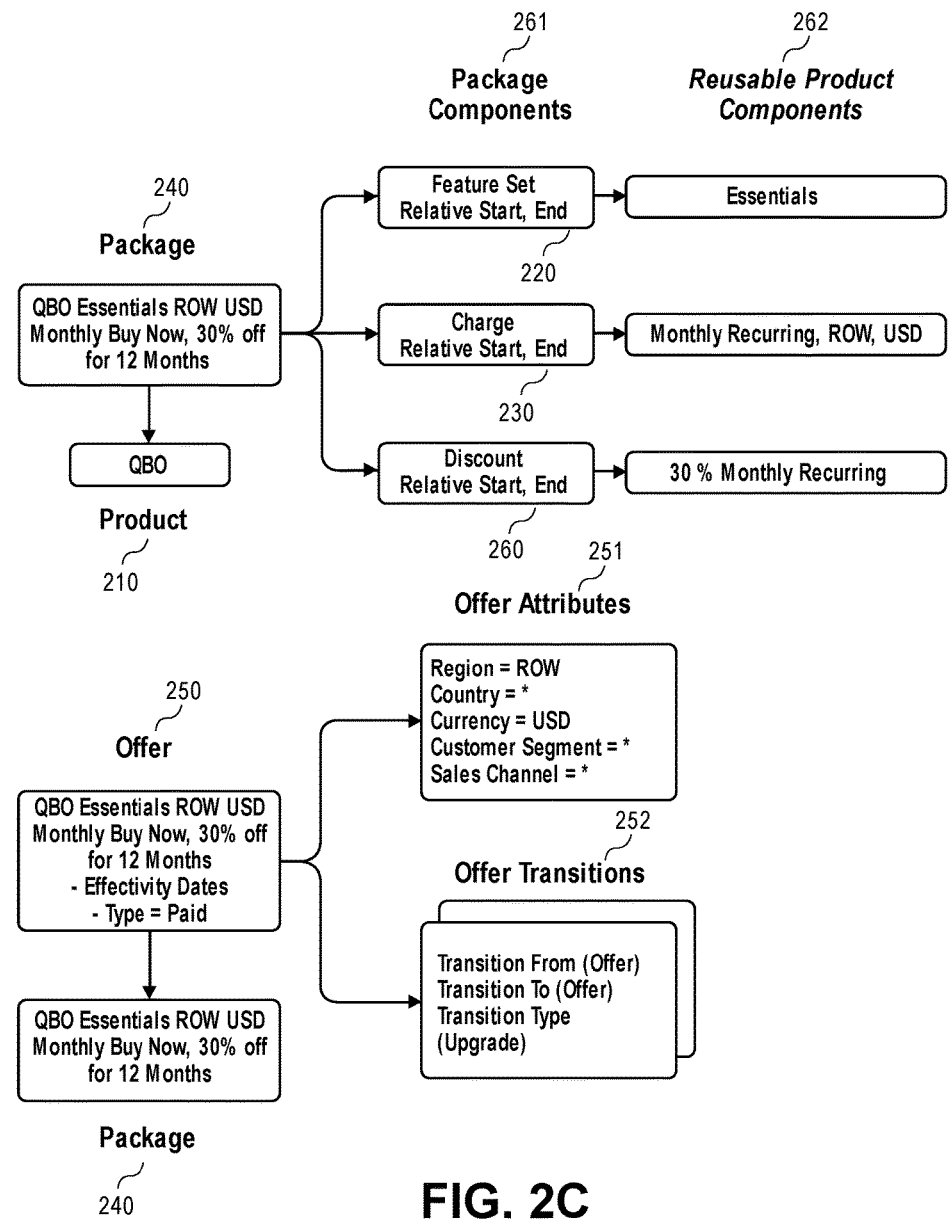

For example, with continuing reference to FIG. 1 and with further reference to FIGS. 2A-C, an entitlement-monetization data model 120 constructed according to one embodiment includes a product record, object, table, or other data element, record, table or object (generally, "element") that uniquely identifies, defines or specifies a core or base software product or offering (such as QBO accounting program, or a payroll program as shown in FIG. 2B). A feature set element 220 associated with the product element 210 specifies a pre-determined set of features or versions of the specified product. Continuing with the example of the specified QBO product, a feature set element 220 may specify a certain version, set of features 221*a*-*c* (generally, feature 221) or capabilities, limits on features or capabilities, other attributes of QBO, which has predefined "feature sets" limits or capabilities such as QBO "Simple Start," QBO "Essentials," or QBO "Plus."

For example, QBO "Simple Start" may be operable on different computing devices and include capabilities of tracking sales, expenses and profiles, creating and sending itemized invoices, tracking and managing sales tax, whereas QBO "Essentials" may include the "Simple Start" feature set as well as managing and paying bills, performing transactions in multiple currencies, generating sales quotes, and QBO "Plus" may include the "Simple Start" and "Essentials" features as well as tracking inventory, creating purchase orders, tracking product or job profitability. It will be understood that these "feature" elements 221 or "sets" 220 of features are provided as illustrative examples and as an example in the context of QBO, and that embodiments are agnostic and can be applied to various other types of software products 170 including payroll software products and tax return preparation applications such as TURBOTAX tax return preparation application, and other computerized financial management systems. For ease of explanation, reference is made to QBO as an illustrative example, and to "software product."

With continuing reference to FIGS. 1 and 2A-C, the entitlement-monetization model 120 also includes a charge element 230 for the specified software product element 210 and applicable feature set element 220 and according to embodiments, represents different ways a feature set may be monetized. Feature set monetization may be based on one or more attributes or combinations of attributes reflected in the entitlement-monetization model 120 such as price, currency, geographic considerations (whether attributes concern a certain state, location, country or "rest of the world (ROW)), frequency of charge (such as on-time, recurring, monthly, annual), usage limitations, whether the use is trial or free and if so, the duration, etc.

In the illustrated embodiment, the entitlement-monetization data model 120 also includes a package element 240, which includes the specified feature set element 220 and charge element 230 for the identified product 210 and, if applicable, a discount data from a discount element 260. For example, a discount element 260 may specify a 30% discount for monthly recurring charges. Thus, the package element 240 represents a combination of entitlement definition components and monetization definition components, which are specified in related package component elements 261, which indicate whether a package component 261 is a feature set element 220, a charge element 230 or a discount element 260, and package data such as when the package element 240 would be activated or be available and when the package element 240 would terminate or be deactivated.

Further, given the how the entitlement-monetization data model 120 is structured in an integrated manner using separately definable, modular or block model elements, various elements of the entitlement-monetization model 120 can be reused or used in different applications. As generally illustrated in FIG. 2, embodiments may include reuse of a feature set element 220 or feature element (indicated by "Essentials"), reuse of a charge element 230 or charge attribute element (indicated by "Monthly Recurring, ROW, USD), and reuse of a discount element 260 (indicated by "30% Monthly Recurring"), e.g., in other package elements 240. Thus, a package element 240 may specify the software product, feature set and monetization attributes (such as QBO Essentials, "Rest of World," US dollars, monthly payment, buy now for 12 months and receive 30% discount) and may serve as a re-usable container for a specific product 210 including certain feature sets, charge(s) that tie to those feature sets, and discounts that need to be applied to those charges, and once a feature set element is defined, that feature set can be monetized differently for different markets, e.g., for different countries.

Having configured the product element 210, feature set element 220, charge element 230 and package element 240, an offer element 250 that represents a bundle for the software product that is available for purchase, use or access is configured. The offer element 250 and any associated offer attribute element 251 and offer component elements may include one or more previously defined package elements 240 (which themselves include feature set elements 220, charge elements 230 that tie those feature set elements 220 and any applicable discount elements 260 for the product element 210) and offer data that is specific to the customer for which the offer element 250 is configured such as the type of offer (e.g., whether paid, trial, free), a duration of trial if applicable, an offer start date and an offer end data, and a status of the offer (e.g., new, pending approval, active, inactive). This is illustrated in FIGS. 2A-C showing "Offer" element 250 associated with "Package" element 240 and "Offer Attributes" element 251. FIG. 2B also illustrates an embodiment involving an offer transition element 252, which specifies target offers a customer can transition to from a current offer, e.g., upgrading from QBO "Simple Start" to QBO "Essentials."

Embodiments described above involve "design time" configurations, as distinguished from "runtime" processing that involves a customer or end user accessing runtime components regarding computer software products 170 to be utilized, purchased or accessed, as defined by the entitlement-monetization definition model 120. With continuing reference to FIG. 1, having configured to entitlement-monetization data model 120, a publishing module or algorithm 140 is utilized to publish some or all of the definition data of the entitlement-monetization data model 120 to runtime spoke computing systems 150a-c (generally, spoke computing system), which are utilized for runtime processing. Runtime processing may, for example, involve a spoke computing system 150 serving as an electronic catalog of configured software products and that interfaces with a customer facing application 160. A spoke computing system 150 may also involve orders, billing, correspondence, assets/entitlements, revenue recognition, etc. related to user requests transmitted through the customer facing offering application 160.

If necessary, published entitlement-monetization model 120 data can be modified or transformed, e.g., according to pre-determined mapping and/or enrichment, in order to properly interface with a spoke system computing system 150 that utilizes a different data format and/or by adding other data for use by a spoke computing system 150. For example, a billing application executed by a spoke computing system 150 may require that a certain set of data of the entitlement-monetization model 120 be mapped to different model terms and/or that certain data be added to item model 120 data received by the spoke computing system (e.g., data for pricing, discounts, and specifically, enrichment for Balance Impact (price)). It will be understood that whether enrichment is necessary when publishing to some or all of the spoke computing systems 150 may depend on the particular applications executed thereby and corresponding data structures. Further embodiments and aspects of various embodiments are described in further detail with reference to FIGS. 3A-16C.

Figure 3A:
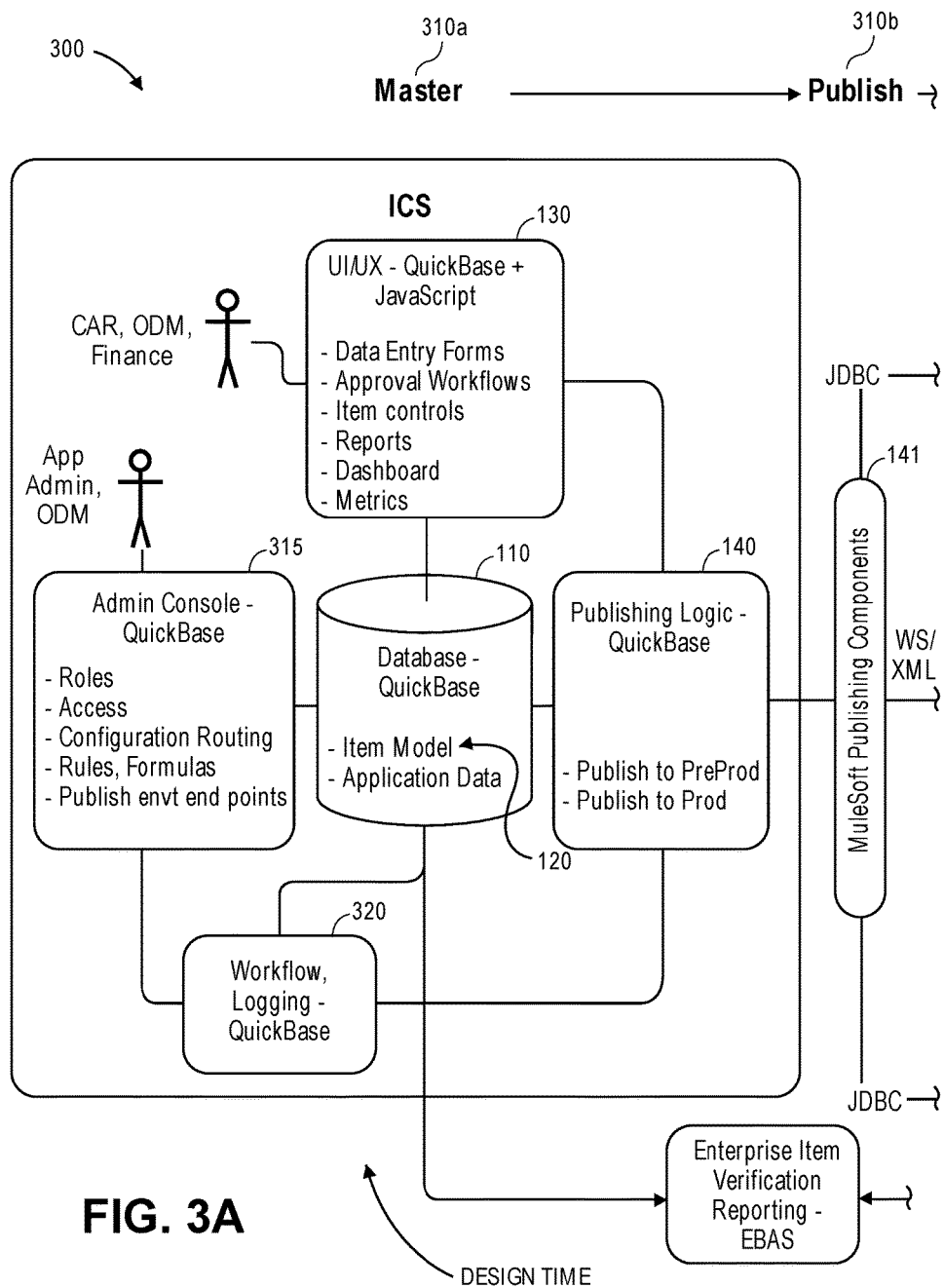
FIGS. 3A-B are system flow diagrams illustrating in further detail a computerized software management system constructed according to one embodiment that includes an integrated entitlement-monetization model, all or a portion of which is published to spoke computing systems, and design time and runtime processing utilizing system components.
Figure 3B:
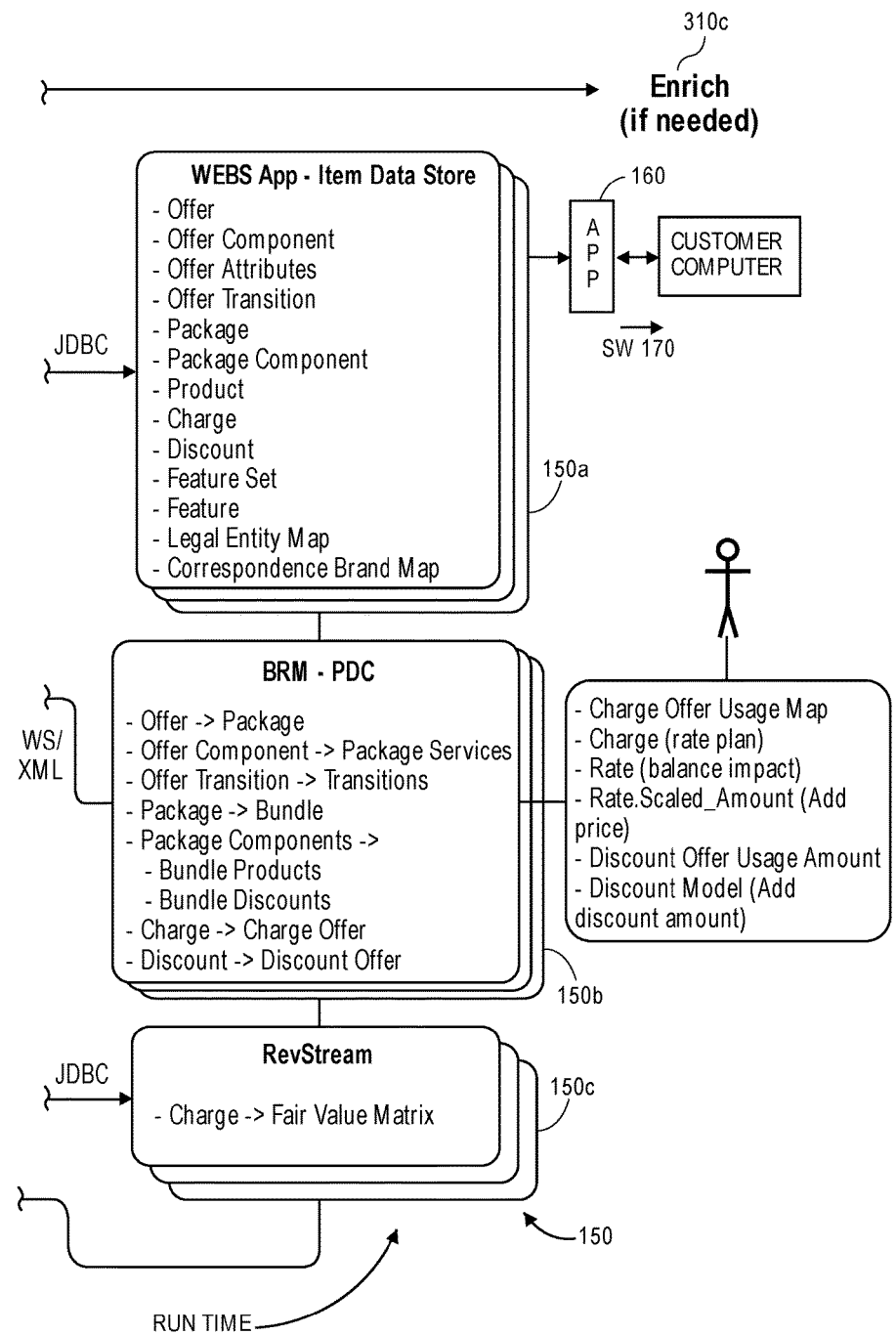

Referring to FIGS. 3A-B, a more detailed system 300 configuration according to one embodiment is illustrated and illustrates the design time "master" central system 310a, also referred to as Item Configuration System (ICS), which hosts the database 110 including the integrated entitlement-monetization model 120 and serves as a "single source of truth." The system 300 also includes an administrative console 315, an administrator user interface 130 for generating or modifying the entitlement-monetization model 120, and a publishing algorithm or system 140, spoke computing systems 150a-c (generally, 150), and a workflow logging module 150 and a reporting module 325 to update the data base 110 regarding implemented changes.

In the illustrated embodiment, the database 110, or ICS 310a, is a centralized system for setup and configuration of the entitlement-monetization model 120 (referred to as "item model" in FIG. 3A), and software product 170 management across the item lifecycle, from original definition, modification, pre-production testing/approval, to deployment and use, access or purchase by a customer via the customer-facing application 160. In the illustrated embodiment, the design time ICS system includes the database 110 and UI 130, and workflow, audit/logging 320 and publishing 140/integration middleware 141, and an administrative console 315.

In the illustrated embodiment, the administrative console 315 defines various administrative protocols such as administrative "roles," "access," "configuration routing," "rules," "formulas," "and publishing environment end points," or, in other words, specifying administrator or host personnel authorized administrative personnel who may access and make changes to the database 110 and entitlement-monetization model 120, modify or specify which model 120 attributes are allowed, and how model publishing via logic or middleware 140/141 is performed. FIG. 3A identifies these personnel as application admin, or "App Admin" and Offer Design Management" (ODM) who are allowed to specify these administrative protocols concerning access to and use of the database 110 and entitlement-monetization model 120 and application data hosted by the database 110.

In FIG. 3A, the workflow/logging module 320 includes workflow tools utilized to guide the change control and approval processes and to manage the item set up process as guided tasks. Audit or logging components 320 are utilized to log changes to software products 170 defined by entitlement-monetization model 120 and published to production, provide an audit trail to meet compliance requirements and to assist in troubleshooting. One example of an application that may be utilized for these purposes of QUICKBASE online database software program. QUICKBASE is a registered trademark of Intuit Inc., Mountain View, Calif.

Also illustrated in FIG. 3A, the ICS 310a provides a user interface (UI) 130 through which users of the ICS 310a can interact with ICS 310a and make modifications to the entitlement-monetization model 120 by creating or configuring various model elements such as product 210, feature set 220 or feature 221 elements, charge elements 230, package elements 240 and offer elements 250 (described in further detail with reference to FIGS. 5A-E). In the illustrated embodiment, this is also implemented by QUICKBASE online database software program.

The UI 130 generated via QUICKBASE online database software program includes data entry forms to create or update model items and for generating and/or presenting data about the entitlement-monetization model 120 and software product 170 deployment or status such as reports, metrics, dashboards and personalized task lists 325 reported back to ICS 310a. The UI 130 in conjunction with workflow components 320, also facilitate the approval and publishing process, as described in further detail below.

Figure 4A:
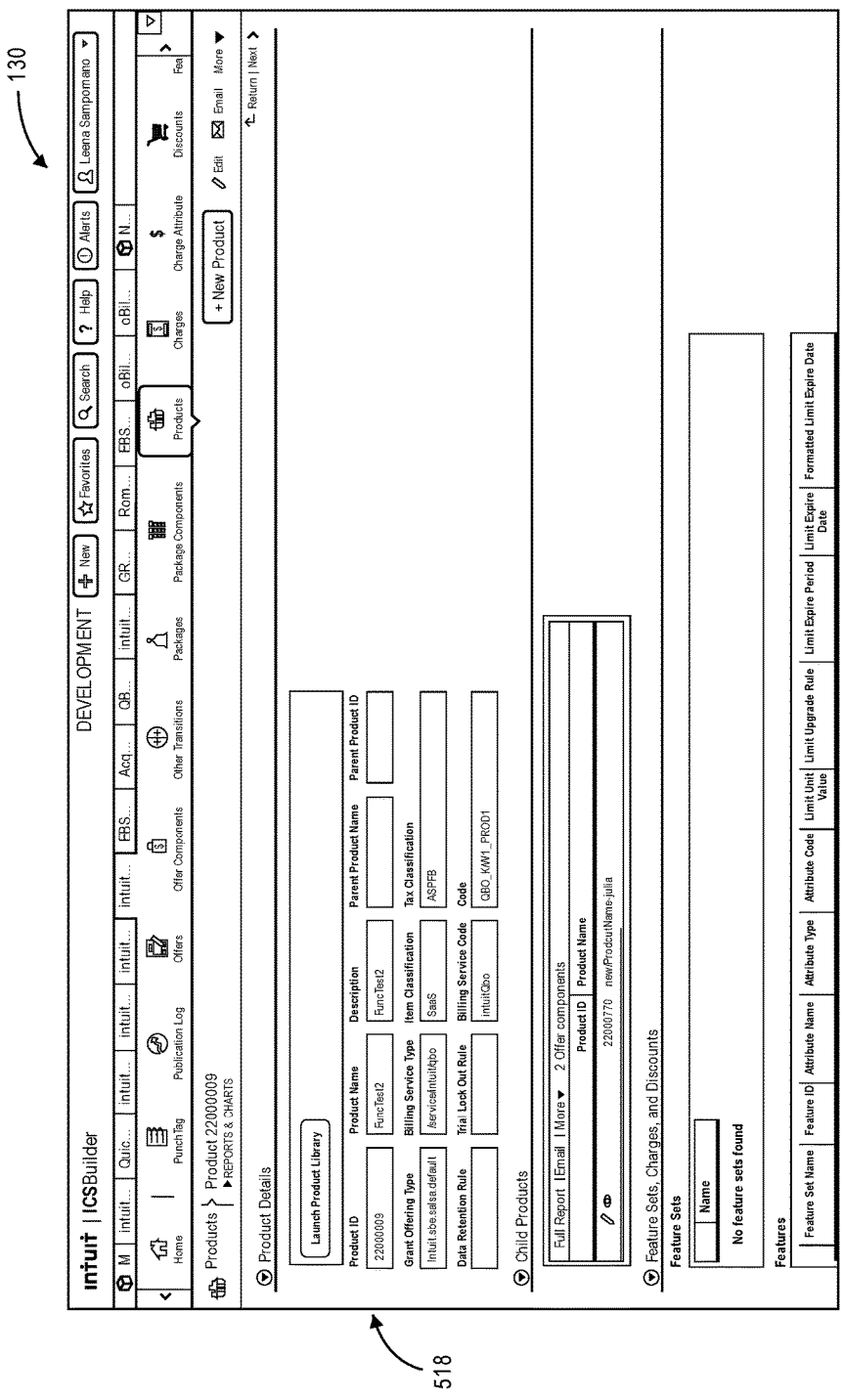
Figure 4B:
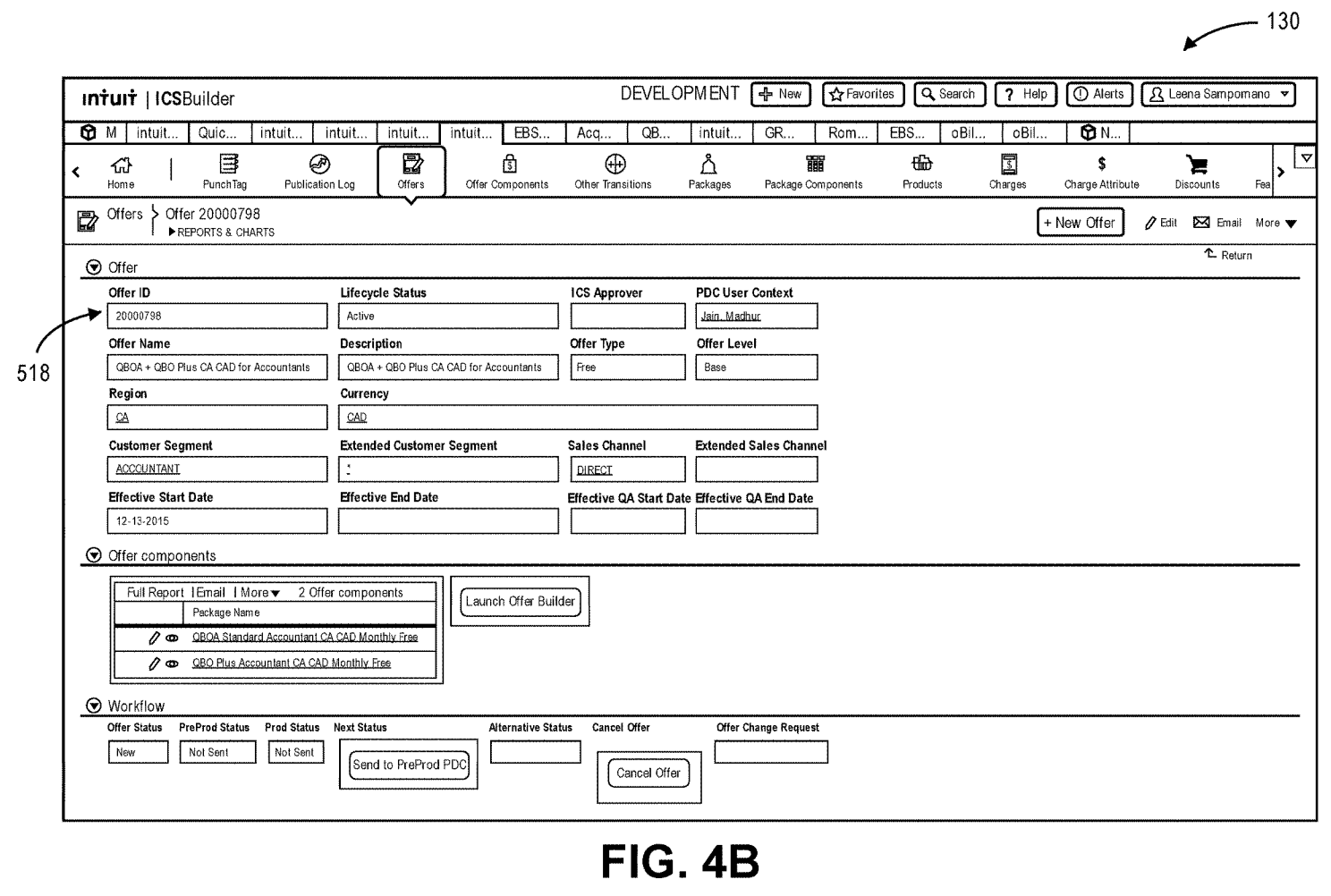
Figure 5A:
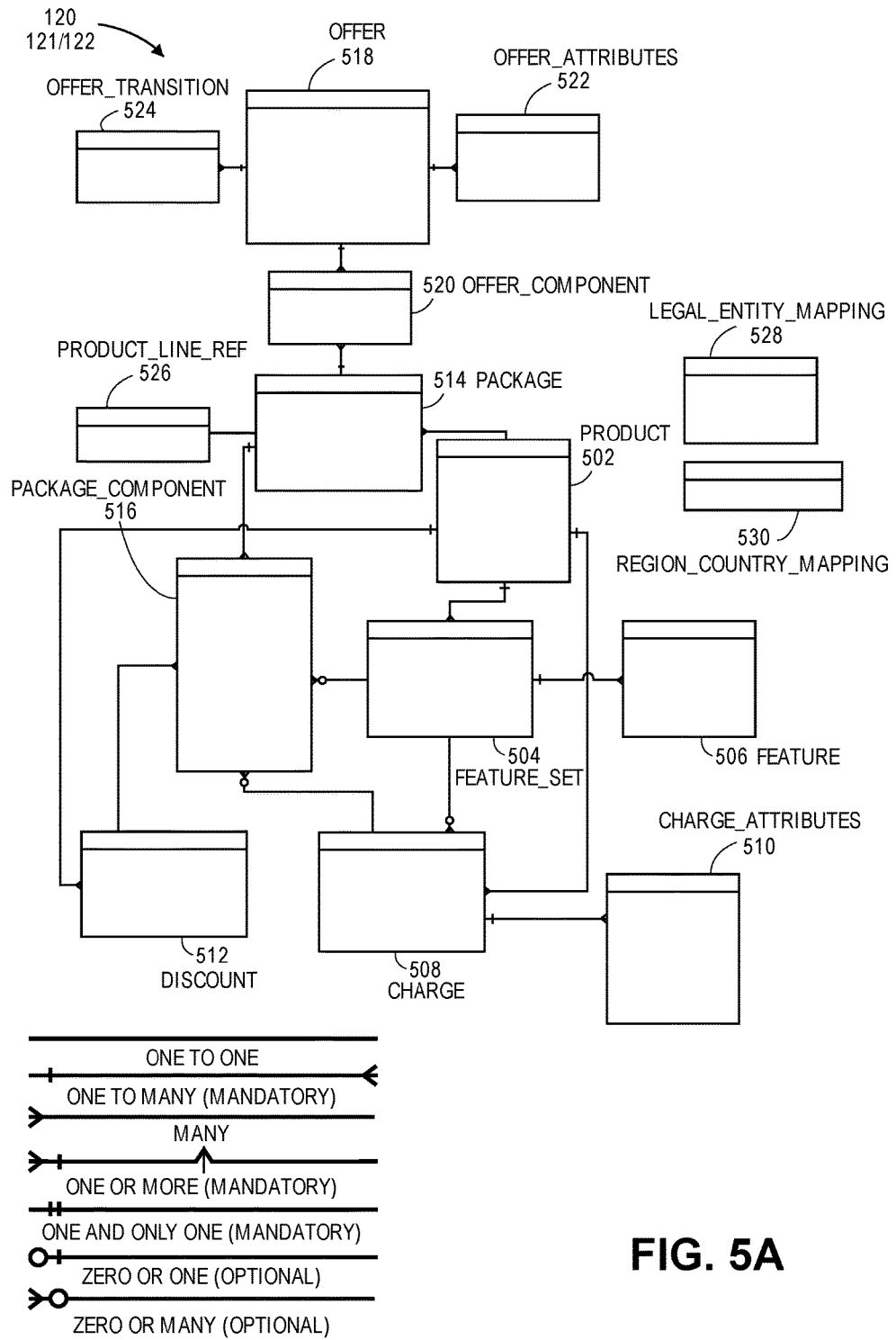
FIGS. 5A-E illustrate an entitlement-monetization model constructed according to one embodiment and how different model elements are related to each other compiled in order to generate an offer to be presented to a customer.
Figure 5B:
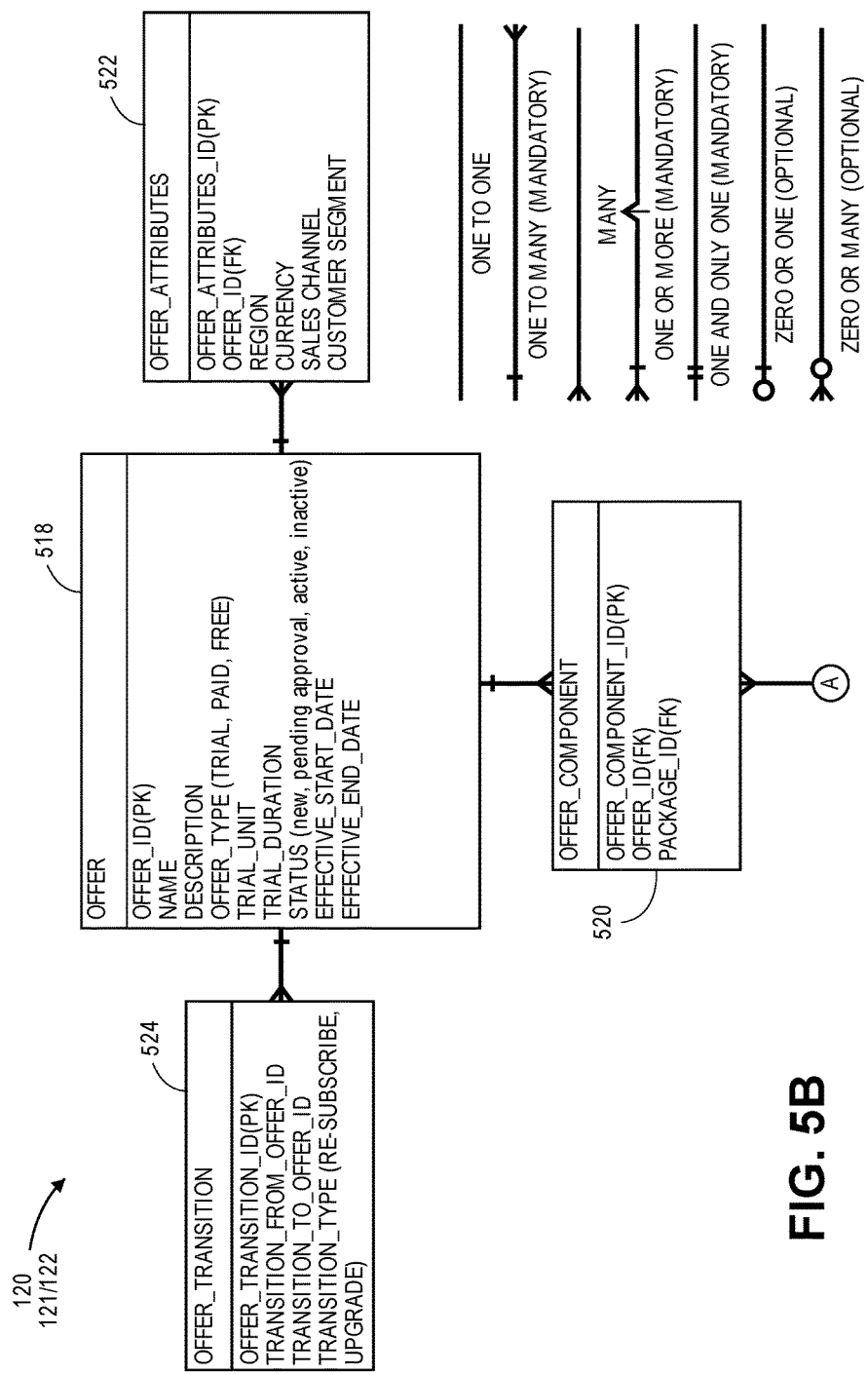
Figure 5C:
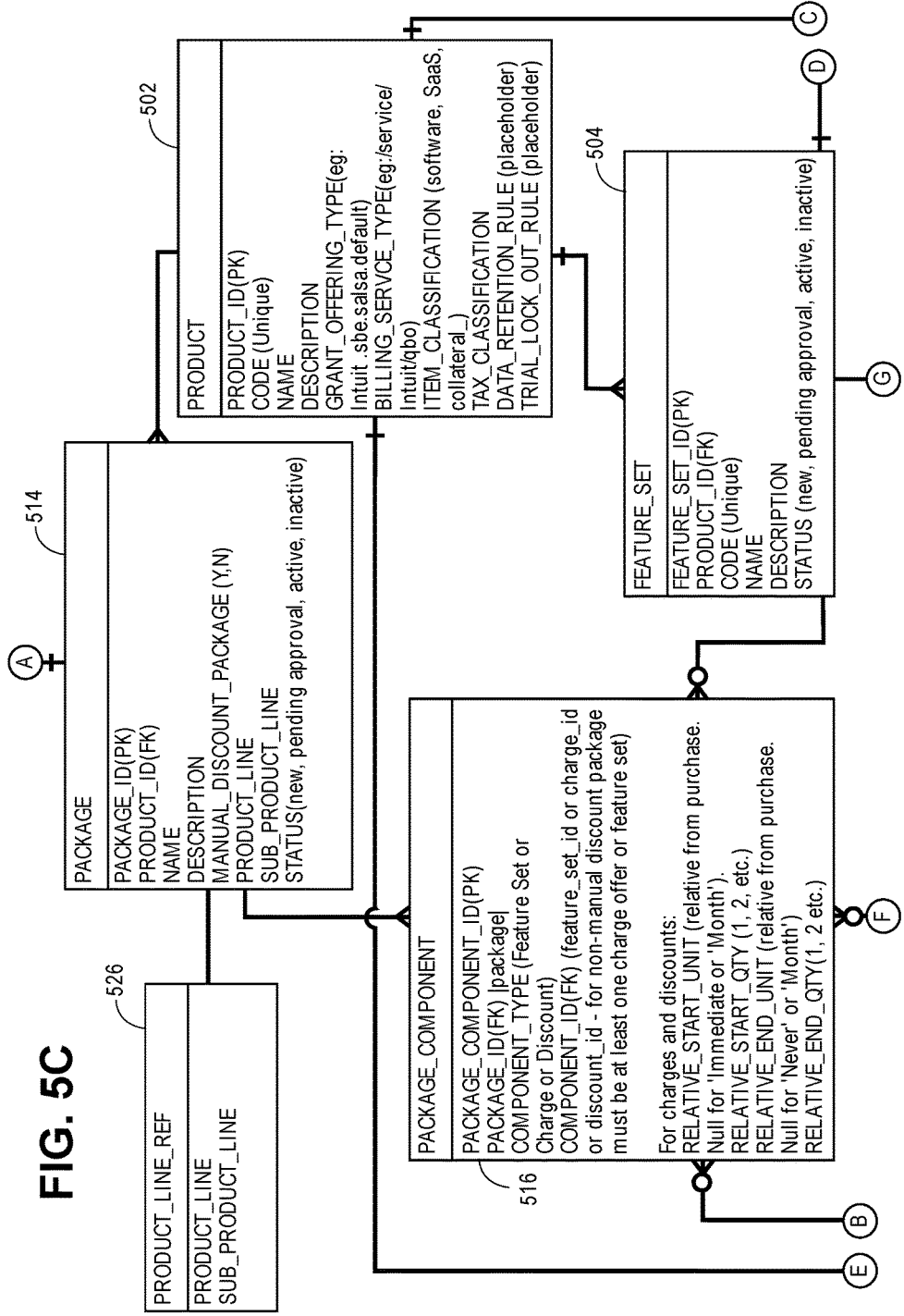
Figure 5D:
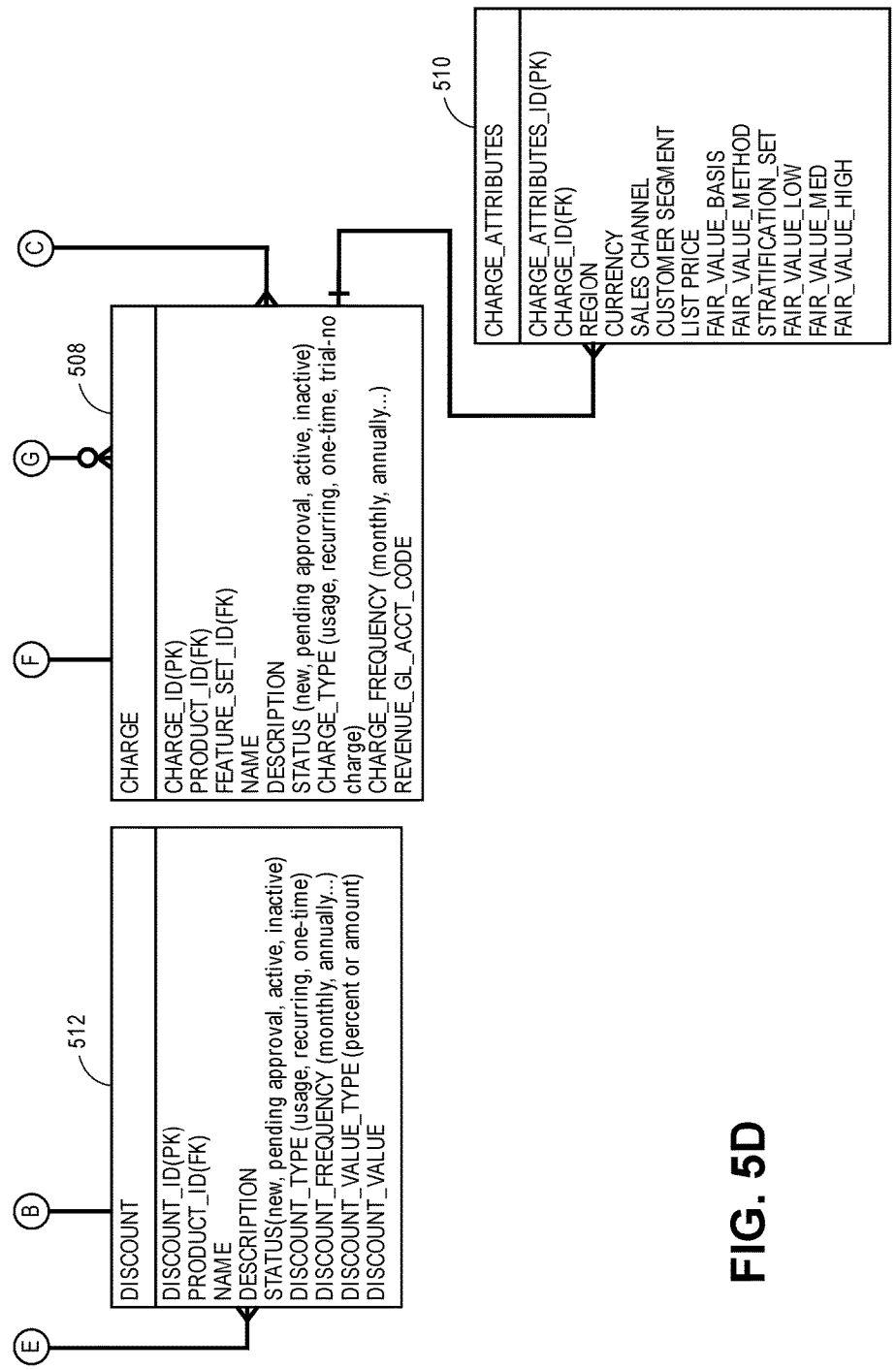
Figure 5E:
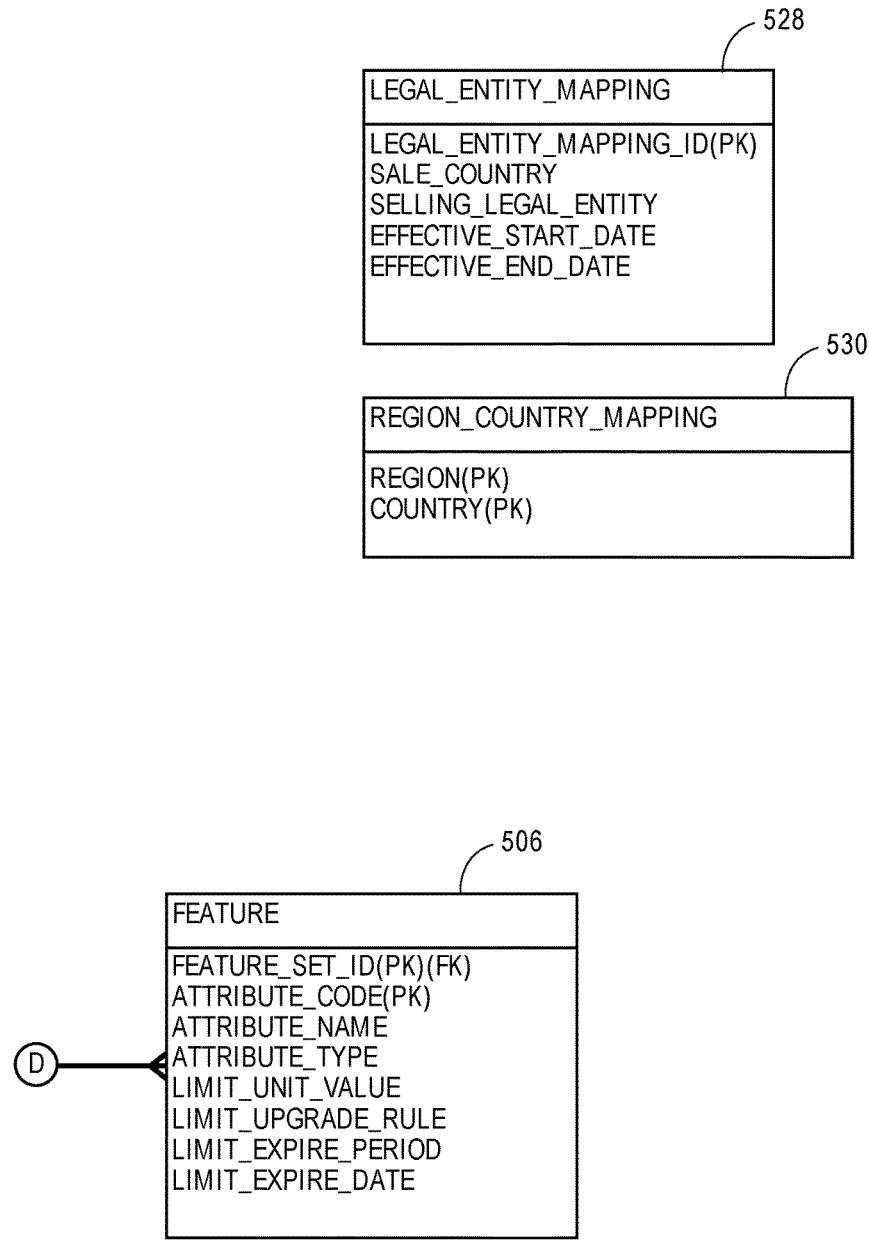

Referring to FIGS. 4A-B, one example of the generated in response to selection of Product 22000009 from the presented list of products, and including fields corresponding to those shown in FIGS. 5 and 6A-B (described in further detail below) that can be populated or modified by an administrator. FIG. 4B illustrates another example of a UI 130 screen generated in response to selection of Offer 20000798 and including fields corresponding to the data model 120 described in further detail with reference to FIGS. 5A-E.

As described in further detail with reference to FIGS. 5A-E, the entitlement-monetization model 120 includes fields for Product element data such as a universal Product ID, Name, Description, Grant offering type, and other fields, which can be selected or entered by the UI 130 by an authorized administrator or Offer Definition Management (ODM) administrator, an authorized person from Finance or Corporate Accounting review (CAR), or other personnel authorized to make decisions about products and product attributes expressed in the entitlement-monetization model 120. A UI screen 130 generated by the ICS system 310a for an Offer element record of the entitlement-monetization model 120 may include fields for Offer record data such as Offer ID, Offer Name, Description, Effective Start Date and Effective End Data.

Referring again to FIGS. 3A-B, the ICS system 310a includes a publication system that includes a publication module or logic 140 and/or associated middleware 141, which is utilized to publish some or all elements of the entitlement-monetization model 120 to spoke computing systems 150, and may do so depending on whether the entitlement-monetization model 120 is in pre-production or has approved to go live for production after approval, testing and validation. One example of a publication or integration platform or middleware 141 that may be utilized for these purposes is the MuleSoft platform available from Intuit Inc. For purposes of publication to spoke computing systems 150, the middleware 141 may utilize various application programming interfaces (APIs) such as Java Database Connectivity (JDBC) API for the JAVA programming language Java (e.g., for communicating with a spoke computing system 150a and to write the entitlement-monetization model 120 to the item data store 110 (e.g., for use as a catalog or item data store) and to data to be utilized in billing to a second spoke computing system 150b (e.g., Billing and Revenue Management (BRM) system, available from Oracle Corporation), and to write charge/fair value matrix data to a REVSTREAM spoke computing system 150c, which is utilized to for revenue compliance, or other interfaces, e.g., depending on whether a spoke computing system 150 is accessed utilizing a different programming language, such as WS/XML as shown in FIG. 3, in order to communicate with a spoke computing system 150 that may operate a separate application such as BRM/Pricing Development Center (PDC). It will be understood that other publishing platforms 140/141 and applications may be utilized and spoke computing systems 150 may be accessed utilizing different interface programming languages and that FIG. 3 is provided as one example of how entitlement-monetization model 120 publication to spoke computing systems 150 may be performed.

Having describes aspects of the ICS system 130a and how they are related to each other for design time configuration of an entitlement-monetization model 120, further details regarding one embodiment of an entitlement-monetization model 120 are described with reference to FIGS. 5A-E.

Referring to FIGS. 5A-E, an entitlement-monetization model 120/500 constructed according to one embodiment and that includes entitlement definition elements 121 and monetization definition elements 122 that are integrated into a single entitlement-monetization model 500 and inextricably tied to each other, is illustrated. As illustrated, the entitlement-monetization model 500 includes multiple elements, tables, objects or records (generally, "element") including those that are only for entitlement definition 121, those that are only for monetization definition 122, and data item elements that include both entitlement and monetization data elements 121, 122.

In the embodiment illustrated in FIGS. 5A-E, an integrated entitlement-monetization data model 500 constructed according to one embodiment includes data item or model elements for product 502, feature set 504, feature 506, charge 508, charge attributes 510, discount 512, package 514, package component 516, offer 518, offer component 520, offer attribute 522, offer transition 524, and other model elements for product line reference 526, legal entity mapping 528 and region country mapping 530.

In the illustrated embodiment, the Product element 502 is associated with, related to, linked to, or cross-referenced with, a Package element 514, a Feature Set element 504, a Discount element 512, and a Charge element 508; the Feature Set element 504 is associated with, related to, linked to or cross-referenced with, the Product element 502, the Package Component element 516, a Feature element 506, and a Charge element 508; the Charge element 508, either directly or as part of a Package 514, is associated with, related to, linked to or cross-referenced with, the Product element 502, the Feature Set element 504, the Package Component element 516, and the Charge Attribute element 510. Further details regarding possible ways data item elements may be structured such that entitlement definitions 121 and monetization definitions 122 are inextricably tied to each other are described in further detail below.

Referring to FIG. 6A, a Product element 502 specifies a base or core software product offering which may be identified, or created, based on the host or administrator identifying the product as satisfying a customer need, or in response to a customer request or feedback. For example, a Product element 502 may be generated for a core product or offering, such as Intuit QUICKBOOKS ONLINE accounting application, or other core software applications including other financial management systems such as payroll applications, and tax return preparation applications, as examples. A Product element 502, configured according to one embodiment, includes fields or attributes:

PRODUCT_ID (PK) (a unique identifier and that serves as a primary key and identifies a core software product or offering), CODE (a unique human readable, non-translatable code for the core Product or Offering (e.g., QBO or QBOP), NAME (product name, such as QUICKBOOKS Online), DESCRIPTION (a more detailed described of the named product (e.g., QuickBooks Online—Cloud Accounting for small business), GRANT_OFFERING_TYPE (references the One Intuit Identity (OII) OFFERING_ID, which is used as the common identification for an offering between the customer-facing or offering application utilized during runtime, and an entitlement provisioning module, or enforcement/access control system, referred to as OII Grant in one implementation (described with reference to FIGS. 16A-C), which generates a response to a customer so that the customer can proceed with using or accessing the requested software product. In other words, the OII Grant module provides for access control, entitlement provisioning to the customer. An example of GRANT_OFFERING_TYPE, for an Offering of QuickBooks Online for Accounts (QBOA), may be Intuit.apd.qboa.

BILLING_SERVICE_TYPE (references a billing spoke computing system type (e.g., service/intuit/qbo))

ITEM_CLASSIFICATION (whether the product identified is software, Software as a Service (SAAS), collateral, etc.

TAX_CLASSIFICATION (which may identify a product class tied to this item (e.g., ASPB) for a tax data management program such as VERTEX tax data management program)

In certain embodiments, a Product element 502 may also include fields or attributes of:

DATA_RETENTION_RULE (rules for determining duration of retention of Product or Offering data and access attributes such as whether customer has read-only access and/or re-subscription rights during that period)

TRIAL_LOCKOUT_RULE (rules for determining a minimum period that a customer that had signed up for a trial needs to wait before the customer can avail of a trial offer on that same service).

FIG. 6B illustrates one example of how a Product element 502 can be populated 610.

Figure 7A:
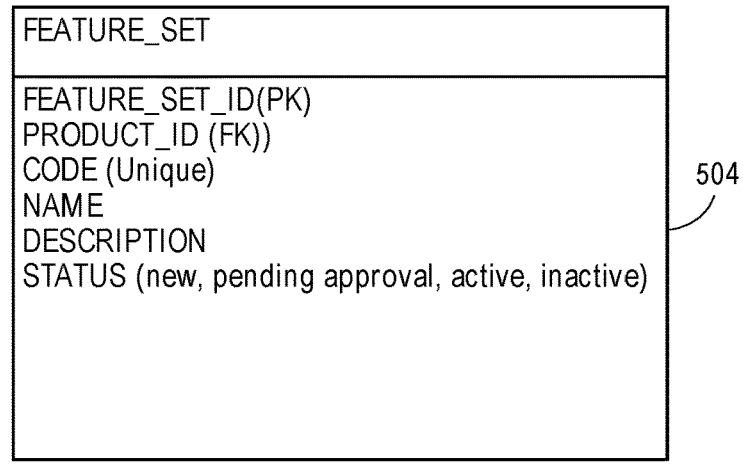

Referring to FIG. 7A, a Feature Set element 504 represents a collection of re-usable Feature elements 506 and limits a Product element 502 in terms of functionality, capabilities, access, etc. A Feature Set element 504 configured according to one embodiment includes fields or attributes:

FEATURE_SET_ID (a unique identifier that serves as a primary key to identify a feature set)

PRODUCT_ID (FK) (a unique identifier that is a foreign key and identifies a core software product or offering), CODE (a unique human readable, non-translatable code for the core Product or offering feature set (e.g., QBO_SIMPLE_START), NAME (feature set name, such as QBO Simple Start), DESCRIPTION (feature set description such QUICKBOOKS Online Plus), STATUS (status for the feature set, whether new, pending approval, inactive or active; status can be set to "inactive" if no active charge and no active PACKAGE is referencing this Feature Set).

Thus, as shown above in FIGS. 6A and 7A, the Feature Set element 504 includes a reference to a portion of the Product element 502.

Figure 7B:
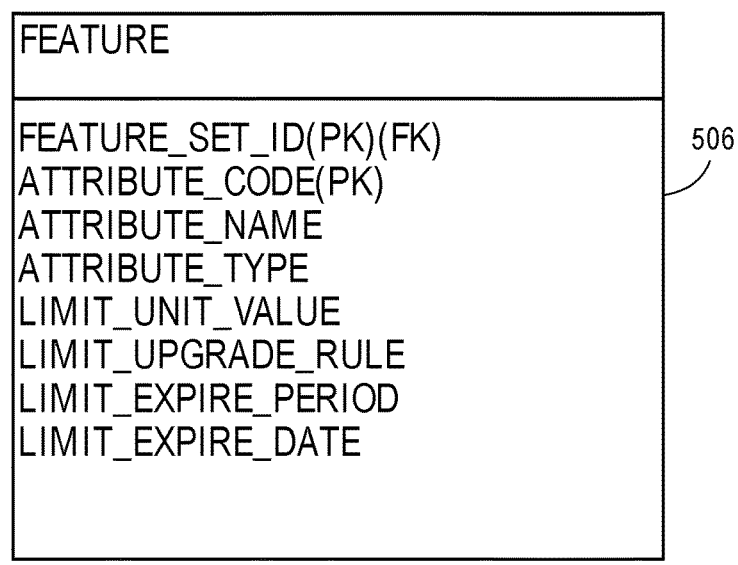

Referring to FIG. 7B, a Feature element 506 defines the feature or limit that is tied to and references a particular Feature Set element 504 and may include fields or attributes:

FEATURE_SET_ID (FK) (PK) (a unique identifier that serves as a foreign key or reference to identify a feature set that feature attributes define)

ATTRIBUTE_CODE (PK) (unique (within a Feature Set 504) human readable, non-translatable code for the core Product or offering feature set (e.g., QBO_SIMPLE_START), ATTRIBUTE_TYPE (defines a type of attribute, which may be, for example, Feature Value, Pre-paid Consumable Resource Limit, Concurrent Resource Limit, Identified Resource Limit, and/or an attribute related to a capability or functionality of the Product)

ATTRIBUTE_NAME (defines the attribute name that applies; for Feature Value attribute types, the actual feature name such as Simple Start" may be utilized by OII Grant Feature; for limit attribute types, the ATTRIBUTE_NAME defines the unit to which the limit applies such as "individual returns," "business returns," "#users," "#employees," "GB of storage" and will be used by OII Grant Limit as the LIMIT_TYPE)

LIMIT_UNIT_VALUE (for "Sign-up" or "Buy now" the LIMIT_UNIT_VALUE indicates the initial unit value or wheat does the customer receive in terms of unites when an Entitled Offering is first established. For upgrades, the LIMIT_UPGRADE_RULE drives how to apply LIMIT_UNIT_VALUE to the Entitled Offering)

LIMIT_UPGRADE_RULE (in cases involving an upgrade, the LIMIT_UPGRADE_RULE indicates whether the unit value associated with the Entitled Offering is replaced with the LIMIT_UNIT_VALUE, or whether LIMIT_UNIT_VALUE is to be added to the unit value)

LIMIT_EXPIRE_PERIOD (if applicable, this refers to the time interval that applies to the limit, and generally would apply to a pre-paid consumable limit. LOV: per month, per year, for example)

LIMIT_EXPIRE_DTE (if applicable, this refers to a hard expiration date/time that applies to the limit for all users; generally, applies to pre-paid consumable resource limit).

Examples of how a Feature Set element 504 and a Feature element 506 may be populated are illustrated in FIGS. 7C-D. FIG. 7C illustrates an example of how respective Feature Set and Feature elements 504, 506 are populated for QBO Essentials, and FIG. 7D illustrates an example of how respective Feature Set and Feature elements 504, 506 are populated for QBO Plus.

Referring to FIG. 8A, a Charge element 508 represents a re-usable monetization of a Feature Set element 504 (i.e., for a specific price for a currency or different regional price within a currency per charge type and charge frequency, such as QBO Plus USD monthly recurring price for Brazil vs. QBO Plus USD monthly recurring price for all other countries in the rest of the world (ROW)). A Charge element 508 configured according to one embodiment includes fields or attributes:

CHARGE_ID (PK) (a unique identifier that serves as a primary key or reference to identify a charge)

PRODUCT_ID (FK) (a unique identifier that is a foreign key and identifies a core software product or offering)

FEATURE_SET_ID (FK) (a unique identifier that serves as a foreign key or reference to identify a Feature Set element 504 that is monetized by a Charge element 508. This reference may be utilized to support a charge for a purchase that does not result in an entitlement)

NAME (charge name displayed on transactional correspondence)

DESCRIPTION (description of charge)

STATUS (status of the charge (e.g., new, pending approval, inactive, active).

Status can be set as "inactive" if there is no active Package element 514 that references the Charge element 508)

CHARGE_TYPE (specifying the type of charge such as on-time, recurring, usage (or trial (no charge)—once a trial is moved out of the BRM spoke computing system 150b; charges of this type will not be published to BRM spoke computing system 150b in embodiments involving enrichment)

CHARGE_FREQUENCY (applicable to "recurring" charges and specifies the frequencies such as monthly, quarterly or annual charge)

REVENUE_GL_ACCT_CODE (GL account used for tracking (deferred) revenue

Referring to FIG. 8B, a Charge Attribute element 510 allows for specification of price terms and eligibility for price terms. A Charge Attribute element 510 configured according to one embodiment may specify a price and fair value for a set of pricing attributes such as Region, Country, Currency, Customer Segment, Sales Channel and may include fields or attributes:

CHARGE_ATTRIBUTE_ID (PK) (a unique identifier that serves as a primary key or reference to a charge attribute)

CHARGE_ID (FK) (a unique identifier that serves as a foreign key or reference to identify a charge for which the Charge Attribute element 510 map defines eligibility attributes (e.g., based On Region, Customer Segment)

REGION (a continent, country or other region, such as Europe, Canada, rest of world (ROW), to which a Charge Attribute element 510 applies CURRENCY (a currency code such as USD, HKD, etc.)

CUSTOMER_SEGMENT (a pre-defined customer segment or category of users, such as "accountant" or "business' or 'individual"; "default" may represent a case in which a customer segmentation has not been specified)

SALES_CHANNEL (a sales channel such as "direct" or "retail")

LIST_PRICE (specifies a list price that applies to a specific set of pricing attributes, and in embodiments involving enrichment of a billing spoke computing system 150b, the actual price may be set as part of a charge offer enrichment in the billing spoke computing system 150b rather than by a list price)

FAIR_VALUE_BASIS (specifies the revenue recognition basis such as Vendor Specified Objective Evidence (VSOE) or Best Estimated Selling Price (BESP)

FAIR_VALUE_METHOD (specifies the actual method used by a revenue recognition application executed by a spoke computing system 150c (such as REVSTREAM revenue recognition system).

STRATIFICATION_SET (a rule set utilized by a revenue recognition application executed by a spoke computing system 150c for complex allocation based on select transaction values)

FAIR_VALUE_LOW (specifies a low point of a Fair Value for the specified price point FAIR_VALUE_MED (specifies a medium point of Fair Value for the specified price point)

FAIR_VALUE_HIGH (specifies a high point of Fair Value for the specified price point)

Figure 8C:
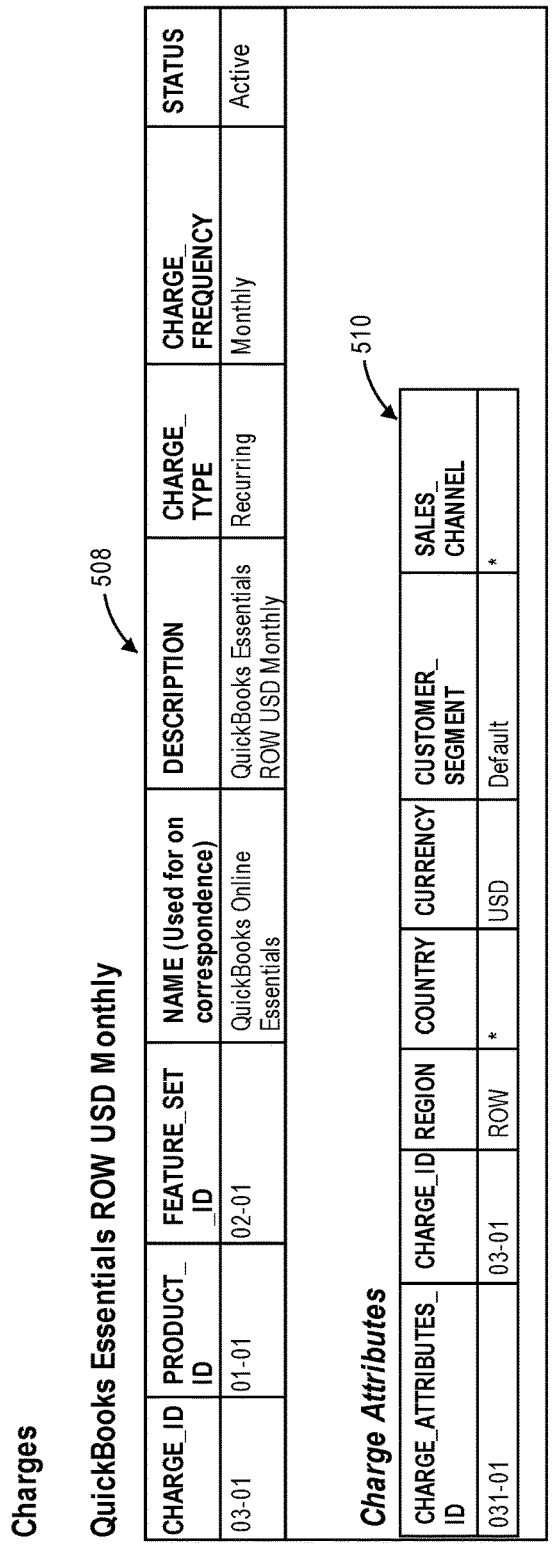

Examples of how Charge/Charge Attribute elements 508, 510 may be populated are illustrated in FIGS. 8C-F. FIG. 8C illustrates examples of populated Charge/Charge attribute elements 508, 510 for QBO Essentials, Rest of World (ROW), U.S. Dollar (USD), and Monthly charges. FIG. 8D illustrates examples of populated Charge/Charge attribute elements for QBO Essentials, Rest of World (ROW), U.S. Dollar (USD), and rather than a Monthly charge as shown in FIG. 8C, this example involves a monthly trial. FIG. 8E illustrates examples of populated Charge/Charge attribute elements 508, 510 for QBO Plus (rather than a Feature Set element 504 for "Essentials"), Rest of World (ROW), U.S. Dollar (USD), and Monthly Charge, and FIG. 8F illustrates an example similar to that shown in FIG. 8E except that this example involves a monthly trial.

Thus, as shown in the entitlement-monetization model 500 in FIGS. 5A-E and FIGS. 8A-F, the Charge/Charge Attribute elements 508, 510 can be used to specify monetization in the form of price data and eligibility for that price data, together with PRODUCT_ID and FEATURE_SET cross references (in the model with separate CHARGE and CHARGE ATTRIBUTE elements 508, 510).

Referring to FIG. 9A, a Discount record 512 represents a re-useable discount that may be applied to a charge and may include the following fields or attributes:

DISCOUNT_ID (PK) (a unique identifier that serves as a primary key or reference to a discount)

PRODUCT_ID (FK) (a unique identifier that is a foreign key and identifies a core software product or offering)

NAME (discount name)

DESCRIPTION (description of a discount)

STATUS (a discount status such as "New," "Pending Approval," "Inactive," and "Active," and in the case that no active Package is referencing the discount, the status can be set to inactive)

DISCOUNT_TYPE (type of discount such as "One-Time," "Recurring," "Usage.' A discount of a certain type applies to a Charge of the same type)

DISCOUNT_FREQUENCY (if applicable, in cases involving recurring discounts, a discount frequency may be, for example, monthly, quarterly or annual)

DISCOUNT_VALUE_TYPE (specifies discount in the form of a discount percentage or discount amount DISCOUNT_VALUE (a value of the discount)

FIG. 9B illustrates one example of a populated Discount element 512 involving different Discount elements for the same Product (01-01).

Referring to FIG. 10A, a Package element 514 represents a re-useable data structure for a specific Product element 502 that includes one or more Feature Set elements 504 or Feature elements 506 and one or more Charge elements 508 or Charge Attribute elements 510 that are tied to respective one or more Feature Set element 504 and, if applicable, any Discount elements 512 to be applied to those Charge elements 508 as noted above. A Package element 514 represents a service bundle packaged within an Offer element 518 for which a customer signs-up to ensure that the customer is entitled to and charged correctly with any applicable discount applied. A "non-concession" Package element 514 includes either a feature set element 504 or a charge—if a charge that references a feature set, then the non-concession package also includes the referenced feature se 504. A "concession" Package 514 includes discounts only.

As shown in FIG. 10A, a Package element 514 configured according to one embodiment includes fields or attributes including:

PACKAGE_ID (PK) (a unique identifier that serves as a primary key or reference to a package)

PRODUCT_ID (FK) (a unique identifier that is a foreign key and identifies a core software product)

NAME (package name)

DESCRIPTION (package description)

PRODUCT_LINE (for reporting purpose)

MANUAL_DISCOUNT_PACKAGE (If set (Y), it marks this package as available to the agent for applying manual discounts. If set (Y), this package CANNOT include a charge or feature set. If set (Y), this package CANNOT be included in an Offer.

SUB_PRODUCT_LINE (for reporting purpose)

STATUS (The Package status (new, pending approval, inactive, active). The status can be set to 'inactive' if no active Offer is referencing this Package.)

A Package Component record 516, which is related or linked to a Discount Record 512, Charge Record 508 and Feature Set Record 504, provides for re-use of Feature Set elements 504, Charge elements 508 and Discount elements 512 across different Package elements 514 and allows for defining how a certain component is utilized in the context of a specific Package element 514. For these purposes, a Package Component element 516 configured according to one embodiment includes fields or attributes including:

PACKAGE_COMPONENT_ID (PK) (a unique identifier that serves as a primary key to identify a Package Component)

PACKAGE_ID (FK) (a unique identifier that serves as a foreign key or reference to a Package for which the Package Component is specified)

COMPONENT_TYPE (indicates whether a Package Component is Feature Set, a Charge or a Discount)

COMPONENT_ID (FK) (a unique identifier that serves as a foreign key to identify a Feature Set (Feature Set ID), a Charge (Charge ID), or a Discount (Discount ID). In the case of a non-manual Discount package, or a Package included in an Offer, there is at least one Charge or Feature Set. Manual Discount Packages include only discounts.)

RELATIVE_START_UNIT (indicator of whether the Component, when purchased, is effective immediately, or whether the Component is a unit interval from purchase. For example, when the Charge for a one-month trial starts immediately upon purchase). No value in this field indicates "immediate" by default or other pre-determined default such as "month," etc.)

RELATIVE_START_QTY (If Relative_Start_Unit is populated then, this indicates the number of unit offset from purchase (e.g., if unit is set to 'Month', then quantity set to "1" indicates 'relative start is one month from purchase'.)

RELATIVE_END_UNIT (Indicates whether the Component, when purchased, is effective forever (never ends), or whether the Component ends at some unit interval from purchase (e.g., Trial Charge ends one month after purchase). No value in this field indicates 'Never' or some other pre-determined default)

RELATIVE_END_QTY (indicates number of unit offset from purchase. Thus, if unit is "Month" then quantity is set to "1" to indicate "relative end is one month from purchase")

Figure 10D:
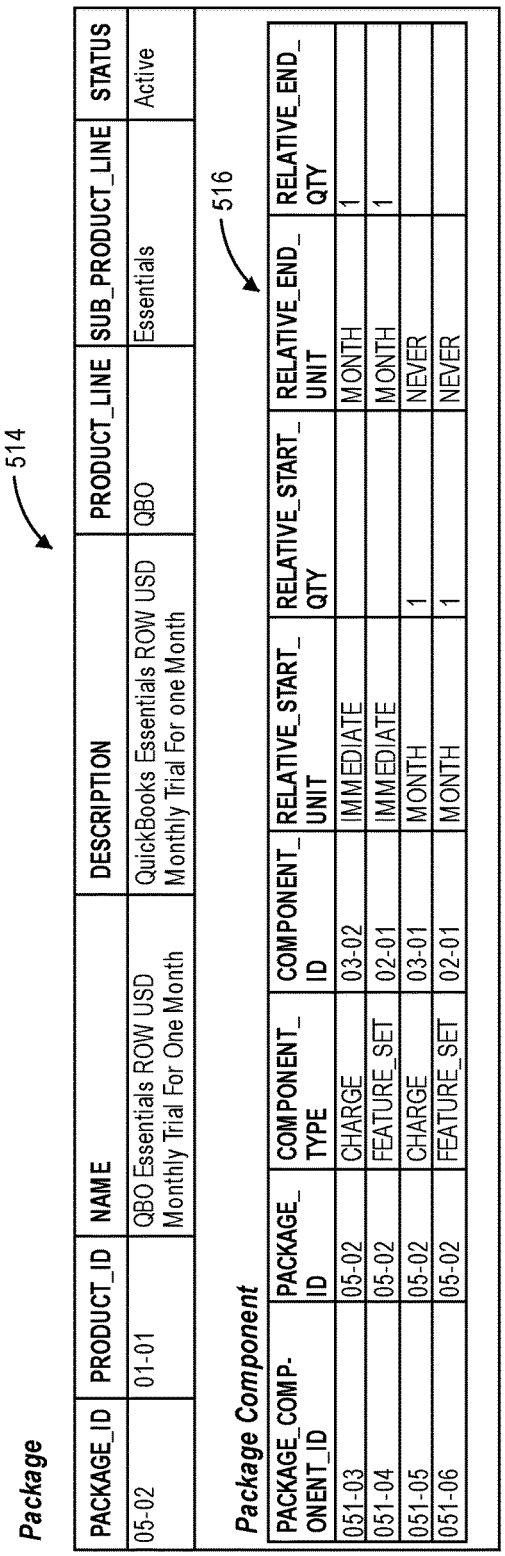

Examples of how a Package element 514 and a Package Component element 516 may be configured according to embodiments are illustrated in FIGS. 10C-H. FIG. 10C illustrates an example of how Package and Package Component elements 514, 516 may be populated for QBO Essentials, for Rest of World (ROW), U.S. Dollar (USD), Monthly Charge for a Base Edition. FIG. 10D illustrates an example of how Package and Package Component elements 514, 516 may be populated for QBO Essentials, for Rest of World (ROW), U.S. Dollar (USD), but for one month. FIG. 10E illustrates an example of how Package and Package Component elements 514, 516 may be populated for QBO Essentials, for Rest of World (ROW), U.S. Dollar (USD), for Monthly Charge, and for a "Buy Now" options while offering a 30% discount for a 12 month purchase. FIG. 10F illustrates examples of how Package and Package Component elements 514, 516 may be populated for a different Feature Set element for QBO Plus, for Rest of World (ROW), U.S. Dollar (USD), for a Base Edition. FIG. 10G illustrate an example of how Package and Package Component records may be populated for QBO Plus, for Rest of World (ROW), U.S. Dollar (USD), but for one month, and FIG. 10H illustrates an example of how Package and Package Component elements 514, 516 may be populated for QBO Plus, for Rest of World (ROW), U.S. Dollar (USD), for Monthly Charge, and for a "Buy Now" options while offering a 30% discount for a 12 month purchase.

Referring to FIG. 11A, an Offer element 518 represents a bundle that is presented and provided to the customer. A single Offer may involve a single product or bundle multiple products into a single offer. An Offer element 518 configured according to one embodiment includes fields or attributes:

OFFER_ID (PK) (a unique identifier that serves as a primary key to identify an Offer)

OFFER_TYPE (identifies a type of offer, such as "Trial" or "Paid" offer)

NAME (an Offer Name)

DESCRIPTION (an Offer description)

TRIAL_UNIT (indicates a unit of a trial, such as "Day," Week" or "Month")

TRIAL_DURATION (indicates a trial duration, such as 1 week, 1 month, 2 months, etc.)

STATUS (indicates the status of an Offer, such as "New," "Pending Approval" (e.g., approval by accounting or finance of the host or administrator), "Inactive" or "Active"). Active and Current offers are eligible for purchase by a customer).

EFFECTIVE_START_DATE
EFFECTIVE_END_DATE

Referring to FIG. 11B, an Offer Component element 520 provides for re-usability of Package elements across different Offer elements 518. An Offer Component element 520 configured according to one embodiment includes fields or attributes:

ID (PK) (a unique identifier that serves as a primary key to identify an Offer Component)

OFFER_ID (FK) (a unique identifier that serves as a foreign key to identify an Offer)

PACKAGE_ID (FK) (a unique identifier that serves as a foreign key to identify the Package that is referenced by the Offer tied to the Offer Component)

Referring to FIG. 11C, an Offer Attribute element 522 allows for specifying a set of five attribute values (Region, Country, Currency, Customer Segment & Sales Channel) that determine eligibility for an Offer 520. The logical data model allows for the same offer to support multiple rows, (due to decision to have a flat implementation). An Offer Attribute element 522 configured according to one embodiment includes fields or attributes:

ID (PK) (a unique identifier that serves as a primary key to identify an Offer Attribute)

OFFER_ID (FK) (a unique identifier that serves as a foreign key to identify an Offer for which Offer Attributes define eligibility)

REGION (identifies a region such as Europe, Rest Of World (ROW), or other country or pre-defined region)

CURRENCY (ISO Currency code (e.g., USD, HKD, etc.)

CUSTOMER_SEGMENT (identifies a pre-determined segment such as "Accountant," and "Default" may apply if a Customer Segment has not been specified)

SALES_CHANNEL (identifies a sales channel such as "Direct" or "Retail" sales channel)

Referring to FIG. 11D, an Offer Transition element 524 defines target Offer elements 518 to which a customer can transition or "upgrade" to from a currently active offer or Product element 502. An Offer Transition element 524 configured according to one embodiment includes fields or attributes:

OFFER_TRANSITION_ID (PK) (a unique identifier that serves as a primary key to identify an Offer Transition)

TRANSITION_FROM_OFFER_ID (identifies the current or active product or offer from which a transition is to be implemented)

TRANSITION_TO_OFFER_ID (identifies a product or offer to which a transition from the current or active product is to be implemented)

TRANSITION_TYPE (specifies a type of transition such as "Upgrade" or "Re-Subscribe")

Figure 11E:
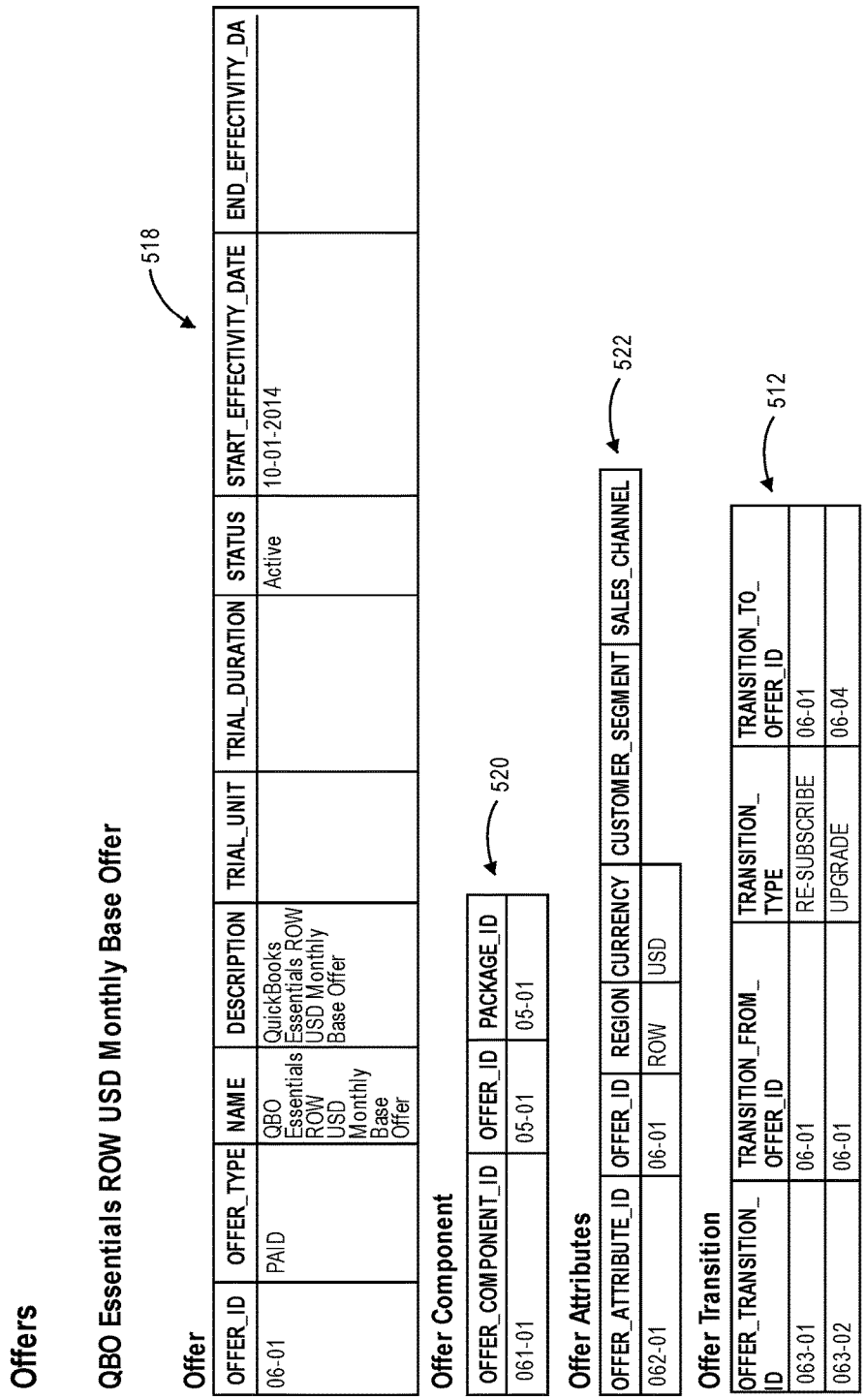
Figure 11H:
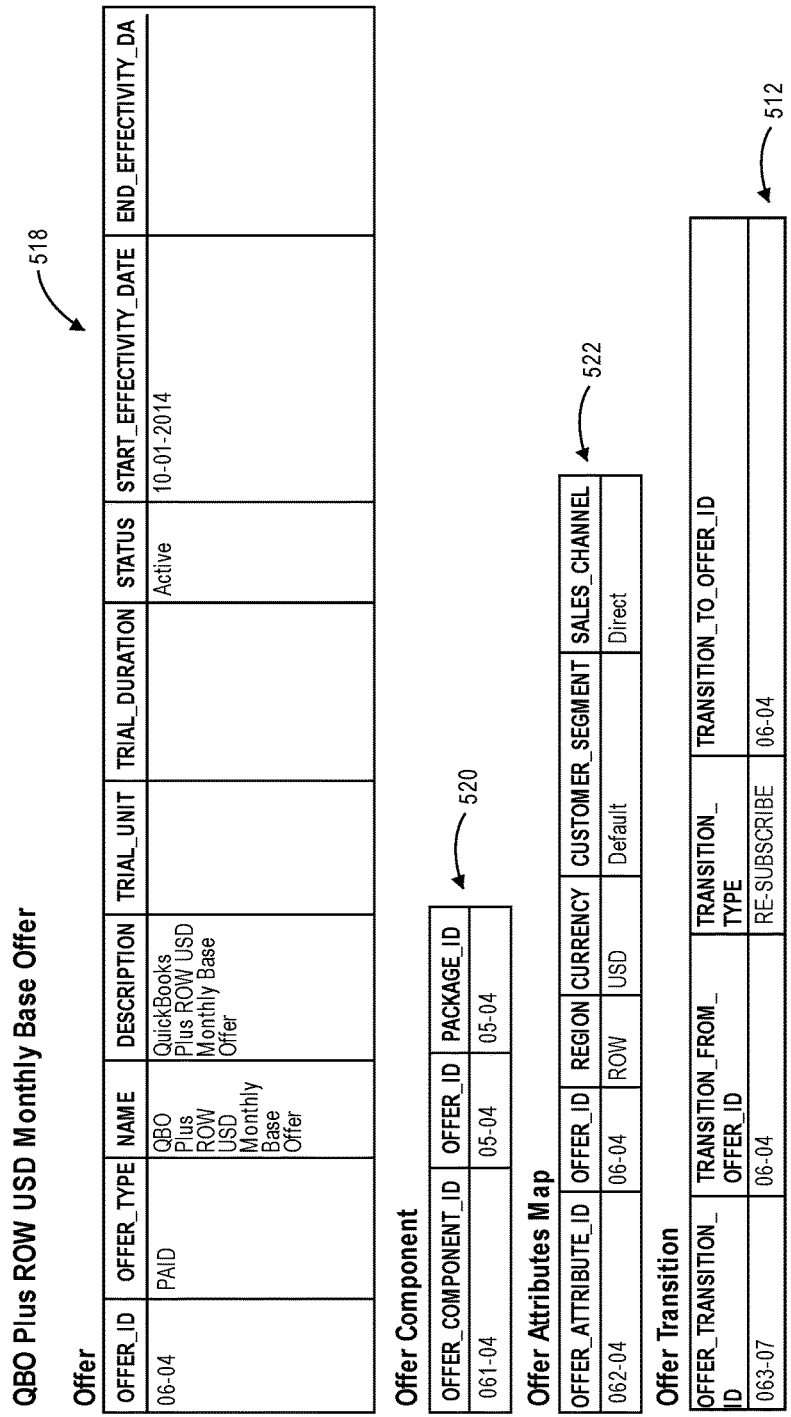
Figure 11J:
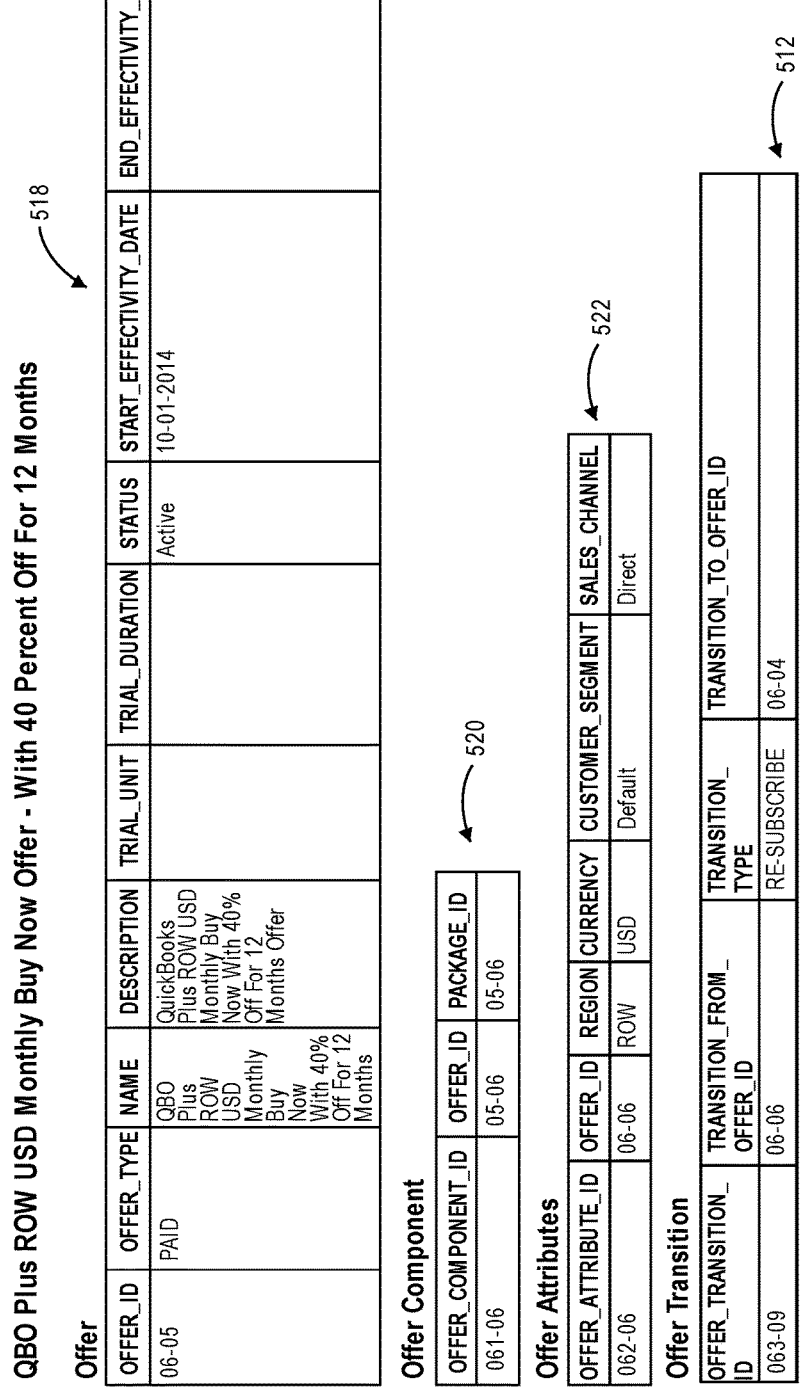

FIGS. 11E-J illustrate examples of how Offer, Offer Component, Offer Attribute and Offer Transition elements 518, 520, 522, 524 may be populated for different Packages/Feature Se elements 514, 504. FIG. 11E illustrates an example involving population of Offer, Offer Component, Offer Attribute and Offer Transition elements 518, 520, 522, 524 for QBO "Essentials," Row ("Rest Of World"), USD (payment in U.S. dollar currency), and a base offer with a monthly payment. FIG. 11F illustrates an example involving population of Offer, Offer Component, Offer Attribute and Offer Transition elements 518, 520, 522, 524 for QBO "Essentials," Row ("Rest Of World"), USD (payment in U.S. dollar currency), and rather than a base offer with a monthly payment, a 1 month trial offer (as reflected in Offer (Trial_Unit=Month). FIG. 11G illustrates an example involving population of Offer, Offer Component, Offer Attribute and Offer Transition elements 518, 520, 522, 524 for QBO "Essentials," Row ("Rest Of World"), USD (payment in U.S. dollar currency), and rather than a base offer with a monthly payment or a one-month trial offer, this example involves a monthly charge for a "Buy Now" option (as reflected in Offer (Trial_Unit=Month), e.g., as referenced in the Name and Description of the Offer record 518. FIG. 11H illustrates an example involving a different Package/Feature Set of QBO "Plus" rather than QBO "Essentials" and involves population of Offer, Offer Component, Offer Attribute and Offer Transition elements for QBO "Essentials," Row ("Rest Of World"), USD (payment in U.S. dollar currency), and a based offer for a monthly charge. FIG. 11I illustrates an example involving a different Package/Feature Set of QBO "Plus" rather than QBO "Essentials" and involves population of Offer, Offer Component, Offer Attribute and Offer Transition elements for QBO "Essentials," Row ("Rest Of World"), USD (payment in U.S. dollar currency) for a one-month trial offer, rather than a base offer for a monthly charge, and FIG. 11J illustrates an example for QBO Essentials, ROW, USD, and including a 40% discount for a 12 month purchase.

Referring again to FIGS. 5A-E, in the illustrated embodiment, the entitlement-monetization model 500 also includes a Product Line Reference element 526 that may be utilized to define Product Line and Sub-Product Line categories for reporting purposes. Attributes of a Product Line Reference record include:

PRODUCT_LINE (which provides for user defined values representing a product line)

SUB_PRODUCT_LINE (utilized to define values representing sub-product line under a product line)

Further, in the illustrated embodiment, the entitlement-monetization model also includes a Legal Entity Mapping record 528 enables the item data store spoke computing system 150c (also referred to as WEBS App), to determine the selling Intuit Legal Entity based on the country of sale.

The sales transaction (order) and account are stamped with this Legal Entity. Once determined, the Legal Entity is used for future processing such as Cybersource Merchant ID derivation, stamped on BRM customer Account, for determining the company segment of GLID, and tax calculation, sent to Correspondence system for branding etc.).

This element supports date effectivities to enable changing the Selling Legal Entity for a sale country over time, if required (e.g., Sales from Australia are funneled into Intuit SG, until a Intuit Australia is established and functionality required to support moving Australia sales into the new Legal Entity is implemented at which point the old mapping record can be end-dated and a new one created). Attributes of a Legal Entity Mapping record may include:

LEGAL_ENTITY_MAPPING_ID (PK) (a unique identifier and that serves as a primary key and identifies a legal entity mapping)

SALE_COUNTRY (PK) (identifies an ISO country code)

LEGAL_ENTITY (identifies an Intuit Legal Entity that is a selling party (e.g., SG—Intuit Singapore)

EFFECTIVE_START_DATE
EFFECTIVE_END-DATE

In the illustrated embodiment, the entitlement-monetization model 500 also includes a Region to Country Mapping element 530 that provides for defining the countries that fall within a pricing region. The 'Region' offer/charge attribute provides a way to set a single price point/offer for a group of countries. Attributes of a Region to Country Mapping element may include:

REGION (PK) (a continent, country or other region, such as Europe, Canada, rest of world (ROW), to which a charge attribute record applies)

COUNTRY (PK) (ISO country code)

Referring to FIGS. 12A-C, and referring again to FIGS. 1 and 2A-C, having described how an entitlement-monetization model 500 may be configured to integrate entitlement definitions 121 and monetization definitions 122 into a single, integrated entitlement-monetization model 500, system flow diagrams of FIGS. 12A-C illustrate how the entitlement-monetization model 500 may be utilized to generate different Package elements 514 and Offer elements 518 for a base offer, a discount offer and a trial offer.

Figure 12A:
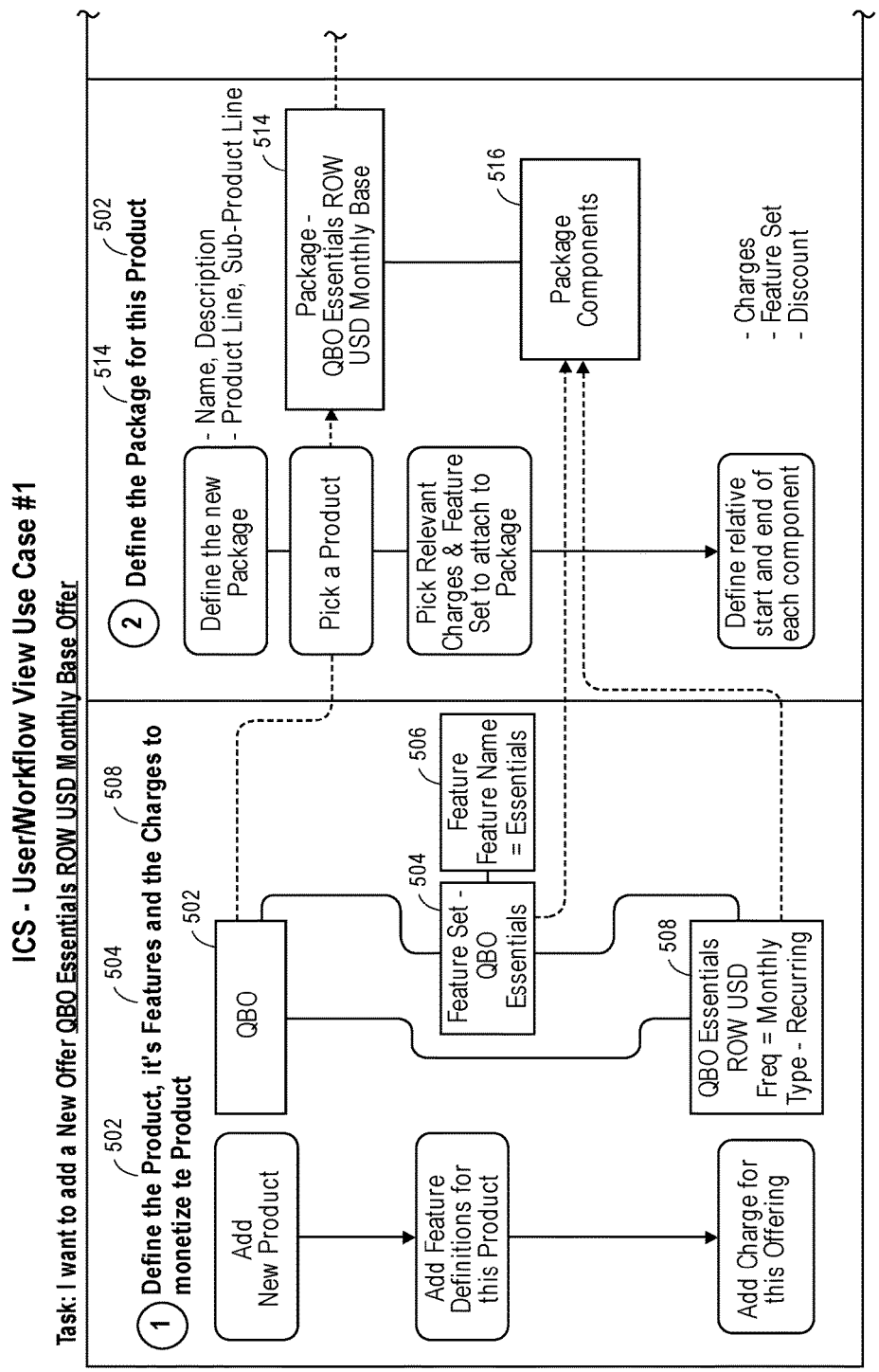
FIGS. 12A-F are respective system flow diagrams of different use cases in which a the entitlement-monetization model shown in FIGS. 5A-E is used to define a product, features and charges to monetize the product, define a package for the product, and create an offer, for different cases involving a base monthly charge offer, a discount, and a trial offer.

FIG. 12A is a system flow diagram that illustrates how the entitlement-monetization model 500 is used to define a product (QBO) via Product element 502, the Feature elements 506 or Feature Set element 504 for QBO (e.g. "Essentials" and Charge or Charge Attributes 510 (e.g., Rest of World, USD, Monthly Recurring charge). The Feature Set element 504 and the Charge/Charge Attributes elements 508, 510 are integrated into a Package element 514 which, as described above, enable re-usability of Feature Set elements 504, Charge elements 508 and Discount elements 512 across different Package elements 514. These are used to define a Package element 514 which, in the illustrated example, is for QBO, Essentials, Rest of World (ROW), charges in U.S. Dollars (USD), monthly, base. This Package element 514 is utilized to generate an Offer element 518 that includes specific offer terms applicable to the Package element 514 (e.g., including effective dates, offer type) with corresponding Offer Attribute elements 522 and an Offer Transition element 524 (if applicable).

Figure 12B:
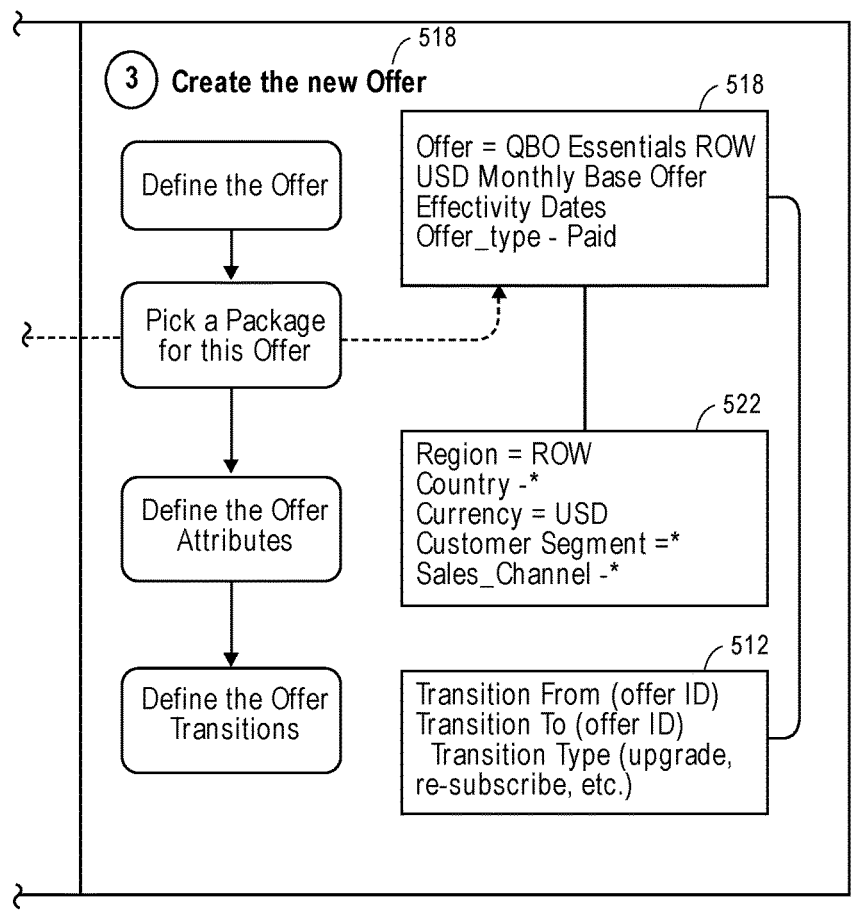

FIG. 12B is a system flow diagram that includes definitions discussed with reference to FIG. 12A above (including Product: QBO, Feature Set: Essentials, Charge: ROW, USD, Monthly, Recurring), and further integrates a Discount element 512 (30% recurring monthly discount) into a second or different Package 514. Thus, FIG. 12B further illustrates the "modular" nature and re-usability of elements of an entitlement-monetization model 500, e.g., re-use of Product 502, Charge 508 and Feature Set 504 data model 500 elements. A second or different Offer element 518 based on the second Package element 514 (which embodies the Discount element 512) and including specific offer terms applicable to the Package element 514 is generated.

Figure 12C:
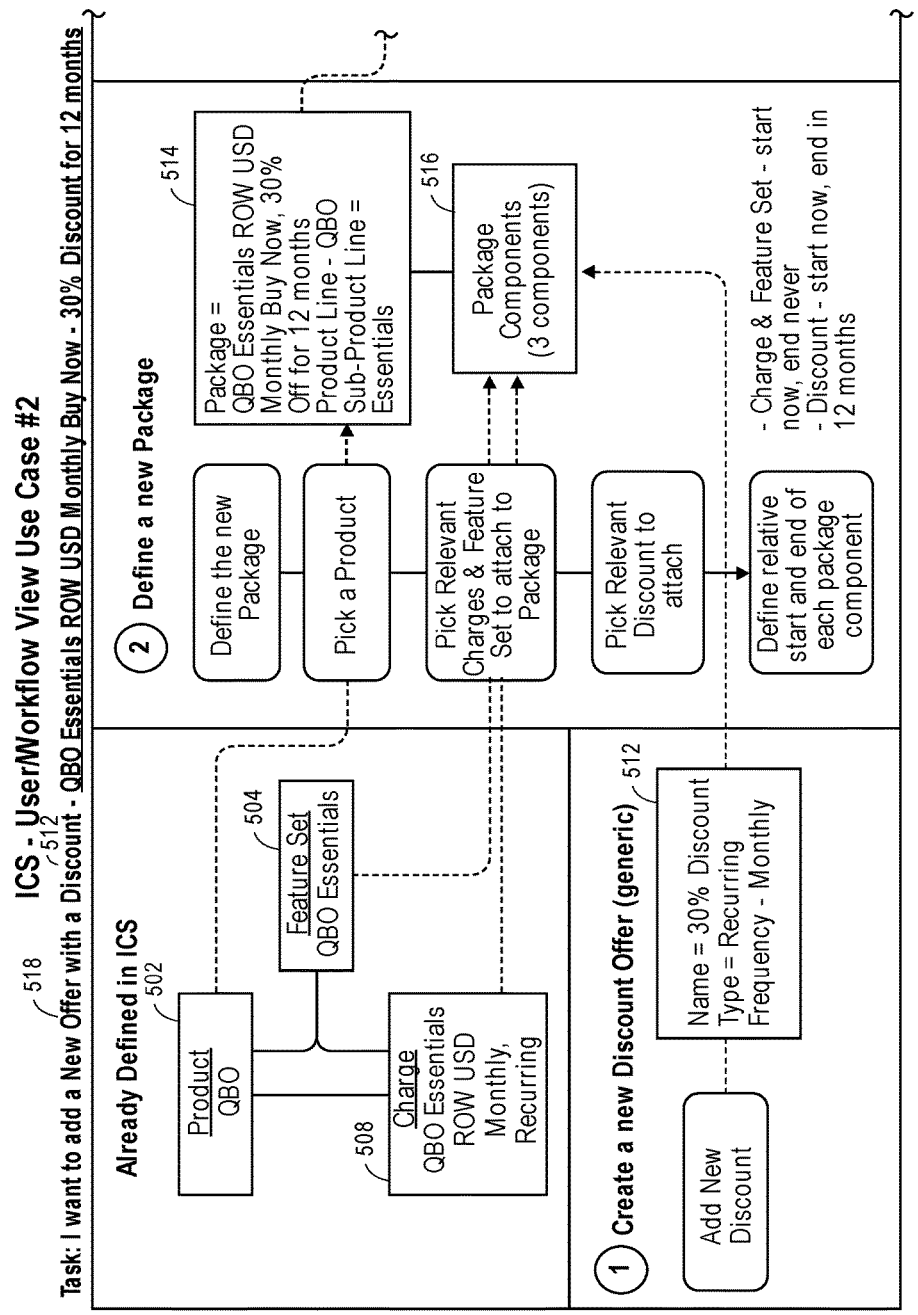
Figure 12D:
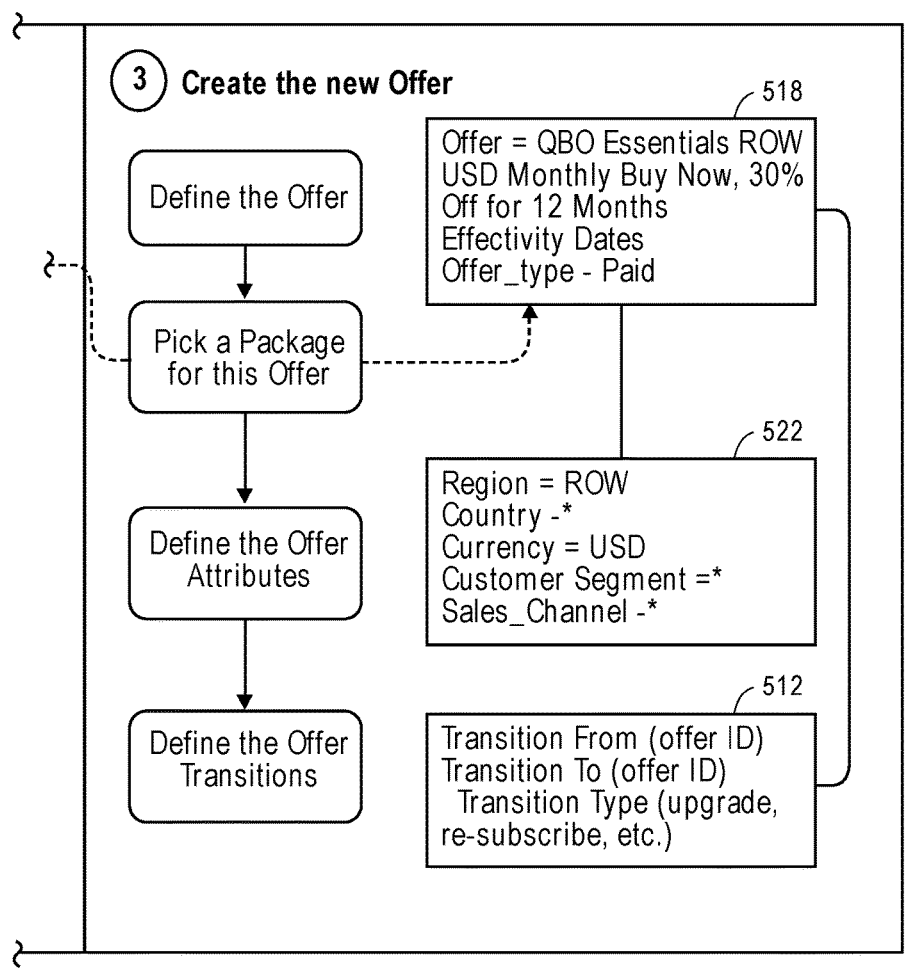
Figure 12E:
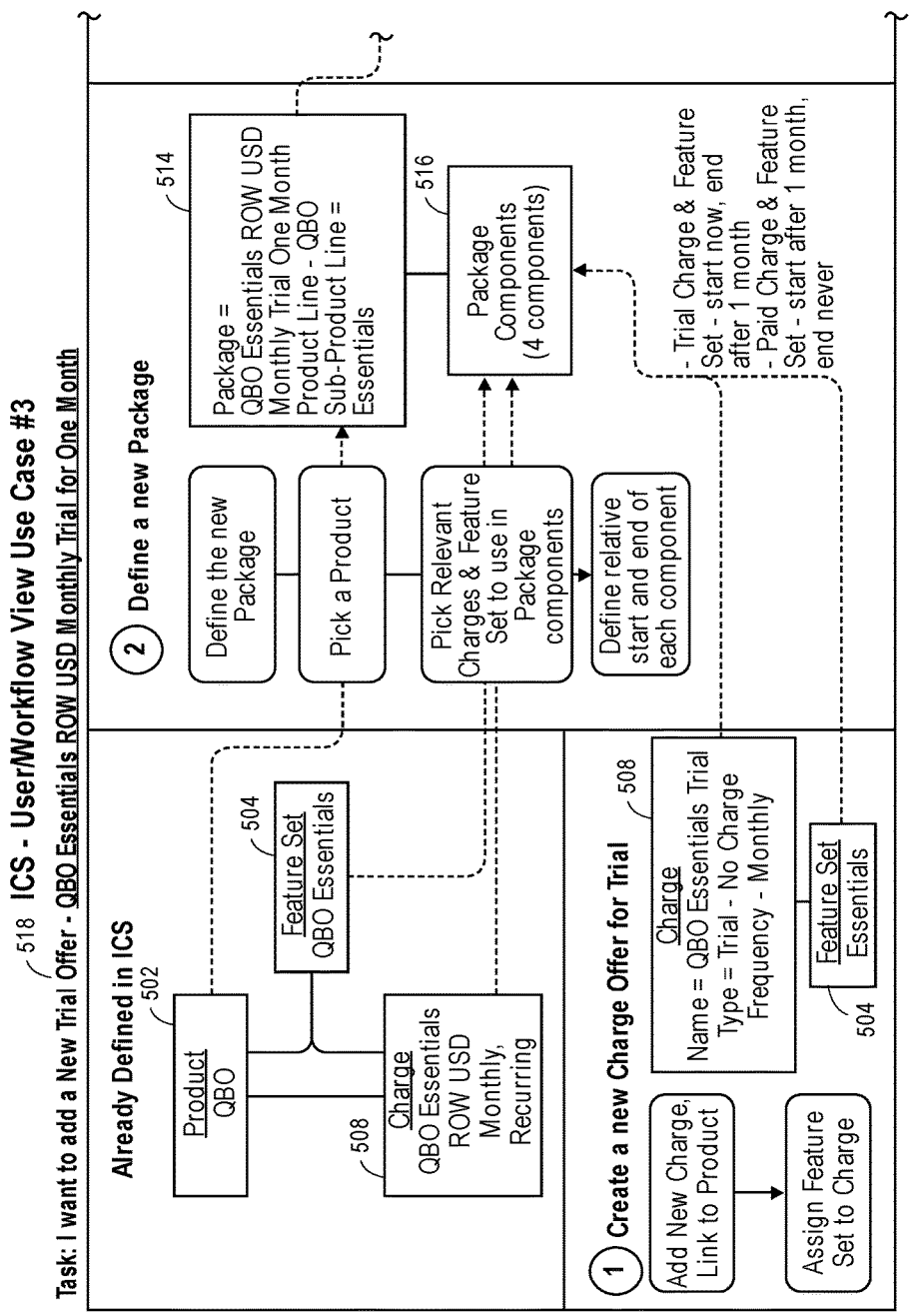
Figure 12F:
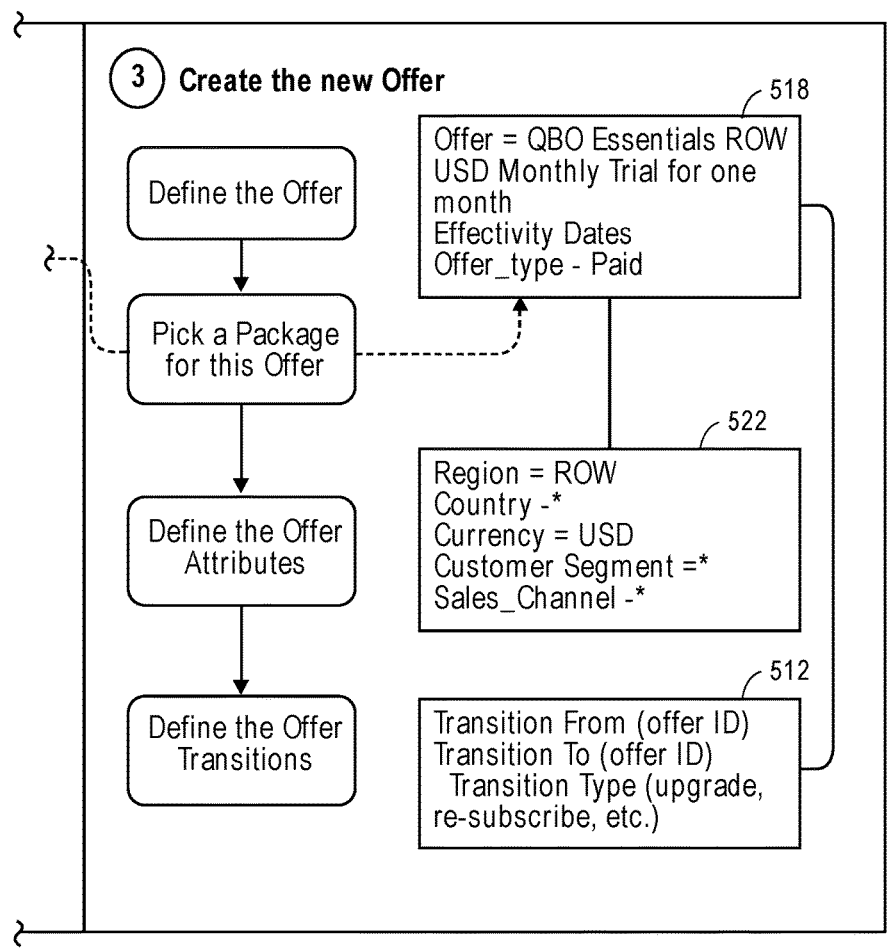

FIG. 12C is yet another system flow diagram that illustrates another example of implementation of embodiments and includes definitions discussed with reference to FIG. 12A above (including Product: QBO, Feature Set: Essentials, Charge: ROW, USD, Monthly, Recurring), and further integrates a no-charge trial Offer element 518 into a different Feature Set element 504 and Package element 514. Thus, FIG. 12B further illustrates the "modular" nature and re-usability of elements of an entitlement-monetization model 500, e.g., re-use of Product 502, Charge 508 and Feature Set 504 model 500 elements. A third or different Offer element 518 based on the third Package element 514 (which embodies the trial offer) and including specific offer terms applicable to the package is generated.

Referring again to FIGS. 1 and 3A-B, after the entitlement-monetization model 500 has been generated as described above, the publishing system/middleware 140/141 is utilized to publish the entitlement-monetization data model 500, or a portion thereof (500p, "p" referring to "portion") to runtime spoke computing systems 150a-c, which are utilized for runtime processing (as distinguished from deign time model 500 configuration and definition).

As described above, spoke computing system 150a-c include a first spoke computing system 150a that that interfaces with a customer facing application 160, a second spoke computing system 150b that is a billing spoke computing system and a third spoke computing system 150c that is a revenue recognition or revenue management spoke computing system.

In one implementation, all of the entitlement-monetization model 500 elements are published to the first spoke computing system 150a, also referred to as a catalog, item data store, or WEBS Items Data store 510a, which supports interactions with the customer computer via the customer-facing application 160 and other spoke computing systems 150. According to one embodiment, no subsequent mapping, enrichment or other modification is required for publication to the first spoke computing system 150a.

The second or billing spoke computing system 150b (identified as BRM/PDC) supports Package, Bundle, Discount and Charge Offer element configurations, and these item definitions of the entitlement-monetization model 500 are published to the billing spoke computing system 150b, and mapped and enriched as necessary. For example, terms of the of the entitlement-monetization model 500 may be mapped to terms utilized by the billing application (e.g., BRM/PDC) hosted by the second spoke computing system 150b, or certain types of data may be added to the entitlement-monetization model 500 data, e.g., for interfacing with a billing application of the spoke computing system 150b that is a separate or independent billing application that utilizes different types or data or data identifiers compared to the entitlement-monetization model, or that may not include all of the data required to implement certain billing functions performed by the second spoke computing system 150b. For example, in one embodiment, the ICS system 310a is integrated with an off-the-shelf billing application BRM/PDC that operates using a terms or data structures, in this example, and with further reference to mapping/enrichment 1300 table shown in FIG. 13, certain terms of the entitlement-monetization model 500 are converted or mapped to other terms that can be processed by the billing application (reflected in column 1302).

Figure 13:
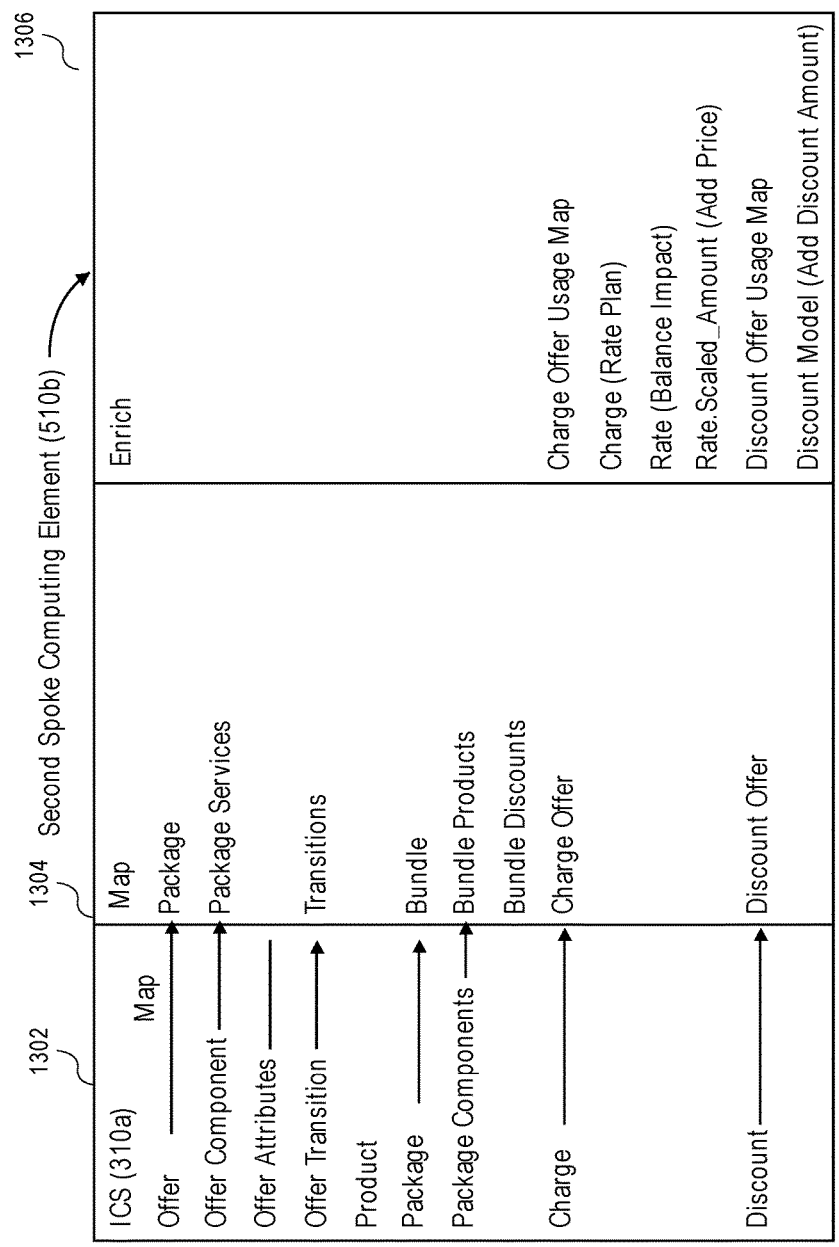
FIG. 13 is a table illustrating how publishing of all or selected elements of the entitlement-monetization model to spoke computing systems may involve mapping of model terms to spoke computing terms or enriching the model data with additional data for use by a spoke computing system, such as enrichment of charge and discount data for use billing spoke computing system.

For example, as shown in columns 1302, 1304 of FIG. 13, "Offer" of the entitlement-monetization model 500 is converted to "Package" such that data of a populated "Offer" element 518 (e.g., as discussed with reference to FIG. 11A), corresponds to "Package" data in the billing application of the spoke computing system 150b. As another example, "Package" of the entitlement-monetization model 500 is converted to "Bundle" such that data of a populated "Package" element 514 corresponds to "Bundle" data in the billing application of the spoke computing system 150b. It will be understood that FIG. 13 illustrates one example of how mapping may be performed, and that whether such mapping is necessary depends in part upon how the ICS system 310b and spoke computing system 150b interface with each other. Thus, mapping may not be required depending on the system configuration and which billing application is utilized by the second spoke computing system 150b.

Further, as shown in column 1306 of FIG. 13, in certain embodiments involving a separate or independent billing application as illustrated, it may be necessary to "enrich" the entitlement-monetization model 500 data by adding or providing certain types of data that are necessary for various billing functions performed by the second spoke computing system 150b. Enrichment may involve, for example, enriching a Charge element 508, e.g., by adding more specific charge element data such as "charge offer usage map," "rate plan, "balance impact," as shown in FIG. 13 and/or adding more specific discount element 512 data such as "discount offer usage map" and details about a "discount model' as shown in FIG. 13. It will be understood that enrichment may not be required depending on the billing application utilized and that data of one or more model 500 elements, or different model elements 500, may be enriched depending on the spoke computing system 150b configuration Referring to FIG. 14, in the illustrated embodiment, the third spoke computing system 150c, which executes a revenue recognition application, such as REVSTREAM revenue recognition application, is utilized to determine how to process or recognize revenue resulting from customer payments for use, access or purchase of the software product 170 configured according to the entitlement-monetization model 500. For these purposes, the third spoke computing system 150c receives Charge data, e.g., in the Charge_Attribute element 510 (which includes fields or attributes of FAIR_VALUE_BASIS, FAIR_VALUE_METHOD, FAIR_VALUE_LOW, FAIR_VALUE_MED, AND FAIR_VALUE_HIGH) such that data for each valid currency and data needed for the Fair Value matrix table for Revenue recognition or revenue management are received, and this data is used to determine how to process the received revenue, e.g., how to handle revenue received from a customer one month in advance. As shown in FIG. 14, fields or attributes of the entitlement-monetization model 500, identified in the first column 1402, are mapped to for use by REVSTREAM (as shown in the second column 1404). It will be understood that mapping may or may not be required depending on how the third spoke computing system is configured, and other mapping methods may be utilized if mapping is performed.

[00246] Referring to FIGS. 15A-D, the entitlement-monetization model 500, as discussed above, may be utilized for generating offers reflected in Offer elements 518 for configured software products 170, which may be done in response to a "Go To Market" request by a host, or in response to a customer request. Before being activated or released for live production, the configured software product 170 may have to go through a review/approval processing and testing and validation. For example, these stages of software product 170 configuration, testing and validation, and production are indicated by "Design and "Configure," 1502 "Test and validate" 1504 and "Go Live in Production" 1506 stages.

Figure 15A:
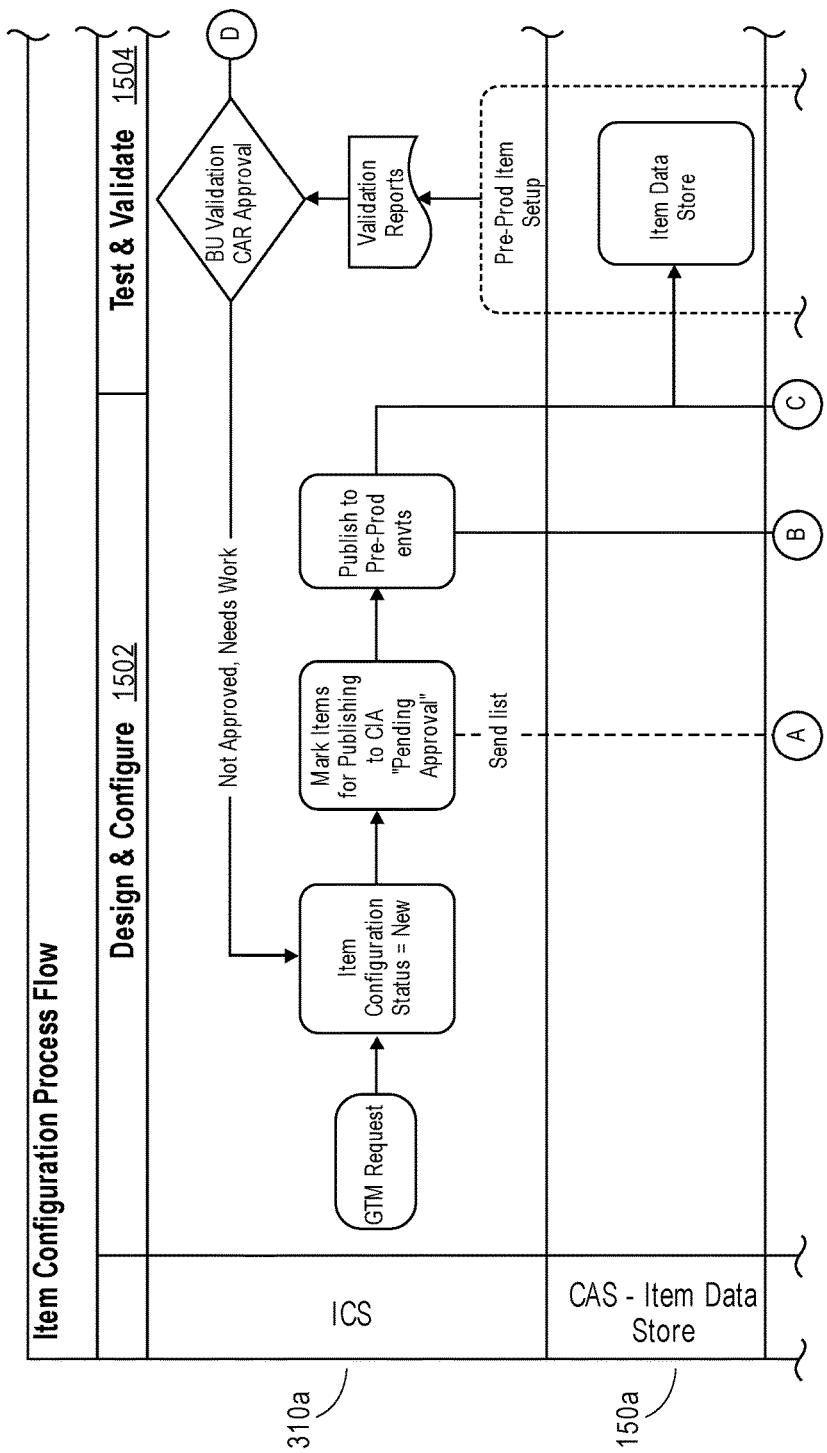
FIGS. 15A-D is a system flow diagram illustrating how a software product defined or configured according to an integrated entitlement-monetization model shown in FIGS. 5A-E is defined or configured in design time, tested and validated in pre-production, and eventually activated for production and use, access or purchase by customers.
Figure 15B:
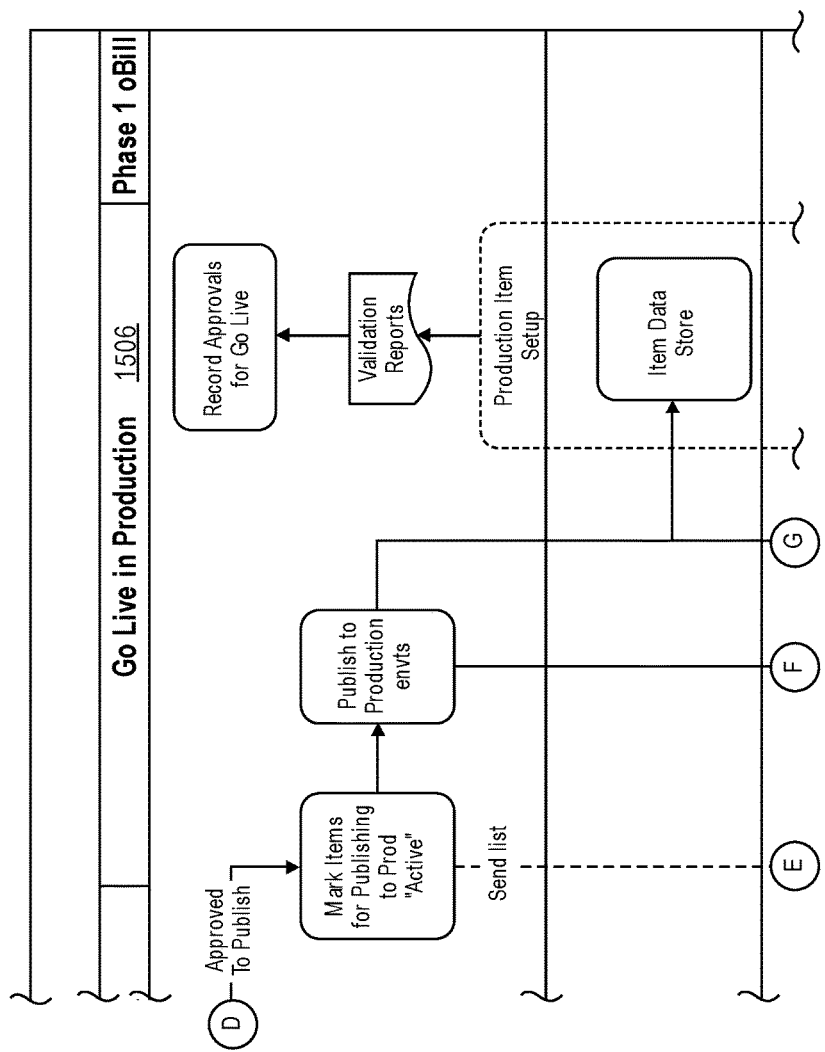
Figure 15C:
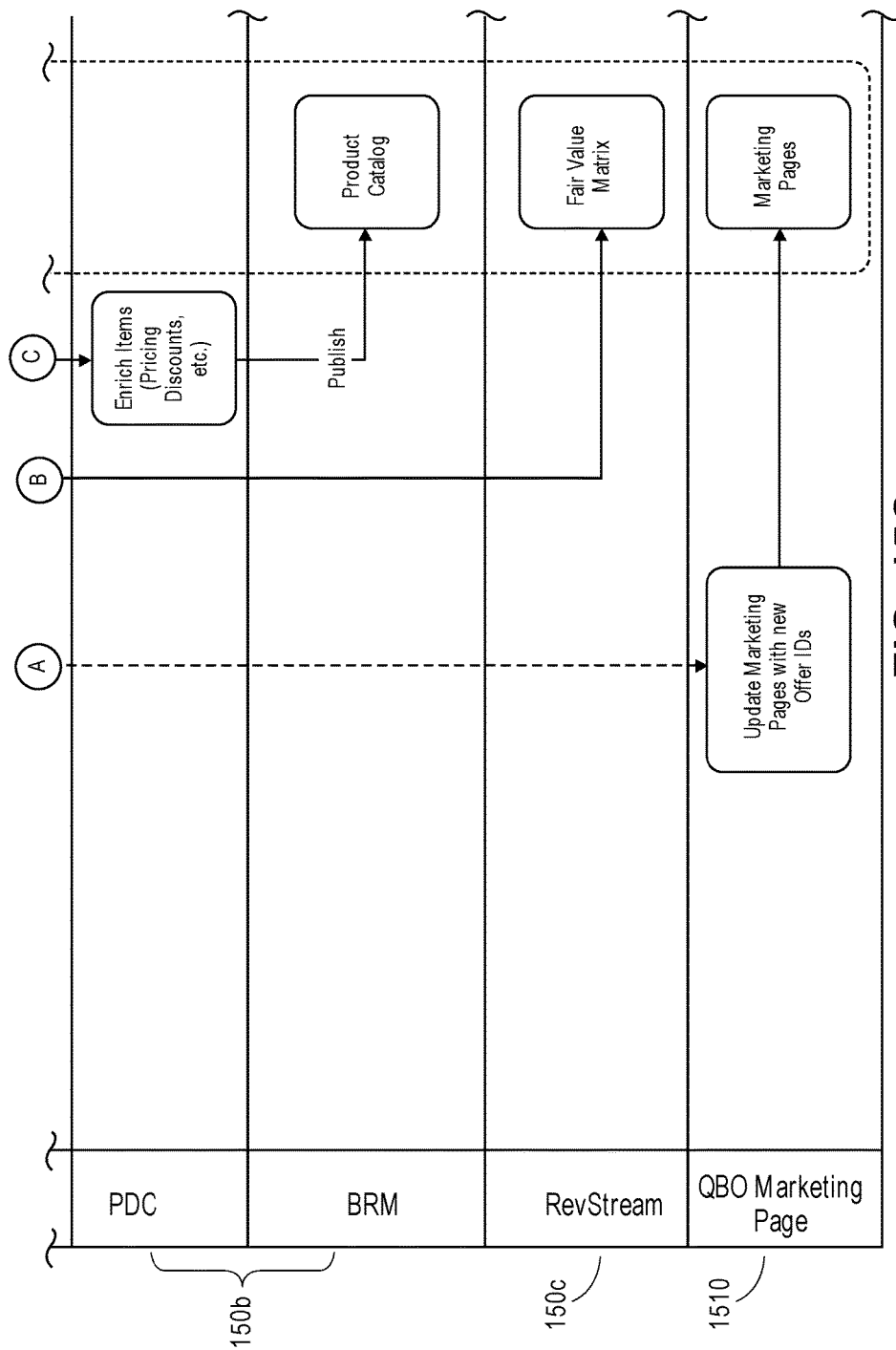
Figure 15D:
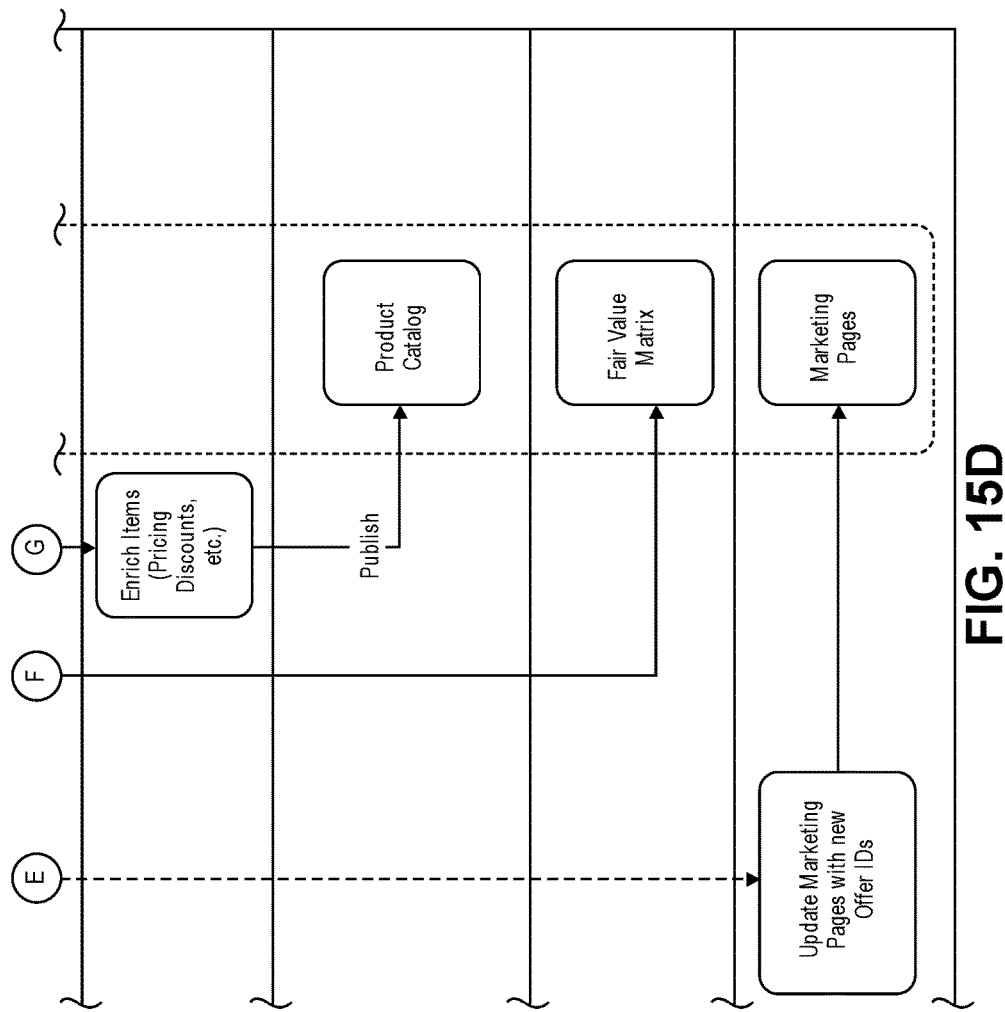

As discussed above, the entitlement-monetization model 500 is generated or configured, and publishing logic publishes the model 500 or portions thereof to spoke computing systems 150, which, as discussed above, may involve a spoke item data store or catalog element 150a that is also used for customer interface, a billing system 150b, and a revenue recognition system 150c, and other spoke computing systems 150 that may be utilized (such as a marketing pages 1510 as shown in FIG. 15C). This pre-production software product configuration is tested, and if not approved by an administrator/host or otherwise validated at 1504, the flow returns back to "design and configure" 1502, else the software product configured as expressed in the entitlement-monetization model 500 that has been tested and validated can proceed to be activated to go live in production at 1606, and similar publishing to spoke computing systems 150 is performed again for production, and a customer can interface with the customer facing application 160 to access the Webs App or item data store/catalog 150a to browse generated offers 518 and select a software product/feature set to purchase, access or use—this runtime flow is further summarized in FIGS. 16A-C.

Figure 16A:
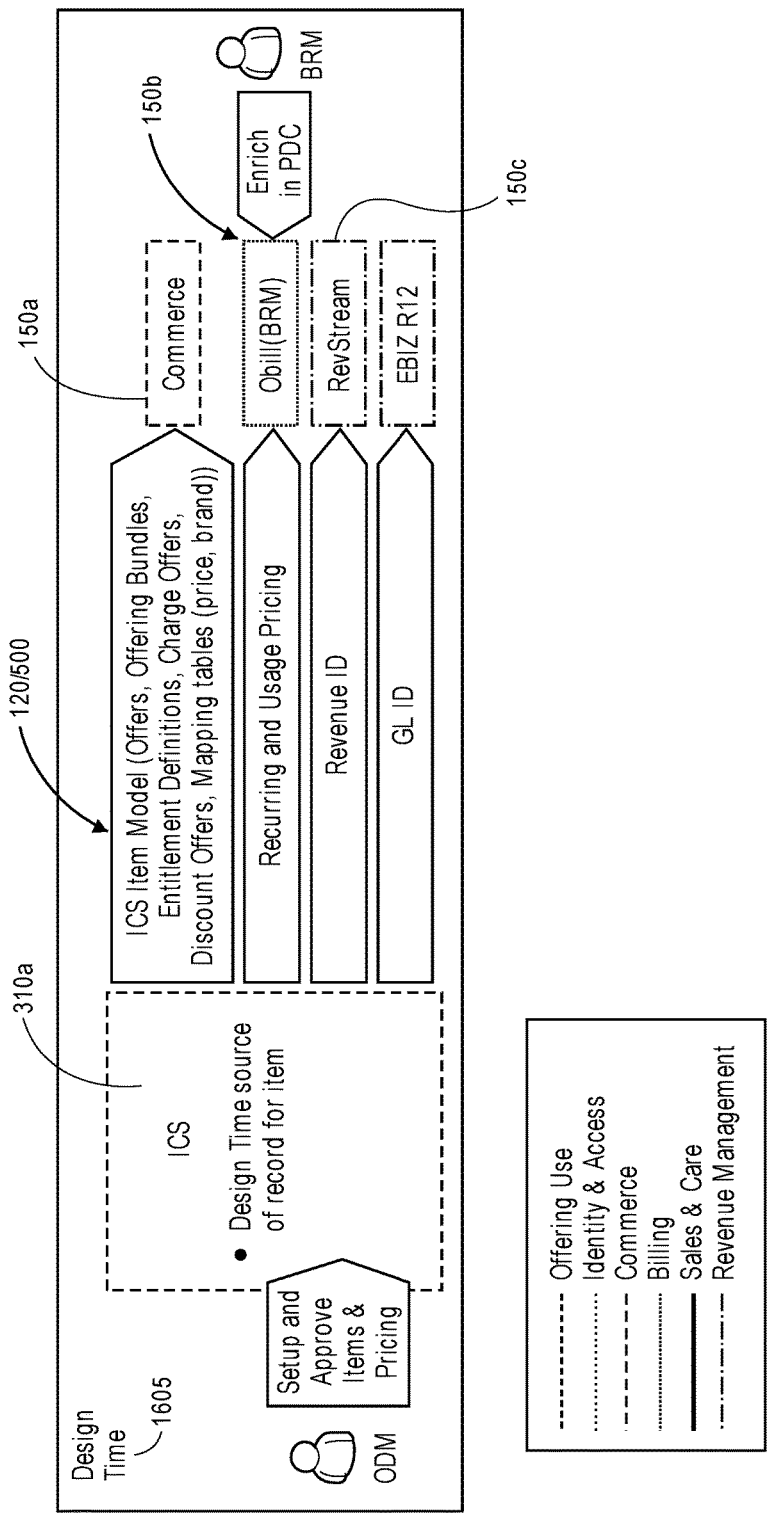
FIGS. 16A-C illustrate an example of a system configured according to one embodiment for design time and runtime processing involving an integrated entitlement-monetization model shown in FIGS. 5A-E, runtime subscription and entitlement management involving an integrated or hybrid entitlement state—service state model and runtime processing based on customer interactions with a customer-facing offering application.
Figure 16B:
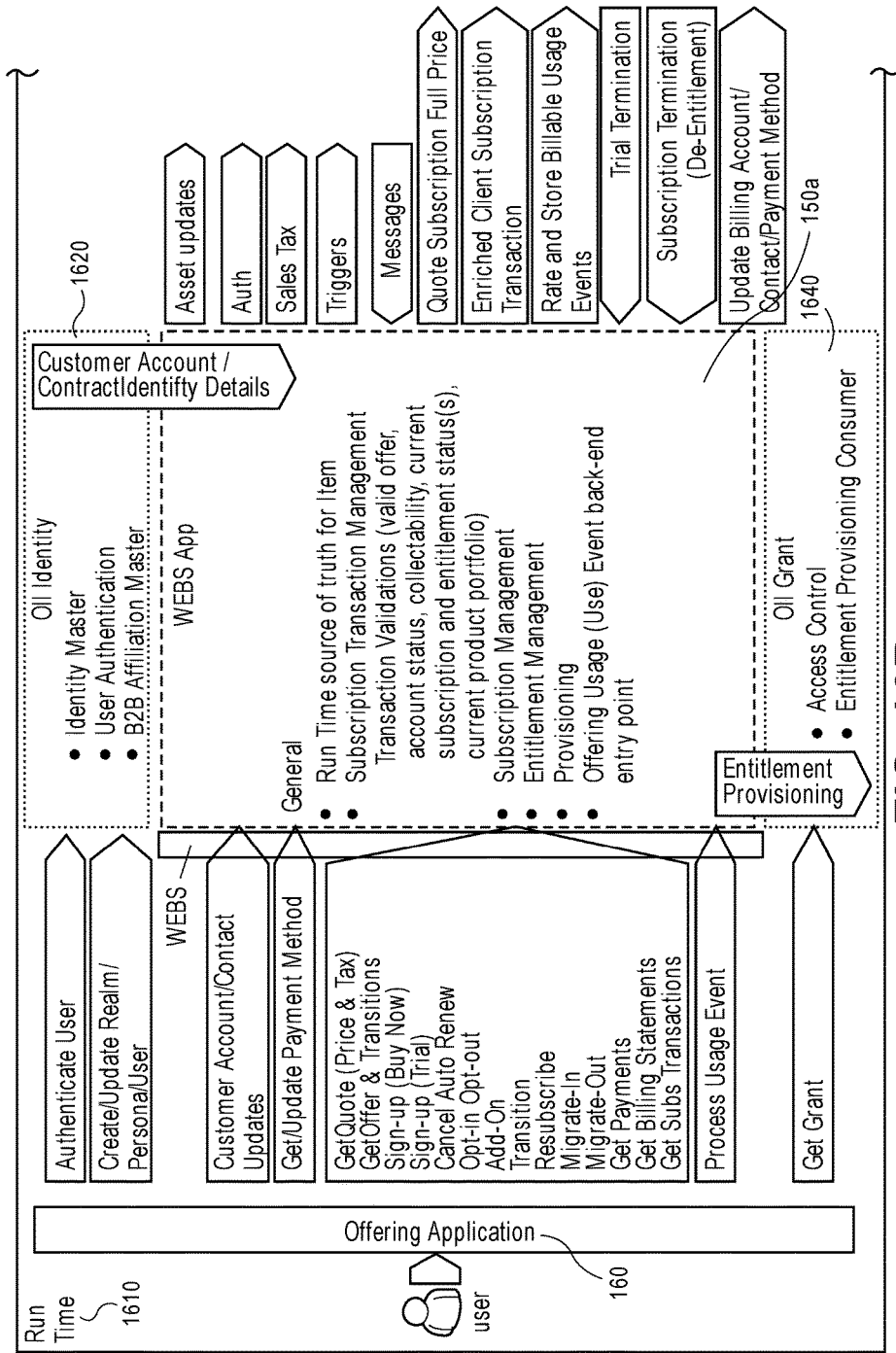
Figure 16C:
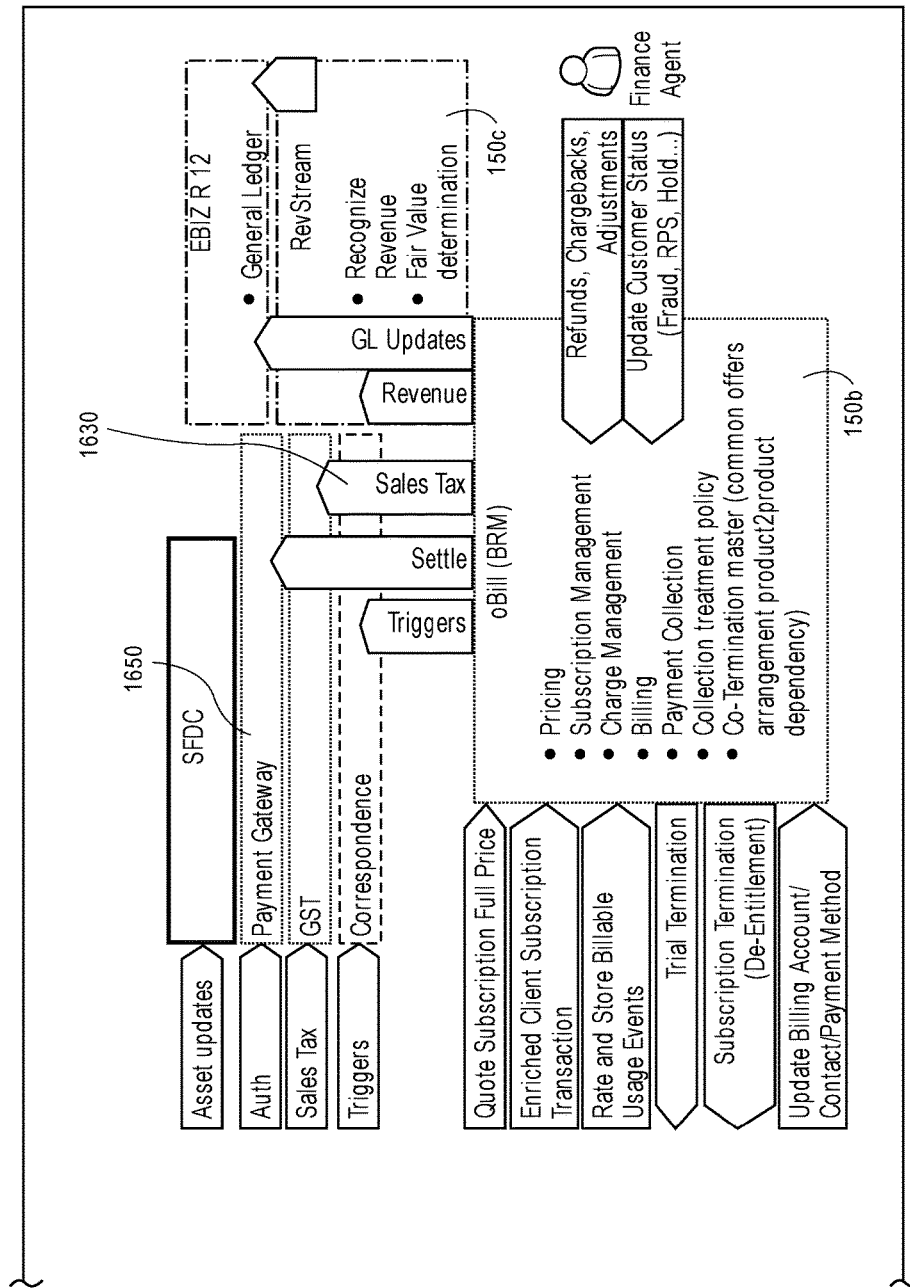

FIGS. 16A-C include sections identified as design time processing 1605 and runtime processing 1610 that utilize integrated or hybrid data models and that may involve different systems or platforms. After the entitlement-monetization model 500 has been configured, and is activated or live for production as described with reference to FIGS. 15A-D, then the system is placed in a mode of runtime processing 1610 and available to receive customer requests through the customer facing offering application 160 through the first spoke computing system 150a, identified as the WEBS App or item model store 150a that serves as a catalog for the customer. Thus, FIGS. 16A-C further illustrate how embodiments can utilize the same entitlement-monetization model 500 or portions thereof according to embodiments in both design time 1605 and runtime 1610 environments, to provide an end-to-end, or software product configuration to deployment solution, as well as automated provisioning and enforcement to ensure that the customer receives or accesses what the customer is entitled to as defined by the entitlement-monetization model 500.

As shown in FIGS. 16A-C, beginning with design time 1602, having published or pushed the entitlement-monetization model 500 definitions or data from ICS 310a to the first spoke computing system 150a (WEBS App) and other spoke computing systems 150b-c for billing and revenue recognition (as discussed above), the customer accesses the system via the customer-facing offering application 160, e.g., via a browser executing on the customer computing device or some other program or interface for accessing the first spoke computing system 150a. Examples of browsers that may be utilized for this purpose include INTERNET EXPLORER, GOOGLE CHROME and MOZILLA FIREFOX browsers, via one or more networks such as Local Area Network (LAN), a Wide Area Network (WAN), Metropolitan Area Network (MAN), a wireless network, other suitable networks capable of transmitting data, and a combination of such networks.

When the customer first visits the system the customer establishes a user account or identity with the host system, as represented by One Intuit Identity (011) 1620, which may involve, for example, user authentication, creating or updating user accounts or personas and customer contact information entry or updates. The customer account data can be written to the first spoke computing system 150a or item data store as reflected by arrow from Oil Identity 1620. Thus, as shown in FIGS. 16A-C, the catalog or first spoke computing system 150a to which the entitlement-monetization model 500 has been published from the ICS system 410a, serves as a source of truth and provides for various runtime 1610 management tasks such as subscription management, entitlement management, provisioning.

With continuing reference to FIGS. 16A-C, after a user account or identification is established, the user proceeds with selection of an offer 518 or interaction with the customer-facing offering application 160. This may involve the user navigating, browsing and selecting a software product configured according to the entitlement-monetization model 500 published to the WEBS App catalog 510a, and which may involve the user selecting one of various options or menu items such as, for example, get quote, get offer and transitions to other software products or versions, sign up/buy now, sign up/trial, cancel an automatic renewal, opt-in or opt-out, add-on, transition to another software product or feature set, resubscribe, etc. Whatever action is initiated by the customer, the customer request is received by the WEBS app or first spoke computing system 510*a* that hosts the item data store/catalog and that is the runtime source of truth.

Depending on what is selected by the customer, the first spoke computing system 510*a* may communicate with the second spoke computing system 510*b* (for billing) to, for example, communicate a customer request for a quote (which includes any taxes, discounts). This may involve the billing second spoke computing system 510*b* accessing resources for quote generation, such as sales tax module (Global Sales Tax (GST) 1630 and incorporating sales tax data into the quote, and the quote is transmitted by the second or billing spoke computing system 150*b* in response to the quote request from the first spoke computing system 150*a*, which then communicates the quote with the applicable sales tax or other quote data (price, tax and any applicable discount) to the user via the customer-facing offering application 160.

For the offer 518 selected by the user, entitlement for that particular product/feature set is approved for that user via the first spoke computing system 150*a*, and entitlement authorization is transmitted to a grant/entitlement module (Oil grant) 1640, such that when the customer receives a response from the first spoke computing system 150*a* regarding the quote/offer, upon acceptance, the customer is able to access or download the requested product per the entitlement provisioning of Oil Grant 1640. Transaction data may then be passed by the first spoke computing system 510*a* to the second or billing spoke computing system (such as BRM) 150*b*, which may done asynchronously, to set up billing services for the entitlement or terms set forth in the offer 518.

As described in further detail with reference to FIGS. 17-21B, based on a system generated event indicating, for example, that a trial period has ended, the customer has not paid an invoice, or has not paid an invoice and has passed the grace period, the first spoke computing system (WEBS App) 510*a* may be modified to reflect the status. This may be based on an event generated by and received from an event generation system, such as the second or billing spoke computing system 150*b* to ensure that subscription termination is properly enforced, e.g., as reflected in in trial termination and subscription termination arrows from the second or billing spoke computing system (e.g., BRM) 150*b* to the first or catalog spoke computing system (e.g., WEBS App) 510*a*, which manages the subscriptions and pushes updates to the entitlement provisioning or enforcement module (e.g., Oil Grant) 1640 to modify grant or enforcement provisions, in addition to serving as a catalog or source of offers for the customer-facing application 160. Otherwise, for subscriptions or purchases, the first or catalog spoke computing system (WEBS App) may interface with a payment module 1650 or payment gateway, e.g., as part of a validation process as part of a "buy now" action or request by the customer, which may involve credit card authorization, and correspondence to the customer can be updated to reflect any subscription changes, purchase, or transitions and to communicate invoices to the customer.

Thus, FIGS. 16A-C further illustrate how the entitlement-monetization model 500 may be utilized in both design time 1605 and runtime 1610 applications and associated automated system modifications, and further illustrates how the entitlement-monetization model 500 allows for centralized offer, subscription and entitlement enforcement, and being managed by the first computing spoke element that interfaces with computing elements for billing, revenue recognition, access control or entitlement provisioning and subscription changes or modifications. Further aspects of runtime processing and associated automated modifications are described with reference to FIGS. 17-21B.

Figure 17:
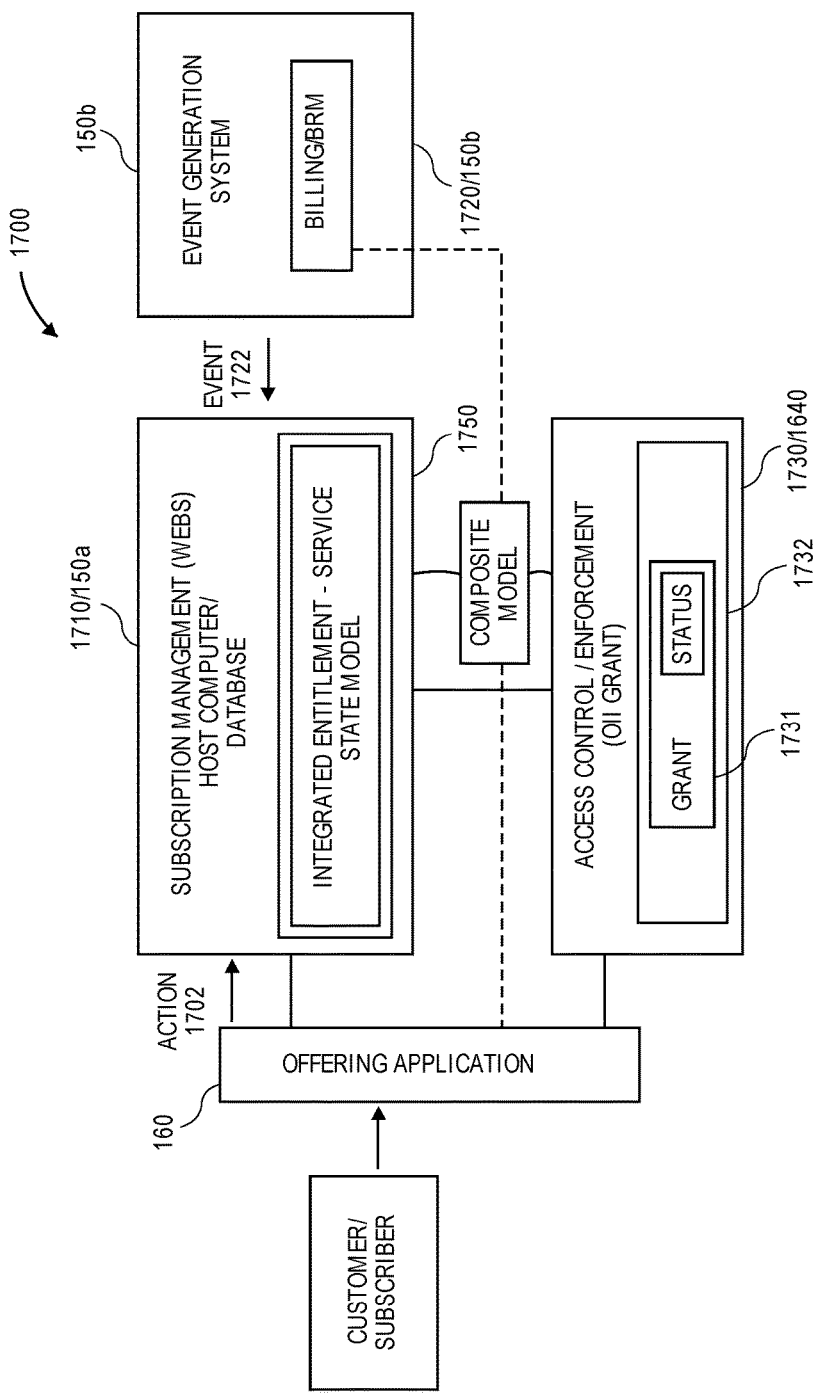
FIG. 17 is a system flow diagram illustrating a runtime computerized software management system constructed according to one embodiment including an integrated or hybrid entitlement-service state model.

Referring to FIG. 17, one embodiment of the invention is related to runtime applications (versus design time) that involve management or system for control of access to or use of a computer software product, such as QUICKBOOKS ONLINE (QBO), as one example. Embodiments of the invention involve a host computing device, which may include a computer database 150*a* that includes or executes a hybrid runtime data model 1750 integrating entitlement state and service state to govern subscriber access to computer software products and actions permitted by the subscriber.

According to one embodiment, the integrated or hybrid entitlement state—service state data model 1750 may specify full access or restricted/read-only access and what actions, such as opt in from a trial subscription, are permitted to be performed by a customer given a current service state). Given the manner in which the integrated or hybrid state model 1750 is structured, the integrated entitlement state and service state data or attributes thereof are interwoven with each other, e.g., one being a sub-state of the other, rather than being distributed among different models or different computing systems or platforms, thus improving the functioning of computing systems utilized for computer software product configuration and deployment by, for example, eliminating the need for additional communications, which may involve additional network communications, and processing associated with interfacing with other computing devices that manage independent and distributed entitlement and service states.

In the illustrated embodiment, a computing system 1700 for runtime computer software product management in a networked computing environment includes a host computer or subscription management database system 1710/150*a*, such as WEBS 150*a* as described above. For ease of explanation, reference is made to a database system 1710. System embodiments may also include an event generation system 1720, which, according to one embodiment, may be billing system such as BRM 150*b* noted above or another separate system event generation system, and which automatically generates events or notifications concerning the computer software product and to which the database 1710 is subscribed to receive. Thus, the events are system generated events communicated to and processed by other system components for executing automated system modifications or transformations. System generated events 1722 may relate to, for example, payment or non-payment for a subscription, or transitioning from a trial subscription to a paid or upgrade subscription, and the database 1710 automatically modifies the integrated or hybrid entitlement-service state model 1750 in runtime based on the received system generated event 1722.

The hybrid state represented by the integrated or hybrid state model 1750 is automatically transformed in runtime to reflect the system generated event 1722, without human intervention and/or to reflect an action 1702 performed by the customer, e.g., initiating a trial subscription or canceling a subscription. System embodiments may also include computer software product access control or enforcement system 1730, which receives updates from the database 1710 regarding how the state was modified or transformed during runtime to reflect both entitlement and service state and indicating which computer software product or version thereof the consumer is entitled to access. Thus, when a user logs into the system via the offering application 160, the offering application 160 transmits a request to allow the user or customer to access the computer software product, and the request is received by the access control or enforcement system 1730 (but not the database 1710 since the database 1710 and access control or enforcement system 1730 are independent components). The access control or enforcement system 1730, having received the data of the integrated or hybrid state model 1750 from the database 1710, automatically determines whether the customer is permitted to access the requested computer software product and if so, which version or capabilities thereof, and if so, generates a grant based on the data received from the database 1710, and provides the grant to the computer software product such that the user or customer is then allowed to access the computer software product according to the grant specification of the access control or enforcement system 1730.

Figure 18A:
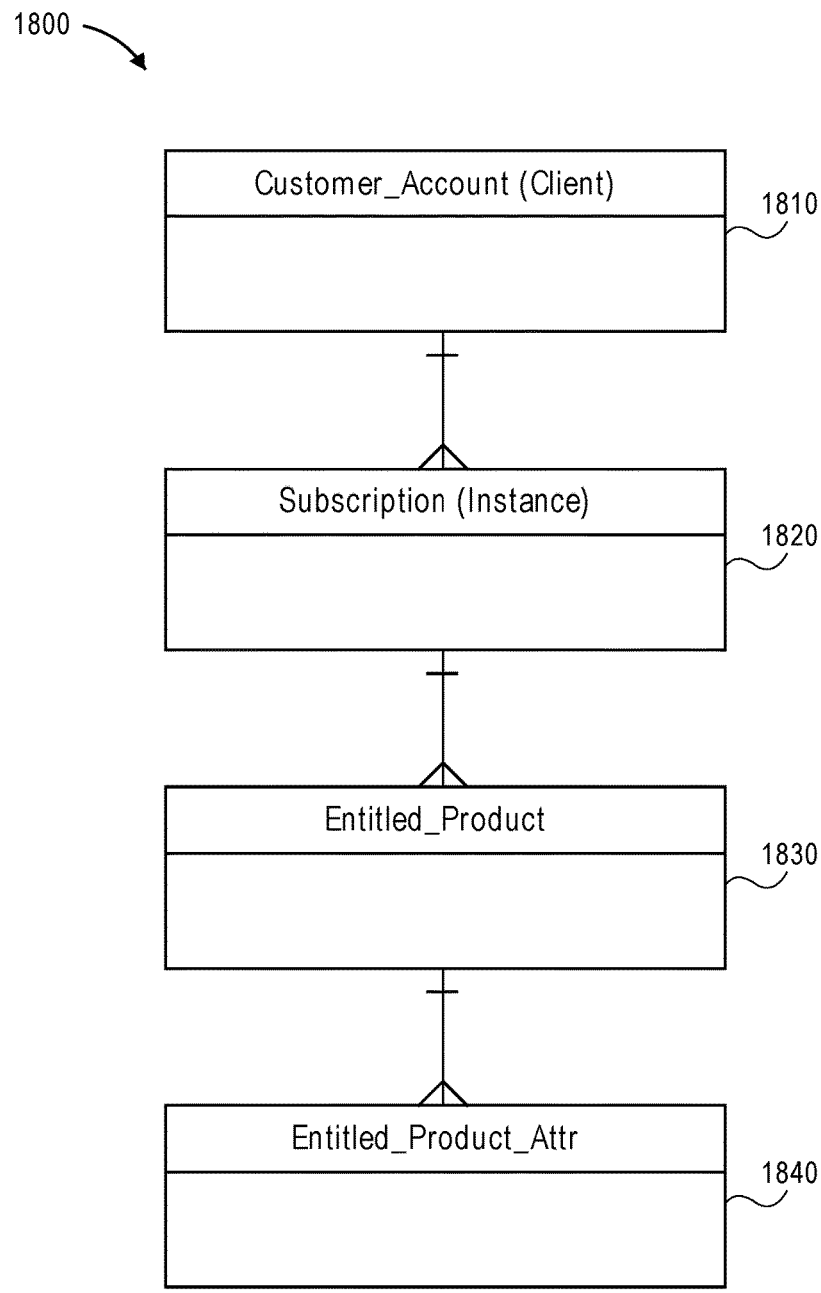
FIGS. 18A-B illustrate a subscription model constructed according to one embodiment that includes an integrated or hybrid entitlement-service state model and how different model elements are related to each other in order to control access to a computer software product that was the subject of a system generated offer and customer actions related thereto.
Figure 18B:
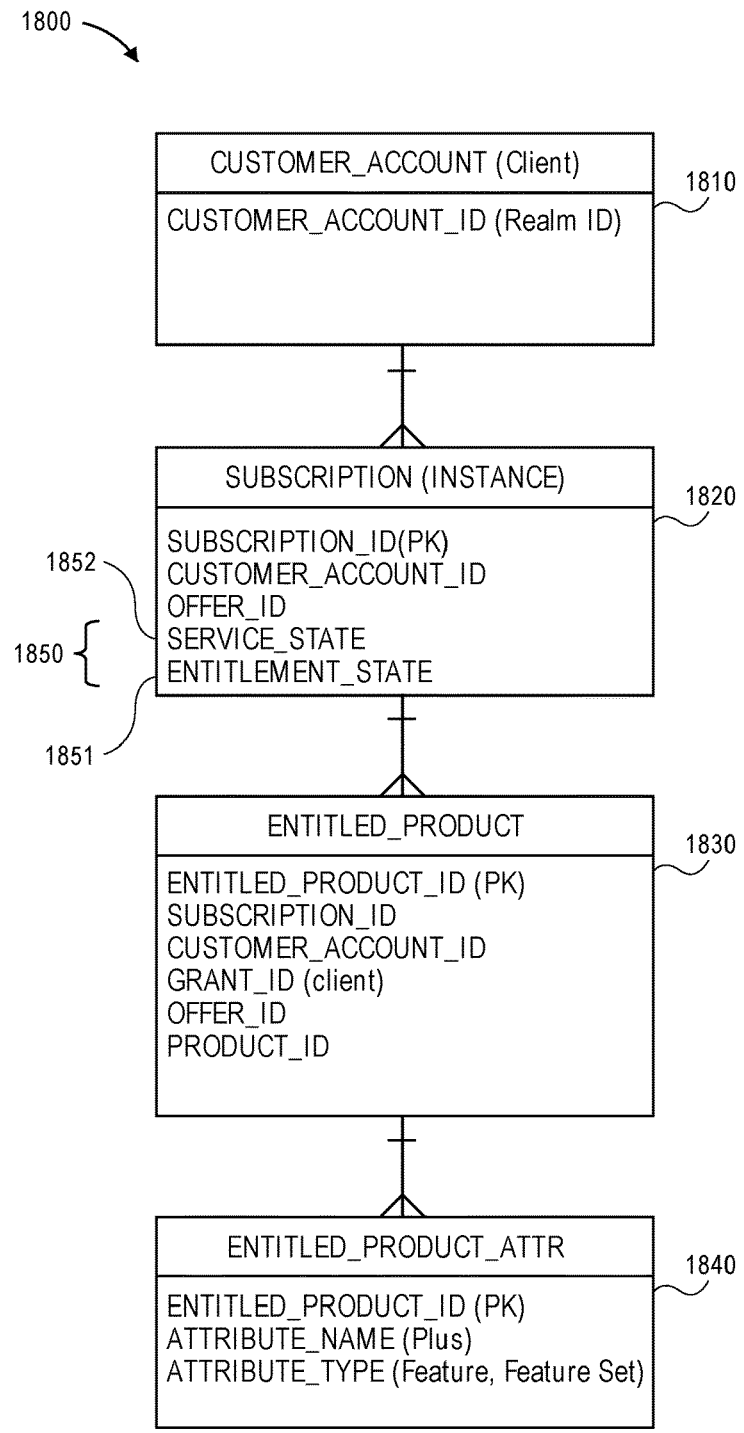

Referring to FIGS. 18A-B, runtime subscription models 1800 constructed according to embodiments for governing use of a computer software product by a subscriber or customer are illustrated. In the illustrated embodiment, the runtime subscription model 1800 includes multiple elements, tables, objects or records (generally, "element") that are linked or associated with each other and one data element includes an integrated or hybrid entitlement state—service state model 1850. The integrated or hybrid entitlement state—service state model 1850, according to one embodiment, includes first state data 1851 related to the customer's entitlement to a computer software product and for governing access to the computer software product by the customer, and second state data 1852 related to a service state and that is used to specify actions that can be requested or executed by the customer given the current combination of an entitlement state or first state data 1851 and service state or second state data 1852 of the integrated or hybrid runtime entitlement-service state model 1850 of the runtime subscription model 1800.

In the illustrated embodiment, the runtime subscription model 1800 includes runtime data model elements for customer account 1810, subscription (subscription instance) 1820, entitled product 1830 of the subscription instance and entitled product attributes 1840. More specifically, in the embodiment illustrated in FIG. 18B, the runtime subscription model 1800 includes a Customer Account (client) element 1810 that is associated with, related to, linked to, or cross-referenced with a Subscription (Instance) element 1820, which is associated with, related to, linked to, or cross-referenced with an Entitled Product element 1830, which is associated with, related to, linked to, or cross-referenced with, the Entitled Product Attribute element 1840.

A Customer Account (Client) element 1810 configured according to one embodiment includes fields or attributes:

CUSTOMER_ACCOUNT_ID: data for identifying a customer account. In the illustrated embodiment, is referred to as "Realm ID" which is a name or other identifier for a customer account identification generated by an access control or enforcement system 1640 such as OII Grant in FIG. 16B.

A Subscription (Instance) element 1820 configured according to one embodiment includes an identifier field or attribute:

SUBSCRIPTION_ID (PK): a unique ID to a customer that serves as a Primary Key and that is used to segregate multiple instances of a Sign-up or Buy Now offer. If a customer chooses to do another Sign-up or Buy Now instead of an upgrade of an existing offer to another offer, another instance of the Subscription is created. Future transactions would indicate the Subscription ID.

CUSTOMER_ACCOUNT_ID: as noted above regarding CUSTOMER_ACCOUNT, data for identifying a customer account, e.g., "Realm ID" generated by the access control or enforcement system 1640 such as OII Grant in FIG. 16B.

OFFER_ID: an external identifier reference on transactions from the initiating source application such as customer facing offering application 160 shown in FIGS. 1 and 16B. This identifier is received with transactions via the customer facing offering application 160 and re-populated when a subsequent transition is processed.

SERVICE_STATE: a component or state data 1852 of the integrated or hybrid entitlement-service state model 1850; the service state data 1852 indicates which status the subscription is in in terms of, for example, whether the customer is paying or is not, and drives what actions a user can take next in terms of changing their subscription portfolio.

ENTITLEMENT_STATE: a component or state data 1853 of the integrated or hybrid entitlement-service state model 1850 that governs customer access to or use of the computer software product and in certain embodiments, may specify multiple access attributes such as whether access is allowed and the level of access.

An Entitled Product element configured according to one embodiment is configured to identify a specific computer software product to which customer is entitled to use or access in accordance with their subscription portfolio and includes fields or attributes:

ENTITLED_PRODUCT_ID (PK): unique identifier for the entitled software product

SUBSCRIPTION_ID: as noted above with reference to SUBSCRIPTION (INSTANCE), a unique ID to a customer that is used to identify a subscription or instantiation of an offer pertaining to the computer software product, e.g., to segregate multiple instances of a Sign-up or Buy Now offer.

CUSTOMER_ACCOUNT_ID: as noted above with reference to CUSTOMER_ACCOUNT(CLIENT), data for identifying a customer account, e.g., "Realm ID" generated by the access control or enforcement system 1640 such as OII Grant in FIG. 16B.).

GRANT_ID (CLIENT): reference to a specific entry in an access control or enforcement system 1620 such as the OII Grant system that manages access to computer software products defined by ENTITLED_PRODUCT. For example, customer facing offering applications 160 check with the access control system 1620 to determine if the logged in user is allowed access or is allowed to perform the action they are attempting concerning the computer software product.

OFFER_ID: as with reference to SUBSCRIPTION (INSTANCE), an external identifier reference on transactions from the initiating source application such as customer facing offering application 160 shown in FIGS. 1 and 16B). This identifier is received with transactions via the customer facing offering application 160 and re-populated when a subsequent transition is processed.

PRODUCT_ID: as noted with reference to FIG. 6A and PRODUCT (of the integrated or hybrid design time model), a unique identification of a core software product or offering (such as "QBO").

An Entitled Product Attribute element 1840 configured according to one embodiment represents all of the features 221 or feature sets 220 that a customer has related to the product, e.g., identified by product element 220, that they own. For example, as discussed above with reference to FIGS. 7A-D, a core or primary computer software product may be QUICKBOOKS ONLINE, or "QBO"), and a feature set model element is associated with the product model element and defines a set of features or limitations of the core computer software product (e.g., a particular version of the software product, such as QBO ESSENTIALS, QBO PLUS or Advanced Reporting feature).

ENTITLED_PRODUCT_ID (PK): unique identifier for the entitled software product.

ATTRIBUTE_NAME: As discussed above with reference to FIG. 7b, a character value of the attribute, e.g., to signify QBO "Plus" or "Simple Start." This data defines the attribute name that applies. Changes to this value are reported to the access or enforcement control system 1640).

ATTRIBUTE_TYPE: Defines the attribute name that applies. Example: 'feature-set', 'feature'. In other words, this data defines a type of attribute, which may be, for example, Feature Value, Pre-paid Consumable Resource Limit, Concurrent Resource Limit, Identified Resource Limit, and/or an attribute related to a capability or functionality of the Product)

With continuing reference to FIG. 18B, a "subscription" element 1820 as shown in FIG. 18B serves as a "container" for computer software products to which the customer is entitled to use or access. A subscription instance 1820 may serve as a container for a single computer software product or for multiple computer software products. Thus, if a customer purchases QBO, the subscription instance 1820 would include one product to reflect instantiation of an offer involving that particular computer software product, but if a customer purchases QBO, QBO A (for accountants) and PAYROLL, then the subscription element 1820 would serve as a container for three entitled products to reflect instantiation of an offer that that involved the three computer software products.

In the illustrated embodiment, a runtime, integrated or hybrid multi-state model 1850 is contained exclusively within the SUBSCRIPTION (INSTANCE) element 1820 of the subscription data model 1800. This is also generally illustrated in FIG. 16B ("subscription management" and "entitlement management"—collectively, runtime, integrated or hybrid multi-state model 1650) of the WEBS database 150a, which is in communication with the access or enforcement control system 1640 (OII Grant) and an event generation system such as billing system 150b (such as BRM) as shown in FIGS. 1 and 16B-C, all of which are not accessible by the customer/subscriber, which instead only interacts with the customer facing offering application 160.

In the illustrated embodiment, no portion of the integrated or hybrid runtime state model 1850 is included in another other data element and is used for governing use of a computer software product by a customer. According to one embodiment, the integrated or hybrid runtime state model 1850 includes entitlement state data 1851 that specifies or defines access to the computer software product by the customer. For example, an "Active" entitlement state or entitlement state data 1851 may indicate that the customer is allowed access to the computer software product (e.g., by a "Y/N" binary indicator) and further indicate that such access is "full" or unrestricted access. As another example, an "Inactive" entitlement state or entitlement state data 1851 may indicate that the customer is allowed access to the computer software product, but that such access is restricted, such as "Read Only" such that the customer may no longer use the computer software product to enter or generate new accounting data, but may access previously entered or stored data on a read-only basis, which may occur when a customer previously paid for a subscription but the current payment is past due. As a further example, an entitlement state or entitlement state data 1851 may be "Closed" in which no access is permitted and the customer has no access to the computer software product or any data managed thereby. Thus, according to one embodiment, for a given entitlement state or state data 1851, multiple access attributes or criteria may be defined. For ease of explanation and not limitation, reference is made to entitlement state data or access data 1851.

According to one embodiment, the integrated or hybrid runtime state model 1850 includes service state data 1852 that specifies or defines current service state applicable to the customer and which customer actions are permitted given the service state 1852 and current entitlement state 1851 such that the service state 1852 is a sub-state of the entitlement state 1851.

Figure 19:
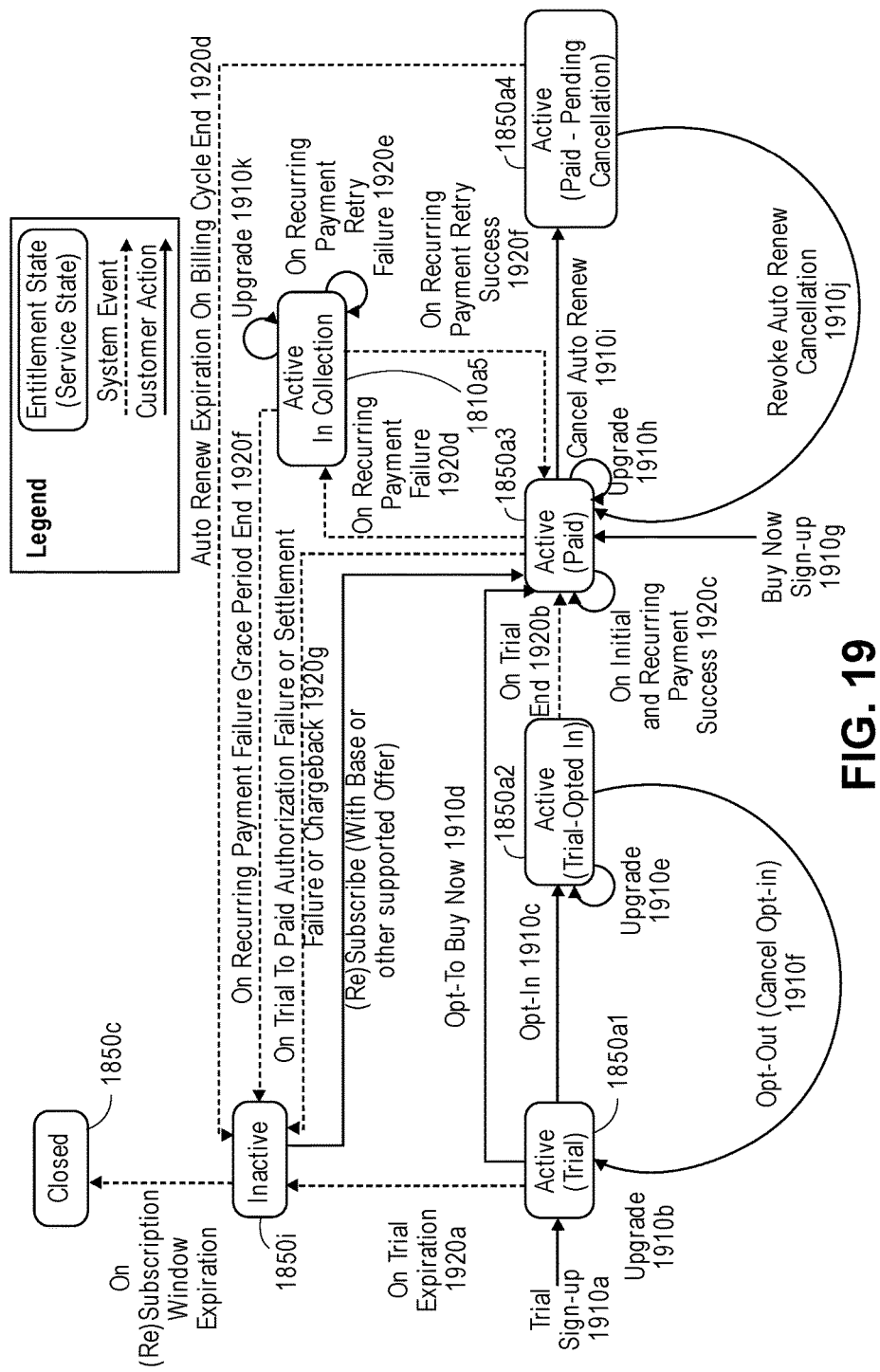
FIG. 19 is a system flow diagram illustrating how an integrated or hybrid entitlement-service state model can be executed to automatically transform the state represented thereby in response to user actions and system generated events concerning computer software product that is the subject of a system generated subscription offer.

With further reference to FIG. 19, which is a state-flow diagram illustrating how the integrated or hybrid entitlement-service state model 1850 can be utilized to manage a customer's access to a computer software program based on different circumstances or conditions and how state model changes can be implemented in response to customer actions and/or system generated events (e.g., generated by billing system 150b or BRM as shown in FIG. 16C). Examples of automatically generated system events include generation of events indicating a transition (e.g., opting in from a trial subscription), payment or non-payment or other payment issue (e.g., credit card failure or non-payment greater than a pre-determined time). In the illustrated embodiment, the integrated or hybrid entitlement-service state model 1850 specifies a hybrid state including and entitlement state and, if applicable, a sub-state in the form of the service state, the combination of which determine which actions are permitted by the subscriber. In the example shown in FIG. 19, the service state 1852 or sub-state is represented as in (parentheses), and in the illustrated embodiment, a service state 1852 is specified when the entitlement state 1851 is active (which may involve service states of trial, trial opted in, paid, pending cancellation, in collection and in collection pending cancellation), but not when the entitlement state 1851 is inactive (which may apply with service states of paid and trial, for example), or closed (for any service state).

For example, in the illustrated embodiment, as an exemplary starting point, the customer initially interacts with the customer facing application 160 to take the action of singing up for a trial 1910a by responding to an offering for the computer software product. This is reflected by the hybrid state of state model 1850a1 (entitlement state=active, service state=trial, or Active(trial)). Possible pre-defined customer actions 1910 that are permissible given this combination of entitlement state/service state (Active/Trial) 1850a1 ("a" referring to "active") include upgrade 1910b, opt-in 1910c, opt to buy now 1910d. A system generated event 1920 of trial expiration 1920e may also occur during the Active (trial) state 1850a1.

During Active(Trial) 1850a1, the customer may take the action of upgrading 1910b to a trial of another or upgraded version of the computer software product, in which case the state model 1850 remains unchanged as Active(Trial) 1850a1. During the Active(Trial) 1850a1 state, the customer may take the action of opting in 1910c to transition from the trial subscription to a paid subscription upon termination of the trial subscription, in which case the hybrid state of the state model 1850 is automatically modified from Active (Trial) 1850a1 to Active(Trial Opted In) 1850a2 in response to this customer action and input received through the offering application 160.

During the Active(Trial) 1850a1 state, the customer may also opt to purchase 1910d the computer software product to transition from the trial subscription to a paid subscription upon termination of the trial subscription, in which case the hybrid state of the state model 1850 is automatically modified from Active(Trial) 1850a1 to Active(Trial-Opted In) 1850a2 in response to this customer action. During this Active(Trial-Opted In) state 1850a2, the customer may also upgrade 1910e the computer software product that was the subject of the end of trial payment, in which case the state model 1850 remains unchanged as Active(Trial-Opt-In) 1850a2. If the customer later opts out from this trial 1910f, the hybrid state of the state model 1850 is automatically modified from Active (Trial-Opt-In) 1850a2 back to Active (Trial) 1850a1 in which case the customer may not be charged, e.g., if cancellation occurs before payment or before the trial period ends.

If payment is received from the customer by trial end 1920b, as reflected by a system generated event (e.g., as generated by a billing system 150b such as BRM), the hybrid state of the state model 1850 is modified from Active(Trial-Opt-In) 1850a2 to Active(Paid) 1850a3 to reflect that the customer has paid for a subscription to the computer software product upon termination of the trial. The hybrid state of the state model 1850 may also be automatically modified to be placed in an Active(Paid) 1850a3 state when the customer does not begin with a trial subscription and instead initially purchases the computer software product (Buy Now Sign Up) 1910g through the customer facing application 160.

During the Active(Trial) 1850a1 state, the customer may take no action, resulting in a system generated event of trial expiration 1920a, in which case the hybrid state of the state model 1850 is automatically modified from Active(Trial) 1810a1 to Inactive 1810i.

Continuing with reference to the state model 1850 in the hybrid state of Active(Paid) 1850a3, the Active(Paid) state 1850a3 remains unchanged when the customer upgrades 1910h the computer software product that was the subject of the prior payment or upon a system generated event, e.g., generated by a billing system 150b, indicating continuing subscription payment success (On Initial and Recurring Payment Success) 1920c.

During the Active(Paid) state 1850a2, upon customer actions of canceling an automatic renewal option 1910i and upon expiration of the subscription, the hybrid state of the state model 1850 is automatically modified to transition from Active(Paid) 1850a3 to Active(Paid-Pending Cancellation) 1850a4, but upon revocation of this cancellation 1910j, the hybrid state of the state model 1850 is automatically modified to revert back to Active(Paid) 1850a3. If automatic renewal is not effected as a result of lack of customer action and expiration of auto renew upon termination of a billing cycle as reflected by system generated event 1920d, the hybrid state of the state model 1850 is automatically modified to transition from Active(Paid-Pending Cancellation) 1850a4 to Inactive 1810i such that the customer now only has read-only access to the customer's data in the Inactive state 1820i.

The hybrid state of the state model 1850 may also be automatically modified to transition to Active(In Collection) 1810a5, which is still an active state but the subscription payment is late as reflected by system generated event 1920 and in collection and remains in this state 1810a5 while the system awaits payment or attempts to or retries to effect payment but fails to do so 1920e, but is automatically modified to transition back to Active(Paid) 1850a3 upon a system generated event indicating successful payment 1920f. If the customer initiates or completes an upgrade 1910k during the Active (In Collection) 1850a5 state, the customer remains in the Active (In Collection) 1850a5 state until the collection issue is resolved.

If after a certain amount of time or grace period, payment cannot be effected as reflected by event 1920f generated by billing system 105b, the hybrid state of the state model 1850 is automatically modified from Active(In Collection) 1850a5 to Inactive 1850i ("i" referring to inactive") such that the customer now only has read-only access to the customer's data in this state. The state model 1850 may also be automatically modified to transition from Active(Paid) 1850a3 to Inactive 1850i based on a billing system 105b event indicating authorization or settlement failure or a chargeback 1920g, e.g., as determined by a system generated event received by the database hosting the integrated entitlement state—service state model 1850, but may automatically revert back to Active(Paid) 1850a3 upon user action in the form of resubscription 1910l, which may involve a base or other supported offer involving the computer software product.

While in the Inactive state 1850i, during which the customer still retains read-only access, the state may transition from Inactive 1850i to Closed 1850c ("c" referring to "closed") after a pre-determined amount of time during which resubscription was permitted has passed, thus resulting in a "Closed" state 1850c, which terminates read-only access. Once in the Closed state 1850c, in order to access the subscription model again, the customer is required to begin with a new trial or purchase of the computer software product and no longer has access to the data that was previously accessible in the Active and Inactive states.

It will be understood that embodiments may involve various other flows and integrated or hybrid state model 1850 configurations involving different states 1850a, 1850i, 1850c, customer actions 1910 and system generated events 1920 and that FIG. 19 is provided as an illustrative example of how the integrated entitlement state—service state model 1850 can be configured and automatically modify or transform to adapt to different customer actions and system generated events. For example, although not shown in FIG. 19, on recurring payment failure and while in the Active(In Collection) state 1850a5 during the grace period, a customer may request auto renew cancellation, which will be effective at the end of a billing cycle provided that payment can be processed and the state can transition out of collection before the end of the billing cycle. If not, then the subscription can be deactivated at the end of the grace period rendering the cancellation request moot. Further, although not shown in FIG. 19, the system may be immediately transformed such that the integrated or hybrid state model 1850 assumes state of Closed state 1850c upon occurrence of a pre-determined event, e.g., determination that customer is a restricted party or a party that is not permitted to use these services.

Figure 20A:
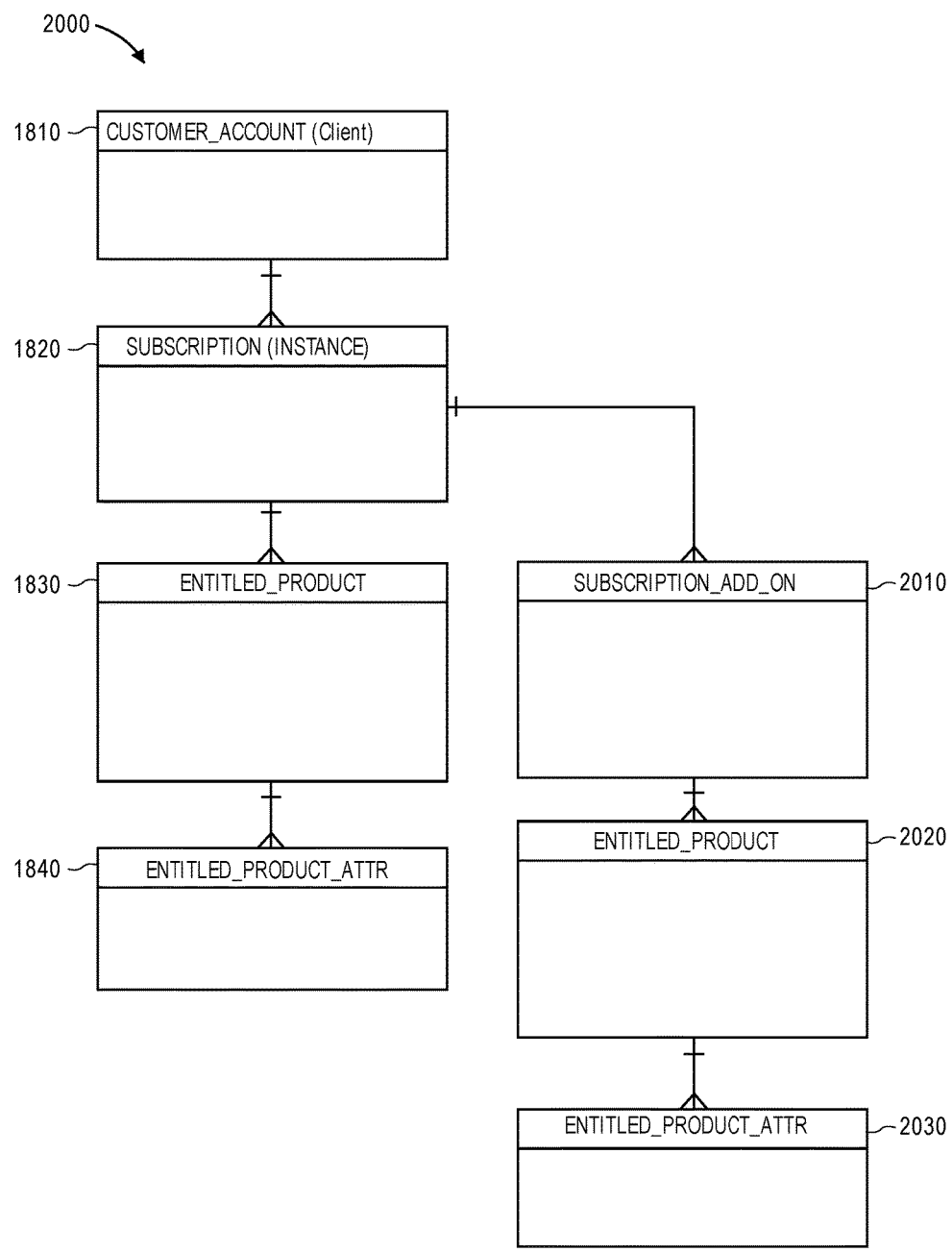
FIGS. 20A-B illustrate a subscription model constructed according to one embodiment that includes an integrated or hybrid entitlement-service state model and how different model elements are related to each other in order to control access to a computer software product that was the subject of a system generated offer and customer actions related thereto and that also provides for management of product add-ons to a base entitled computer software product.
Figure 20B:
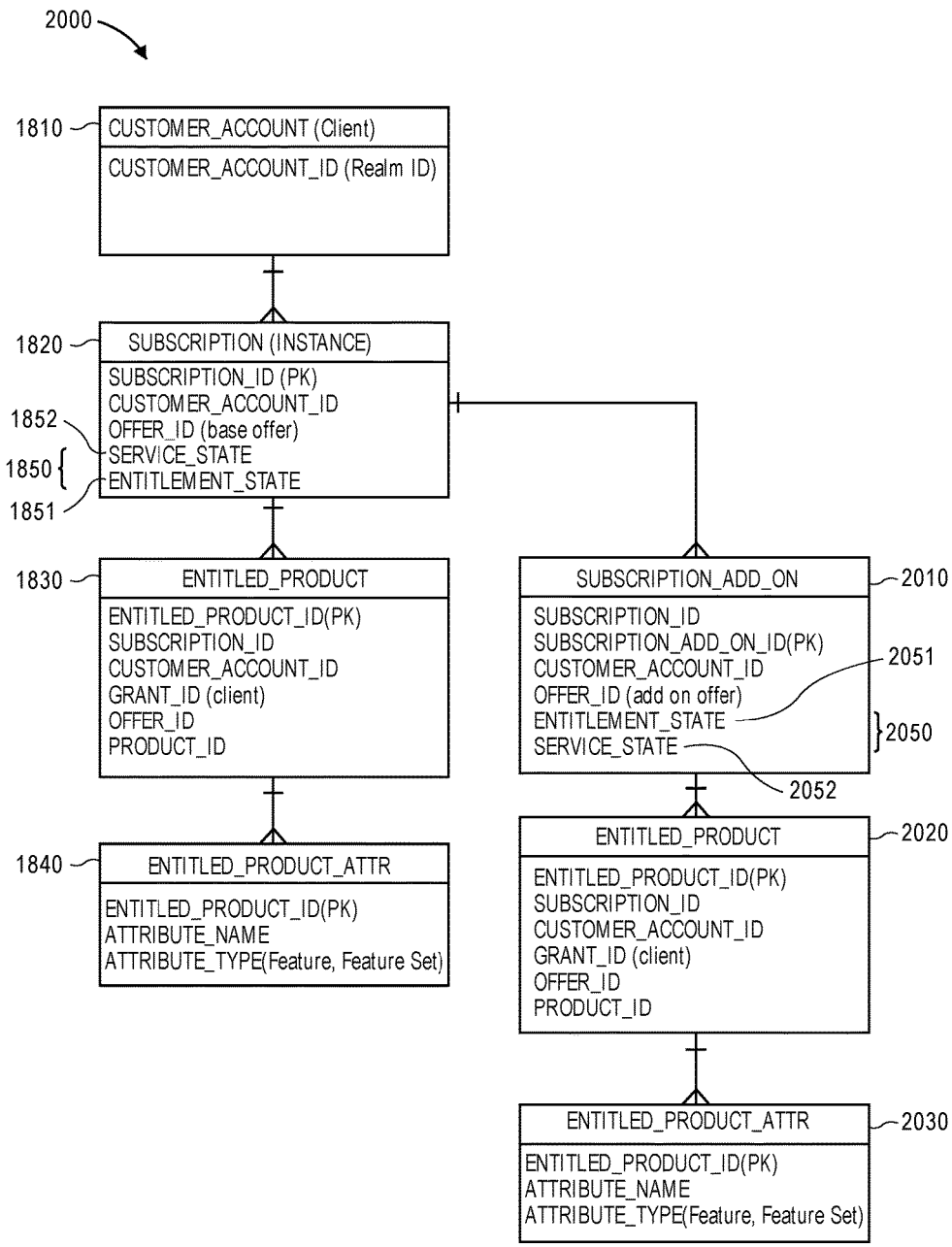

Referring to FIGS. 20A-B, a runtime subscription model 2000 constructed according to one embodiment and that also incorporates an integrated entitlement state—service state model 1850 also provides for add-ons to the entitled product. In the illustrated embodiment, the runtime subscription model 2000 provides for automated and adaptive software product governance including controlling use of a first or base computer software product by a subscriber or customer and a subscription add-on, or a different, second computer software product, are illustrated. While in FIG. 18B reference is made to an entitled product, when discussing embodiments involving an add-on to that entitled product, reference is made to the "base" entitled product and the "add-on" to that base entitled product. Reference to a subscription "add-on" is defined as a different and independent computer software product relative to the base or first computer software product (in contrast to an additional or new "feature" add-on for the same base or first computer software product).

For example, a customer may have a paid subscription to a base entitled product of QUICKBOOKS ONLINE (QBO) and may be eligible, by virtue of already having a paid subscription to QBO, to access a different product, such as INTUIT PAYROLL. Thus, whether a subscription add-on is available to a customer depends on the base entitled product to which the customer is also subscribed such that subscription add-ons as reflected in the runtime subscription model 2000 and account for a portfolio of products under a subscription that can evolve independently of the subscription to a base entitled product. Thus, an "add-on" to a computer software product such as QBO is distinguished from another "feature" of QBO.

In the illustrated embodiment, the runtime subscription model 2000 that accounts for subscription add-ons includes various elements, tables, objects or records (generally, "element") that are linked or associated with each other and data thereof as described with reference to FIGS. 18A-B including a CUSTOMER_ACCOUNT (Client) element 1810, SUBSCRIPTION(INSTANCE) ELEMENT 1820, ENTITLED_PRODUCT element 1830 and ENTITLED_PRODUCT_ATTR element 1840, and the integrated or hybrid entitlement state—service state model 1850 being contained within the SUBSCRIPTION(INTANCE) element 1820, details about which are described with reference to FIGS. 18A-B and not repeated. Further, in the embodiment illustrated in FIGS. 20A-B, the runtime subscription model 2000 also includes a Subscription Add On element 2010 that is associated with, related to, linked to, or cross-referenced with the Subscription(Instance) element 1820 described with reference to FIGS. 18A-B, and is also associated with, related to, linked to, or cross-referenced with an Entitled Product element 2020 (which is the product that is the add-on the first or base Entitled Product), which is associated with, related to, linked to, or cross-referenced with, the Entitled Product Attribute element 2030 for that add-on entitled product.

A Subscription Add On element 2010 configured according to one embodiment and integrated with a Subscription (Instance) 1820 that specifies a separate add-on computer software product to a base entitled software product includes fields or attributes:

SUBSCRIPTION_ID: as noted above with reference to SUBSCRIPTION(INSTANCE), a unique ID to a customer that is used to identify a subscription or instantiation of an offer pertaining to the computer software product SUBSCRIPTION_ADD_ON_ID(PK) (a unique identifier to a customer that is used to segregate multiple instances of a subscription add-on offer from the base level offer on the parent Subscription. A subscription add-on offer is an offer level that 'extends' the customer offering portfolio for a specific subscription with new product (s). The subscription add-on offer can be cancelled or de-entitled independently from the base level offer and is not considered part of the same arrangement as the subscription (base offer) or any other active subscription add-on. Subscription add-on offers can only contain dependent products.

CUSTOMER_ACCOUNT_ID (as discussed above with reference to FIG. 18B, data for identifying a customer account, e.g., "Realm ID" generated by the access control system 1640 such as OII Grant in FIG. 16B).

OFFER_ID (add-on offer) (an external identifier reference on transactions from the initiating source application such as customer facing offering application 160 shown in FIGS. 1 and 16B). This identifier for an offer for which an add-on is available for pre-determined entitled products to which the customer is subscribed is received with transactions via the customer facing offering application 160 and re-populated when a subsequent transition is processed).

SERVICE_STATE (as discussed with reference to FIG. 18B, a component or state data 1852 of the integrated or hybrid entitlement-service state model 1850; the service state 1852 indicates which status the subscription is in in terms of, for example, whether the customer is paying or is not, and drives what actions a user can take next in terms of changing their subscription portfolio).

ENTITLEMENT_STATE) STATE (a component or state data 1851 of the integrated or hybrid entitlement-service state model 1850 that governs customer access to or use of the computer software product and in certain embodiments, may specify multiple access attributes such as whether access is allowed and the level of access.

As shown in FIG. 18B, the integrated or hybrid entitlement state—service state model 1850 extends across multiple subscription data elements—one integrated or hybrid state model 1850 for the subscription element 1820 involving the base entitled product, and one integrated or hybrid state model 2050 with its own entitlement state data 2051 and service state data 2052 involving the add-on product, as specified by the entitled product and entitled product attribute element 2020 and 2030.

Figure 21A:
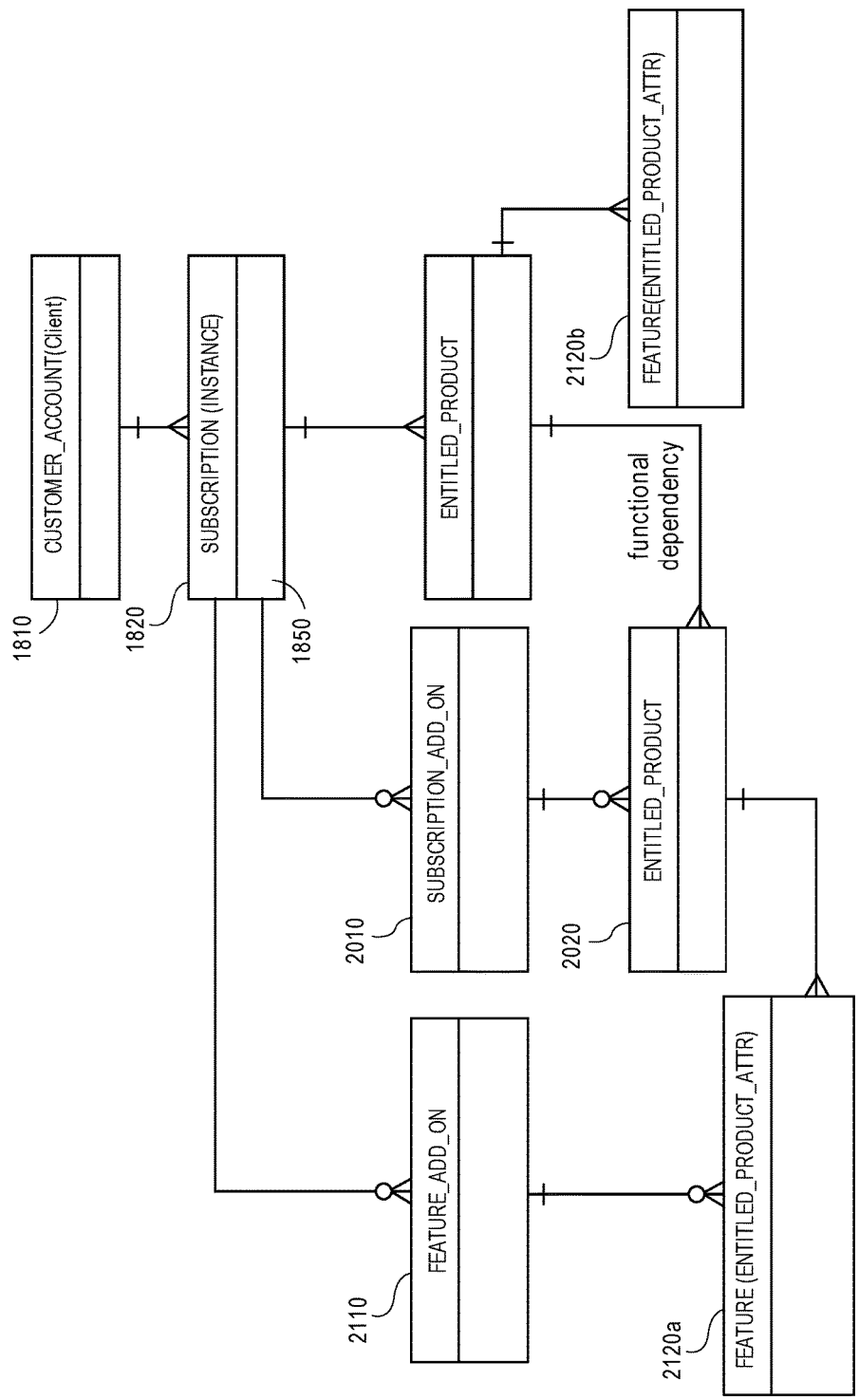
FIGS. 21A-B illustrate a subscription model constructed according to one embodiment that includes an integrated or hybrid entitlement-service state model and how different model elements are related to each other in order to control access to a computer software product that was the subject of a system generated offer and customer actions related thereto and that also provides for management of product add-ons to a base entitled computer software product and for management of feature add-ons to an entitled computer software product.
Figure 21B:
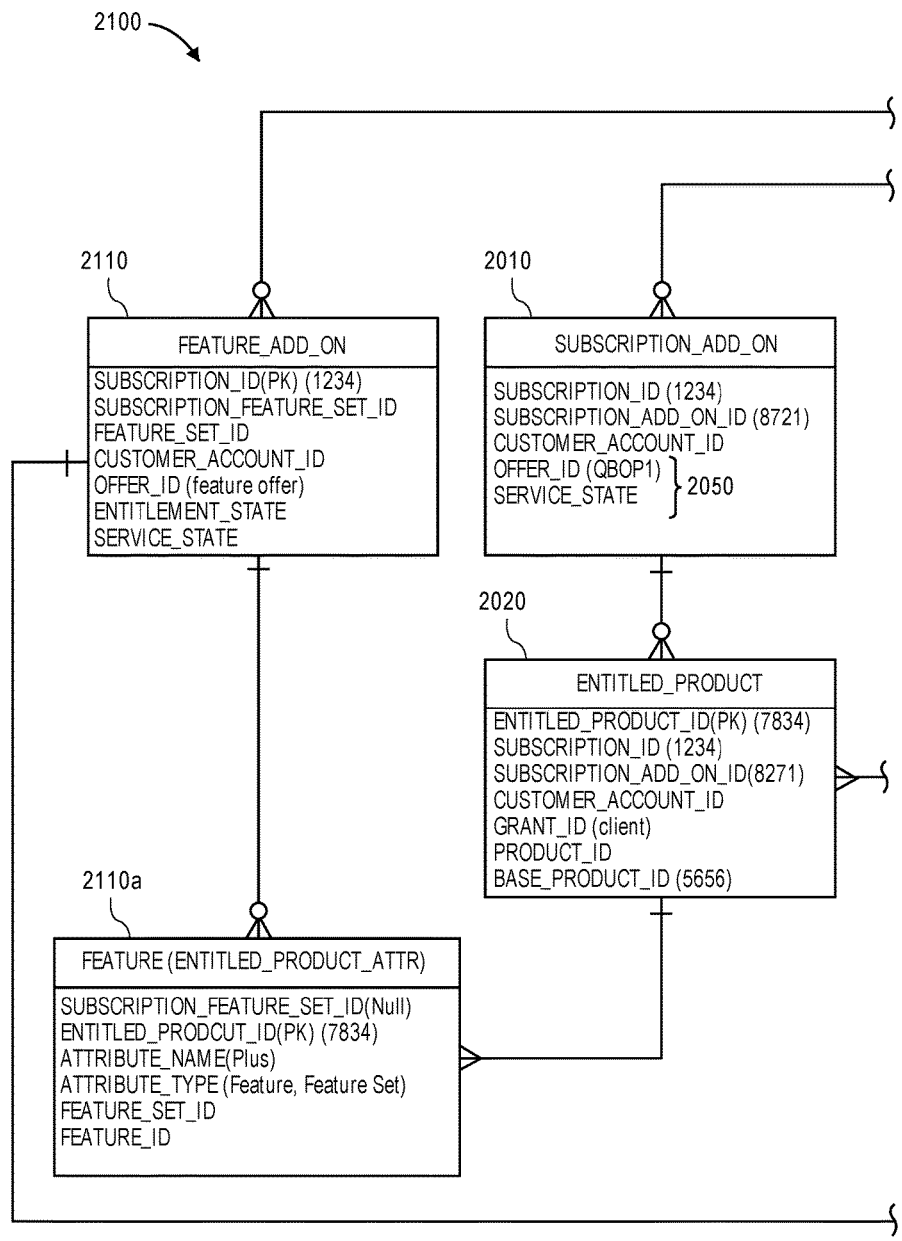
Figure 21B:
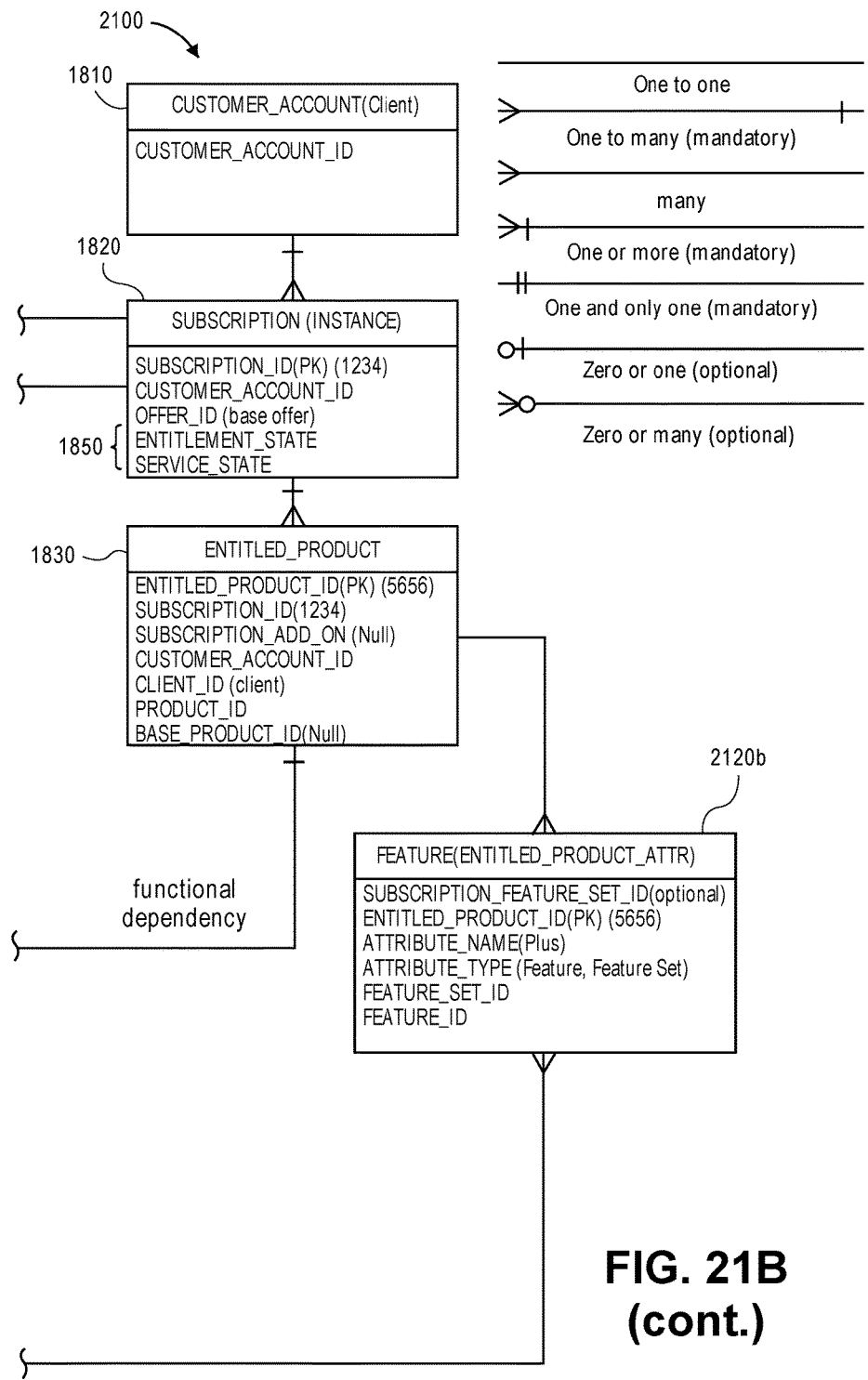

Referring to FIGS. 21A-B, while certain embodiments are described with reference to a subscription add-on in the form of a separate add-on computer software product to a different and independent base computer program product, embodiments may also account for individual feature add-ons for the same entitled computer software product. FIGS. 21A-B illustrate an embodiment of a runtime subscription model 2100 that accounts for both subscription add-ons, which involve a different computer software product, and feature add-ons, which involve other features for the same entitled product. Thus, a customer may have a paid subscription to a base entitled product of QBO with a limited feature set and may be eligible, by virtue of already having a paid subscription to QBO, to also utilize other add-on QBO features or QBO feature sets.

The embodiment illustrated in FIGS. 21A-B illustrate a runtime subscription model 2100 that includes a feature add-ons and product add-ons, and it will be understood that embodiments may involve one or both types of add-ons, or no such add-ons.

Referring to FIGS. 21A-B, a runtime subscription model 2100 constructed according to one embodiment and that incorporates an integrated or hybrid entitlement state—service state model 1850 also provides for feature add-ons (versus product add-ons) to the entitled product. In the illustrated embodiment, the runtime subscription model 2100 provides for adaptive governance of use of a first or base computer software product by a subscriber or customer and an add-on of a feature for that same entitled product are illustrated. In the illustrated embodiment, the runtime subscription model 2100 that accounts for feature add-ons includes various elements, tables, objects or records (generally, "element") that are linked or associated with each other and data thereof, various aspects of which are described with reference to FIGS. 18A-B and 20A-B, and the runtime subscription model 2100 may have feature-specific data elements including FEATURE_ADD-ON element 2100, FEATURE (ENTITLED_PRODUCT_ATTR) element 2110 (two of which 2110*a*, 2001*b* are shown for features pertaining to the different entitled products), and additional subscription add-on references can be added to previously described ENTITLED PRODUCT elements as needed.

Continuing with reference to FIGS. 16B, 17 and 18, as discussed above, computing systems constructed according to embodiments include a software product access control or enforcement system 1640/1730 (OII Grant in FIG. 16B, and generally access control system 1730), which receives updates from the database 1710. In the illustrated embodiment, elements of a runtime composite model 1760 for access management are included in both the database 1710 and the access control system 1730, and although not illustrated, may also be included within other system components such as a billing system (not illustrated in FIG. 17). The updates or events 1722 are reflected in the database 1710 portion of the runtime composite model 1760 and or entitlement-service state model 1750 portion of the runtime composite model 1760 and indicate how the state was modified or transformed during runtime and reflects both entitlement state 1851 and service state 1852 and which computer software product 160 or version thereof the consumer is entitled to access.

Thus, when a user logs into the system via the offering application or computer software product 160 or attempts to open or access the computer software product 160, the access control system 1730 receives an access request (e.g., "Get Grant" in FIG. 16B), checks for current runtime composite model 1760 data from the database 1710 if necessary, automatically checks whether the customer is granted access to the requested computer software product 160 based on grant status 1732 of the runtime composite model 1760, and if so, which version or capabilities thereof, and which access restrictions may apply. These determinations may be based on a grant status 1732 that is based at least in part upon entitlement and service state 1851, 1852 attributes applicable to a client and/or accountant of the client.

For example, according to one embodiment, and as illustrated in FIG. 17, an access control computing system 1730 constructed according to one embodiment utilizes both a subscription entitlement provisioning system or database 1710 including a runtime hybrid subscription model 1750 including first state data specifying entitlement to a subscription to a computer software product 160 and second state data specifying permissible customer actions involving the computer software product 160 based at least in part upon the first state data (as described above with reference to FIG. 18). According to one embodiment, the runtime composite model 1760, in contrast to the runtime hybrid subscription model 1750 of Subscription (Instance) element 1820, is distributed across multiple computing system components. According to one embodiment, as generally illustrated in FIG. 17, components or elements of the runtime composite model 1760 are distributed across the access control system 1730 and the subscription management database 1710, and may also be distributed across the product offering 160 and a billing system 150*b* (as shown in FIG. 16C).

Figure 22:
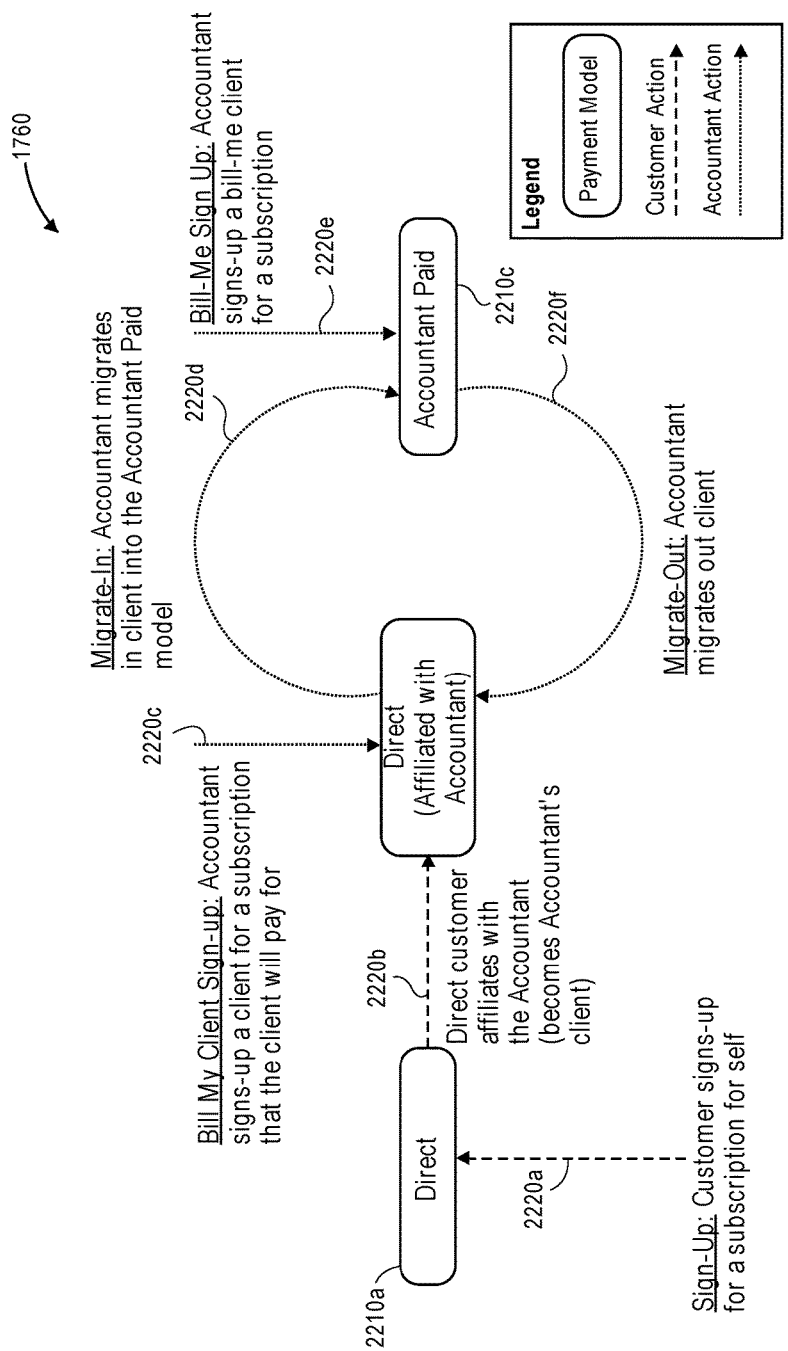
FIG. 22 illustrates how a runtime composite model constructed according to embodiment can reflect different client-accountant relationships and associated entitlements and transitions thereof.

Referring to FIG. 22, a runtime composite model 1760 constructed according to one embodiment includes different models or model components reflecting different client-accountant relationships and associated entitlements and transitions thereof. Although not shown in FIG. 22, but as described in further detail with reference to FIG. 23 and FIGS. 24A-C, elements of the runtime composite model 1760 may be distributed or extend across system elements including the database 1710 (e.g. WEBS) and the access control system 1730 (OII Grant) and may also extend across other system components such as a billing system 150*b* (e.g., BRM). According to one embodiment, the runtime composite model 1760 includes models 2210*a-c*: Direct model 2210*a*, a Direct (Affiliated with Accountant) model 2210*b* and an Accountant Paid or wholesale model 2210*c*.

According to one embodiment, the "Direct" access model 2210 of the runtime composite model 1760 involves a customer (which may be an accountant, client or other end user) signing up for a subscription to a computer software product 160, such as a computerized financial management system (e.g., QBO or QBO Plus). The Direct model 2210*a* applies when the customer signs up 2220*a* for the subscription and involves terms including direct pricing and the customer is specified in the runtime composite model 1760 as the owner of the entitlement to the computer software product 160, or the entity that has the right to use the a computer software product 160, as further defined by the entitlement state 1851 (Active, Inactive, Closed), which specifies whether the customer can access the computer software product 160 and the level of access, and the service state 1852, which specifies allowable customer actions for a given entitlement state 1851. Thus, in the context of a client or customer, the direct model 2210*a* of the runtime composite model 1760 does not involve client-accountant (noting again that an accountant may be involved if the accountant is the customer). Thus, in the Direct model 2210*a*, the customer is invoiced by and submits payment to the host of the computer software product 160, such as Intuit Inc., in the case of a computerized financial management system such as QBO or QBO Plus.

According to one embodiment, the "Direct-Affiliated" model 2210*b* of the runtime composite model 1760 also involves the customer continuing to be specified as the owner of the entitlement to the computer software product 160, or the entity that has the right to use the a computer software product 160, but has engaged services of an accountant. As shown in FIG. 22, the transition 2220*a* from the direct model 2210*a* to the direct-affiliated model 2210*b* may be a result of customer action engaging or forming an affiliation with the accountant 2220*b* in which case the client remains on direct pricing and continues to be invoiced by and pay the host of the computer software product 160 but is also invoiced by and pays the accountant for accountant services. The Directed-Affiliated model 2210*b* may also apply if the accountant signs up 2220*c* a client for a subscription to the computer software product 160. In this case, the client is the entitlement owner and pays the host for the subscription but may receive different or reduced pricing terms for signing up through the accountant.

From the "Direct-Affiliated" model 2210*b* of the runtime composite model 1760, the customer may transition or "migrate in" 2220*d* to a third model of the runtime composite model, generally referred to as wholesale or accountant paid model 2210*c*. The wholesale model 2210*c* applies when the customer is provided with access to the computer software product 160 but is not the entitled owner of the computer software product—instead, the accountant changed to be the entitled owner. Thus, the wholesale model 2210*c* involves modifying entitlement or ownership to the computer software product 160 from the customer (as in Direct-Affiliated) to the accountant, and the customer may receive further reduced or wholesale pricing as a result of utilizing the computer software product 160 through the accountant's subscription, in which case the customer now receives a single invoice from the accountant rather than two separate invoices from the host and from the accountant. The accountant is then responsible for payment to the host for the accountant's "new" subscription to the computer software product 160. The wholesale or accountant paid model 2210c may also apply independently of the direct-affiliated model 2210b when the accountant signs up 2220e a client for a subscription for wholesale pricing while the accountant is the entitlement owner and pays the host, otherwise referred to as "bill me sign up."

With continuing reference to FIG. 22 and the accountant paid or wholesale model 2210c of the runtime composite model 1760, while a client may be "migrated in" 2220d by the accountant from the direct-affiliated model 2210b to the accountant paid or wholesale model 2210c, a client may also be "migrated out" 2220f by the accountant from the wholesale model 2210c back to the direct-affiliated model 2210b, in which case subscription entitlement is modified from the accountant to the customer. With activation of the direct-affiliated model 2210b, the customer would then pay the host for the subscription rather than the accountant. As shown in FIG. 22, transitions are possible from the first or direct model 2210q to the second or direct-affiliated model 2210b, from the second or direct-affiliated model 2210b to the third or wholesale model 2210c, and from the third or wholesale model 2210c to the second or direct-affiliated model 2210b. However, there is e is no transition between the first or direct model 2210a and the third or wholesale model 2210c. FIGS. 23 and 24A-C illustrate how these transitions and entitlement and billing modifications are reflected in a specifically configured runtime composite model 1760.

Figure 23:
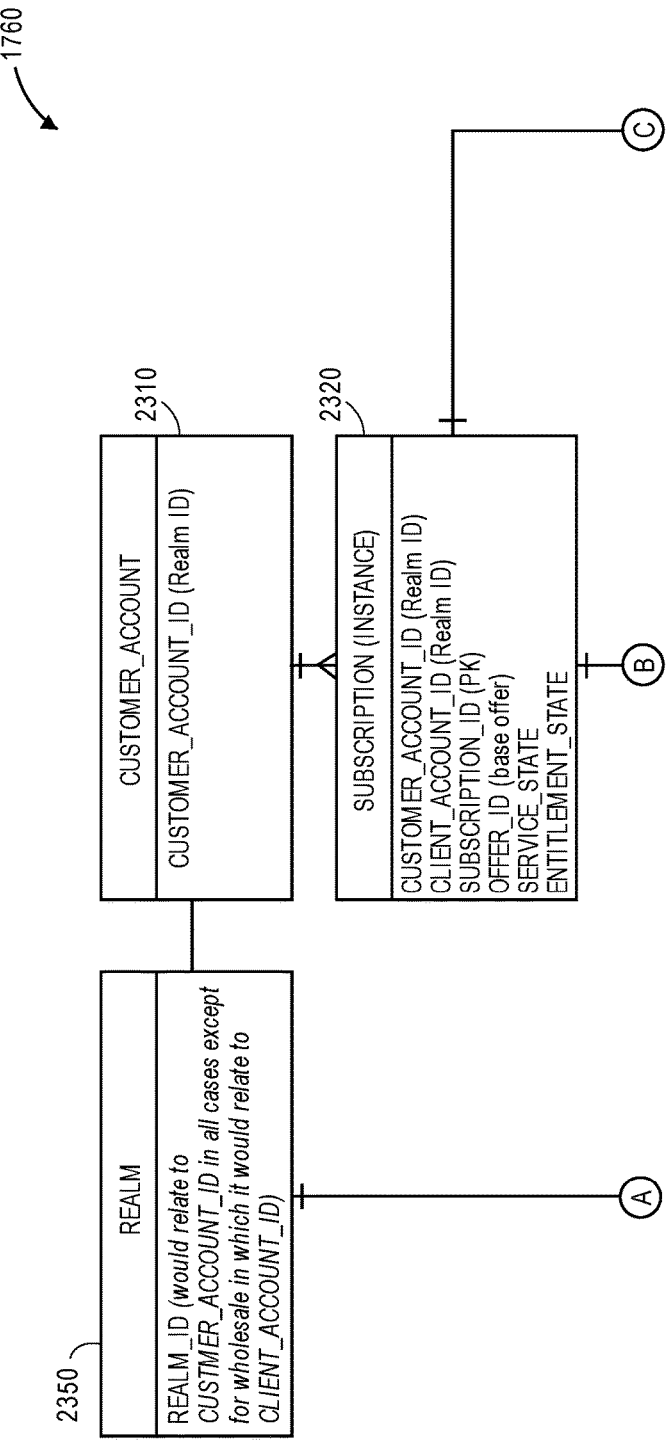
FIG. 23 illustrates how a runtime composite model is constructed according to one embodiment that that is distributed or extends across a plurality of system elements.
Figure 23:
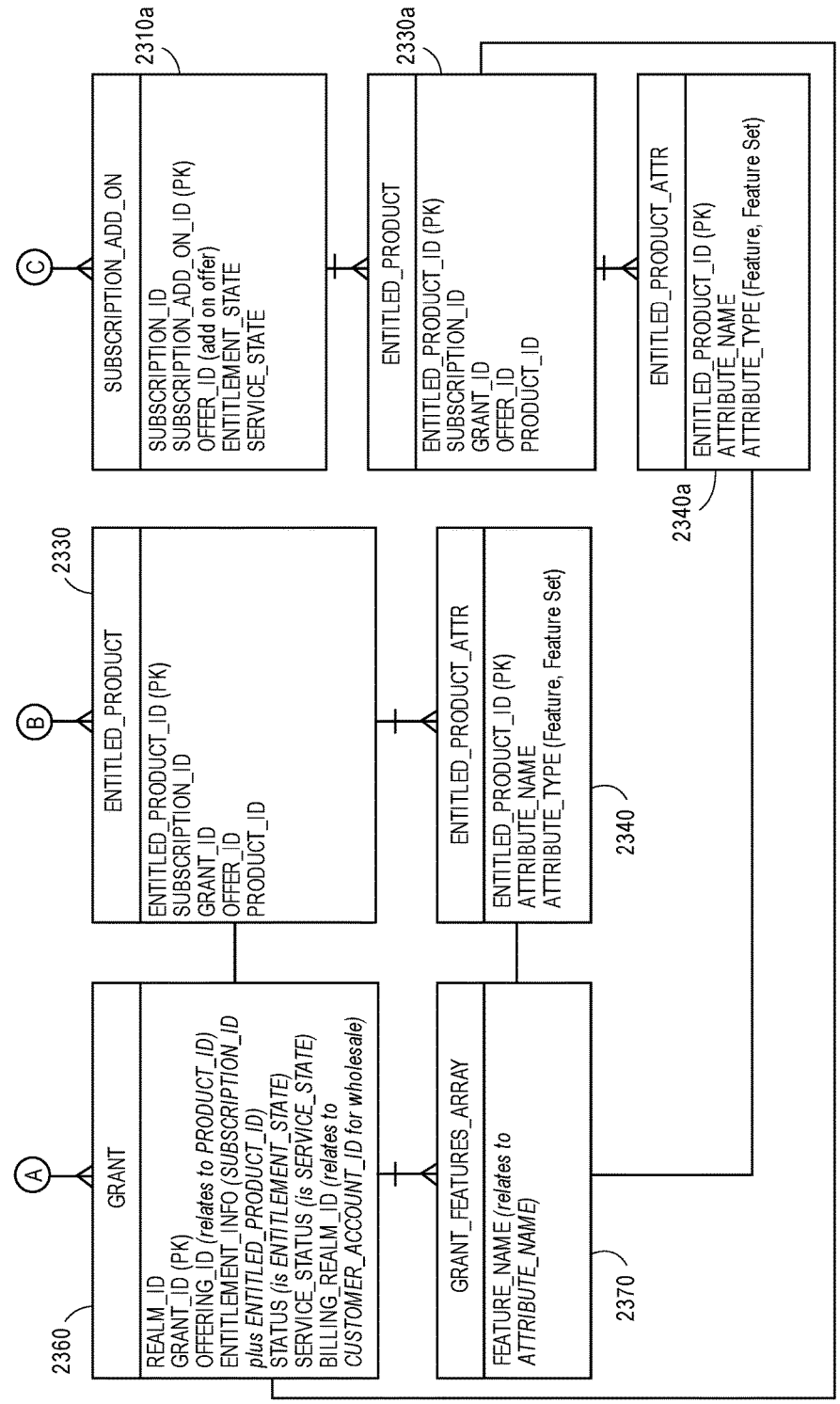

Referring to FIG. 23, a runtime composite model 1760/2300 (including hybrid entitlement-service state model 1850 of the database 1710) constructed according to embodiments for governing access to a computer software product 160 by a subscriber or customer is illustrated. In the illustrated embodiment, the runtime logical model 2300 includes multiple elements, tables, objects or records (generally, "element") that are linked or associated with each other and one data element includes an integrated or hybrid entitlement state—service state model 1850 (discussed with reference to FIG. 18), which includes first state data 1851 related to the customer's entitlement to a computer software product and for governing access to the computer software product by the customer, and second state data 1852 related to a service state and that is used to specify actions that can be requested or executed by the customer given the current combination of an entitlement state or first state data 1851 and service state or second state data 1852.

In the illustrated embodiment, the runtime composite model 2300 includes runtime model elements for customer account 2310, subscription (subscription instance) 2320, entitled product 2330 of the subscription instance and entitled product attributes 2340, model elements in the event of an add-on (e.g., a payroll program as an add-on to QBO), in which case the runtime composite model 2300 also includes runtime model elements for subscription add on 2310a ("a" referring to add on), entitled product 2330a associated with the add on subscription, and entitled product attributes 2340a.

As shown in FIG. 23, the runtime composite model 2300 also includes model elements of the access control system 1730 including Realm 2350, Grant 2360 and Grant features array 2370. The runtime composite model 2300 structured according to one embodiment as illustrated in FIG. 23 is a runtime composite model in that model elements are not only distributed across different system components, namely, the subscription management database (WEBS) 1710/150a and the access control/enforcement system 1730/1640 (OII Grant) (and other components in other embodiments), but also in that the runtime composite model 2300 accounts for both entitlement and access management across different system components.

More specifically, in the embodiment illustrated in FIG. 23, certain aspects of which are also described above with reference to FIG. 18B, the runtime composite model 1760 includes elements of a runtime subscription model 1800, which includes a Customer Account (client) element 2310 that is associated with, related to, linked to, or cross-referenced with a Subscription (Instance) element 2320, which is associated with, related to, linked to, or cross-referenced with an Entitled Product element 2330, which is associated with, related to, linked to, or cross-referenced with, the Entitled Product Attribute element 1230. To account for an add-on to the computer software product, the runtime composite model 1760 may also include a Subscription Add On element 2310a, which is associated with, related to, linked to, or cross-referenced with the Subscription (Instance) element 2320 and the Entitled Product element 2330a (for add-on), which is related to, linked to or cross-referenced with the Entitled Product Attribute element 2340. These runtime composite model 1760 elements are elements of the subscription management database (WEBS) 1710.

In the illustrated embodiment, the runtime composite model 1760 also includes model elements that are elements of the access control/enforcement system 1730 (OII Grant) such that the runtime composite model 1760 is distributed across at least the subscription management database 1710 and the access control system 1730. In the illustrated embodiment, the runtime composite model 1760 elements of the access control system 1730 include a Realm element 2350, a Grant element 2360 and a Grant Features Array element 2370.

Attributes or data of the Realm element 2350 are related to or based on attributes or data of the Customer_Account element of the database 1710, and the Realm element 2350 is linked to or cross-referenced with the Grant element 2360 of the access control system 1730. Attributes or data of the Grant element 2360 are related to or based on attributes or data of the Entitled_Product (2330/2330a) element(s) of the database 1710, and the Grant element 2360 is linked to or cross-referenced with the Realm element 2350 and the Grant Features Array element 2360. The Realm element 2360 of the access control system 1730 is associated with, related to, linked to, or cross-referenced with the Customer Account element 2310 of the subscription management database 1710 and the Grant element 2360 of the access control system 1730, and the Grant element 2360 is related to, linked to or cross-referenced with the Realm element 2350 of the access control system 1730, the Entitled Product element 2330/2330a (if add-on) of the subscription management database 1710, and the Grant Features Array element 2370 of the access control system 1730, which is related to, linked to, or cross-referenced with the Entitled_Product Attr element 2340/2340a, thus demonstrating how elements of the runtime composite model extend across different components of the computing system.

Following are descriptions of the runtime composite model 1760 elements and how the "Grant" element 2360 or access control system 1730 elements of the runtime composite model 1760 are related to the subscription management database 1710 elements of the runtime composite model 1760.

The Customer account element 2310 of the runtime composite model 1760, also as described with reference to FIG. 18B, is used to identify a customer account by "Realm ID" or a name or other identifier for a customer account identification generated by an access control or enforcement system 1640/1730 such as OII Grant in FIG. 16B. This is also utilized in the access control system 1730 as the OII Relam_ID attribute in the Realm element 2350 as shown in FIG. 23

The subscription element 2320 of the runtime composite model 1760 identifies a portfolio of products that a customer owns and that bills or invoices together as a group. A subscription is associated with a single active "base" or primary offer that includes at least one base or primary product. A subscription element 2320 of the runtime composite model 1760 configured according to one embodiment includes attributes:

CUSTOMER_ACCOUNT_ID: which is the access control system 1730 (OII Grant) Realm_ID, which is an attribute of both the Realm and Grant elements 2350, 2360 of the runtime composite model 1760 of the access control system 1730, and as noted above "Realm ID" generated by the access control system 1730.

CLIENT_ACCOUNT_ID: which is also Realm_ID in the runtime composite model 1760 elements of the access control system 1730 (Realm element 2350 and Grant element 2360). This attribute is populated when the wholesale model 2210c applies and the accountant is billed for all of its clients. In this scenario, the accountant is the CUSTOMER_ACCOUNT_ID (i.e. accountant) and the user or benefactor of the entitlement is the client or customer which is the CLIENT_ACCOUNT_ID. In the access control system 1730 (OII Grant) (as described with reference to FIG. 24), the BILLING_REALM_ID attribute in the runtime composite model 1760 of the access control system 1730 (OII GRANT) is populated with CUSTOMER_ACCOUNT_ID, and REALM_ID is the CLIENT_ACCOUNT_ID. In all other cases the REALM_ID in the Grant element 2360 is the CUSTOMER_ACCOUNT_ID.

SUBSCRIPTION_ID (PK): a Unique ID to a customer that is used to segregate multiple instances of a Sign-up or Buy Now offer. If a customer chooses to do another Sign-up or Buy Now instead of an upgrade of an existing offer to another offer, another instance of the Subscription is created. From that point forward, any future transactions indicate the Subscription ID. SUBSCRIPTION_ID and ENTITLED_PRODUCT_ID are combined and represented in the access control system 1730 such as OII GRANT as ENTITLEMENT_INFO in the Grant element 2360 of the portion of the runtime composite model 1760 of the access control system 1730 (OII Grant).

OFFER_ID: an External ID that is referenced on transactions from the initiating source application or customer facing offering application 160 shown in FIGS. 1 and 16b. This is the identifier that comes in with transactions and is re-populated when a subsequent transition is processed.

SERVICE_STATE: a component or state data 1852 of the integrated or hybrid entitlement-service state model 1850; the service state data 1852 indicates which status the subscription is in in terms of, for example, whether the customer is paying or is not, and drives what actions a user can take next in terms of changing their subscription portfolio and involves Trial, Trial Opted-in, Paid, Paid Cancel Pending, In Collection).

ENTITLEMENT_STATE: a component or state data 1851 of the integrated or hybrid entitlement-service state model 1850 that governs customer access to or use of the computer software product 160 and in certain embodiments, may specify multiple access attributes such as whether access is allowed and the level of access. This state can be 'Active' or full access, 'Inactive' where means customer only has read-only access, and 'Closed' which means no access.

An Entitled Product element 2330 configured according to one embodiment is identifies a specific computer software product 160 to which customer is entitled to use or access in accordance with their subscription portfolio and includes fields or attributes:

ENTITLED_PRODUCT_ID (PK): unique identifier for the entitled software produce 160, or identifying the specific software product 160 that a customer has under their subscription portfolio. Example: QuickBooks Online product.

PRODUCT_ID: an identifier that represents a Product or the most atomic level from a customer's point of view, i.e., what does the customer receive. A single offer can bundle several offerings into one. Product_ID is represented in the access control system 1730 (OII Grant) as OFFERING_ID in the Grant element 2360 of the runtime composite model 1760 of the access control system 1730 (OII Grant).

GRANT_ID (CLIENT): reference to a specific entry in the access control system 1730 (OII Grant) that enforces access to entitlements defined by the Entitled Product element 2330. All offering applications or computer software products 160 check with the access control system 1730 (OII Grant) to determine if the logged in user is allowed access or is allowed to perform the action they are attempting.

An Entitled Product Attribute element 1840 configured according to one embodiment represents all of the features 221 or feature sets 220 that a customer has related to the product, e.g., identified by product element 220, that they own. For example, as discussed above with reference to FIGS. 7A-D, a core or primary computer software product may be QUICKBOOKS ONLINE, or "QBO"), and a feature set model element is associated with the product model element and defines a set of features or limitations of the core computer software product (e.g., a particular version of the software product, such as QBO ESSENTIALS, QBO PLUS or Advanced Reporting feature).

ATTRIBUTE_TYPE: defines the attribute name that applies. Example: 'feature-set', 'feature'. In other words, this data defines a type of attribute, which may be, for example, Feature Value, Pre-paid Consumable Resource Limit, Concurrent Resource Limit, Identified Resource Limit, and/or an attribute related to a capability or functionality of the Product)

ATTRIBUTE_NAME: As discussed above with reference to FIG. 7B, a character value of the attribute, e.g., to signify QBO "Plus" or "Simple Start." This data defines the attribute name that applies. Changes to this value are reported to the access control system 1730.

The subscription add-on element 2310a of the runtime composite model 1760 of the subscription management database 1710 identifies a portfolio of products under a subscription that can evolve independent of the base subscription. Add-ons can be acquired under a subscription but can be cannot or have a different ENTITLEMENT_STATE and SERVICE_STATE from the parent subscription. In the illustrated embodiment, attributes of the subscription add-on element 2310a include Subscription_ID, Offer_ID, Entitlement_State and Service_state elements as previously described and also includes:

SUBSCRIPTION_ADD_ON_ID (PK): Unique ID to a customer that is used to segregate multiple instances of Add-on offer from the Base level offer on the parent Subscription. Add-on offer is an offer level that 'extends' the customer offering portfolio for a specific subscription with new product (s). The Add-on offer can be cancelled or de-entitled independently from the Base level offer and is not considered part of the same arrangement as the Subscription (Base offer) or any other active Subscription Add-on. Add-on offers can only contain dependent products.

In the Realm element 2350 of the runtime composite model 1760 of the access control system, the REALM_ID is the CUSTOMER_ACCOUNT_ID (or CLIENT_ACCOUNT_ID in the event that a wholesale model applies) of the Customer Account element 2310 of the runtime composite model 1760 of the subscription management database 1710 (WEBS).

In the Grant element 2360, which is populated for generation of a grant by the access control system 1730 that is provided as a response to a request by an offering application or computer software product 160 to access or utilize the computer software product 160, the Grant_ID attribute is included in both the subscription management database 1710 (WEBS) and access control system 1730 (OII Grant) and is the reference to the specific entry in the access control system 1730 that enforces access to the entitlements defined by the Entitled Product element 2330. Other attributes of the Grant element 2360 are related to corresponding attributes of the Subscription and Entitled Product elements 2320, 2330 of the subscription management database 1710 (WEBS).

Figure 24:
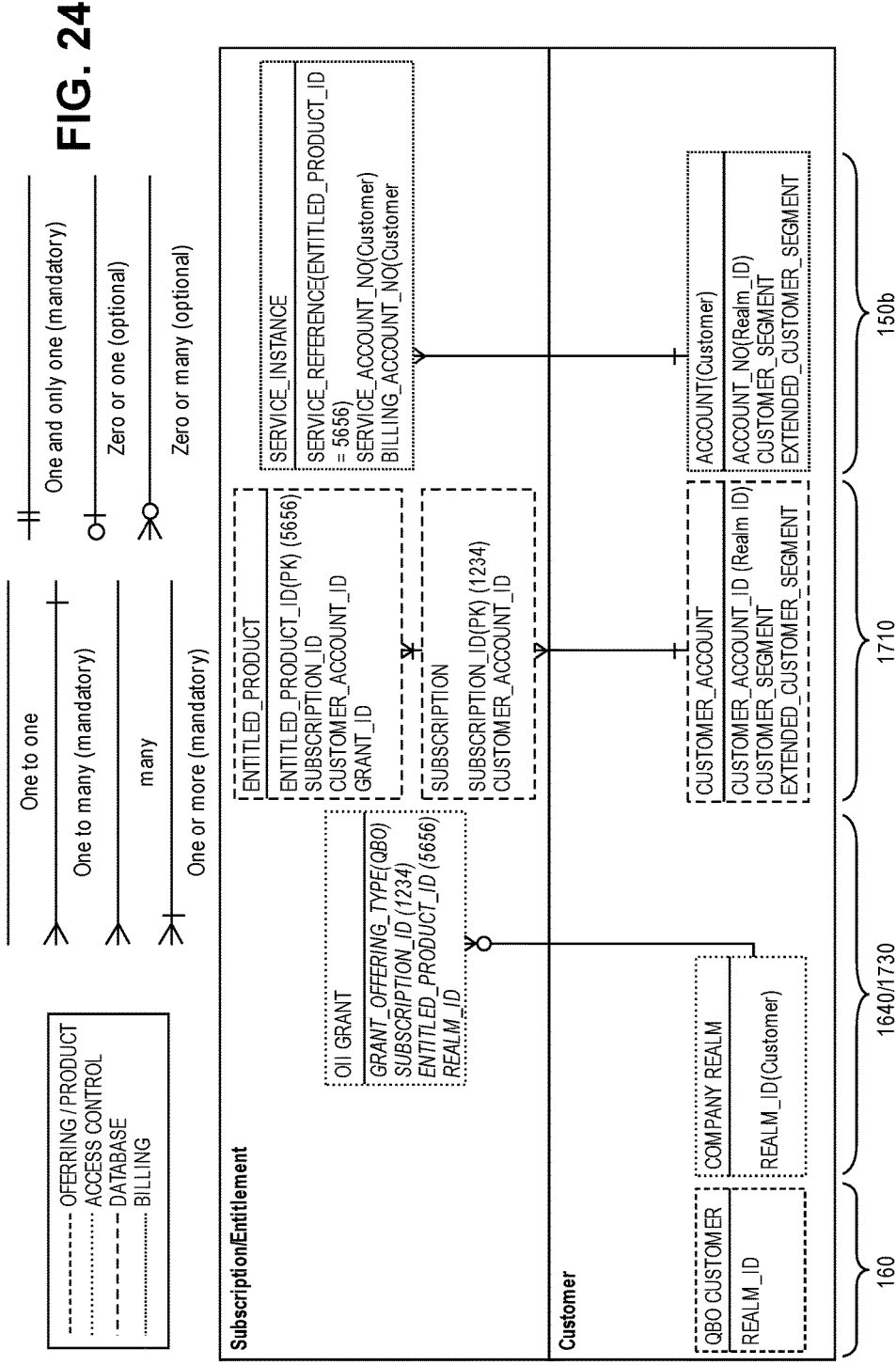
FIG. 24 illustrates an instance or implementation of the runtime composite model shown in FIG. 23 in the form of a direct model according to one embodiment.
Figure 25:
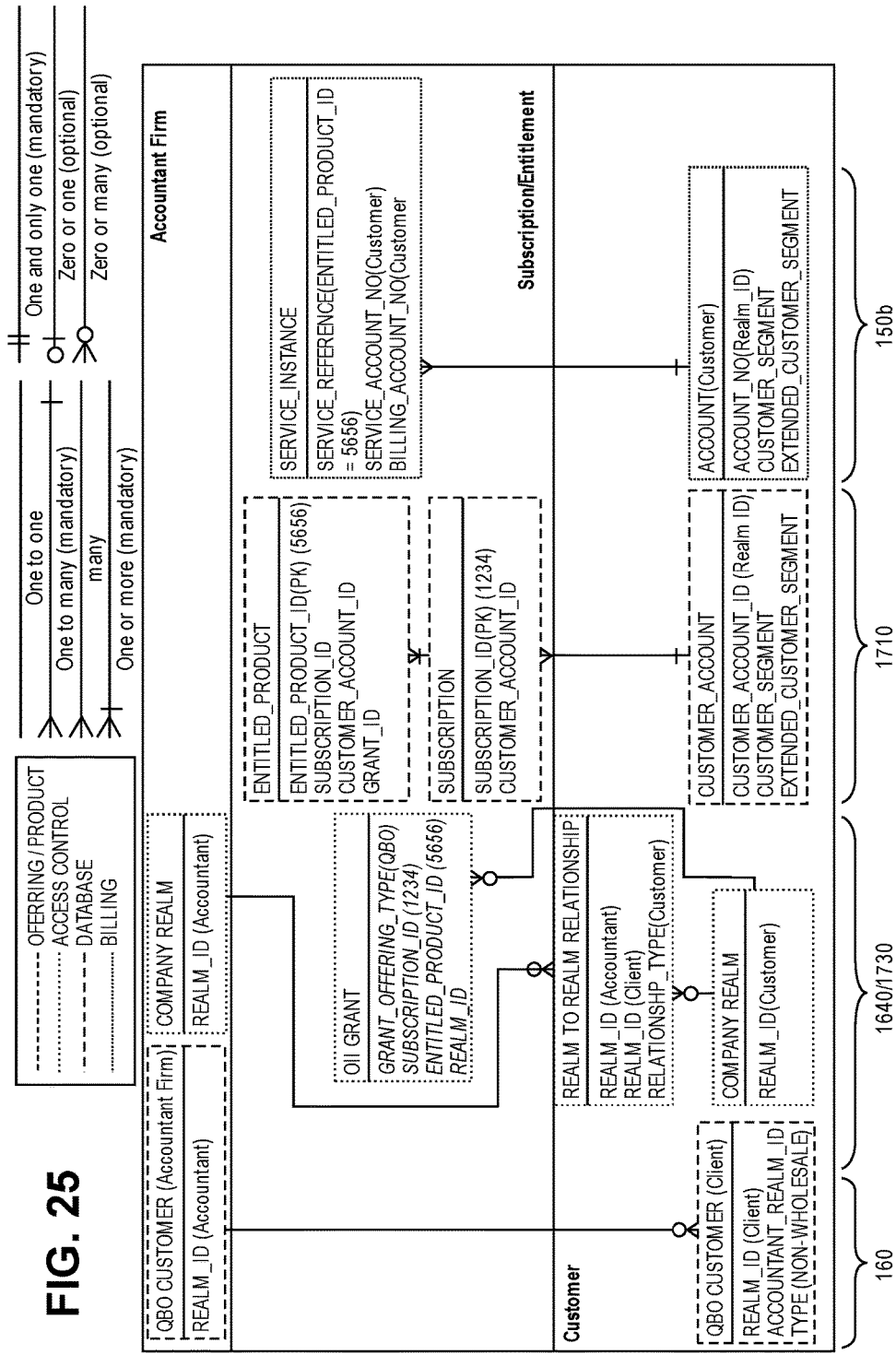
FIG. 25 illustrates an instance or implementation of the runtime composite model shown in FIG. 23 in the form of a direct-affiliated model according to one embodiment.
Figure 26:
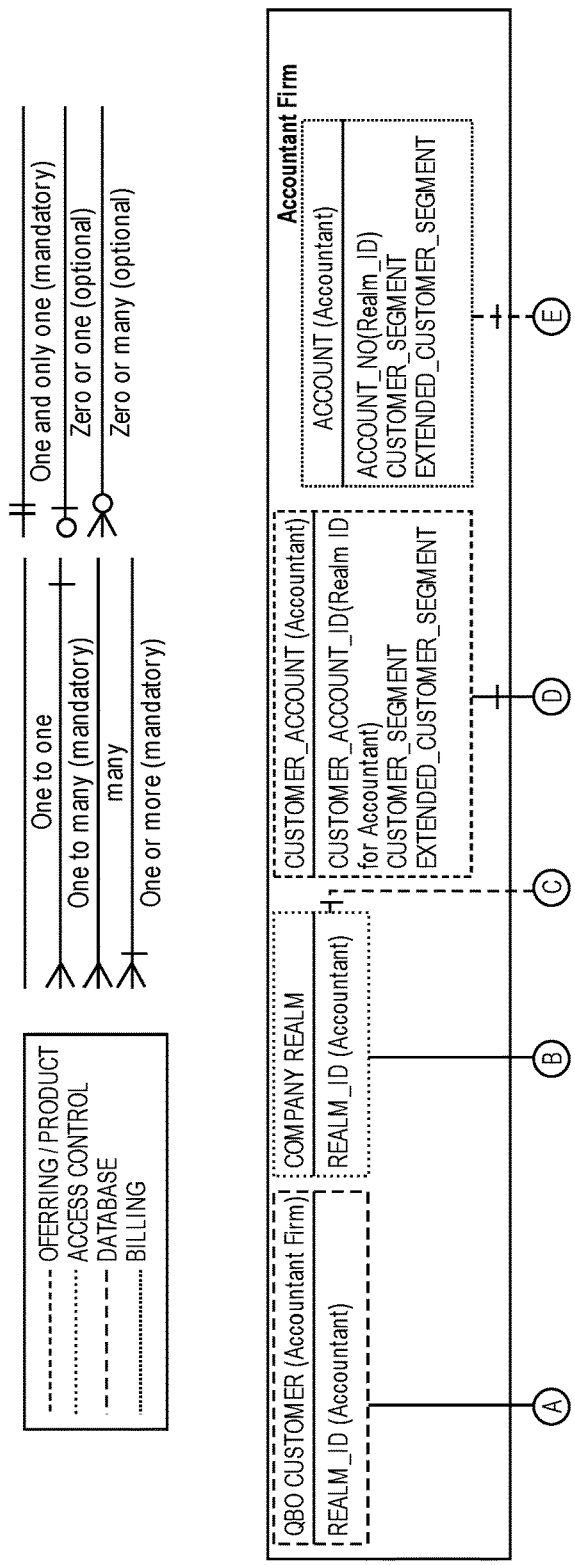
FIG. 26 illustrates an instance or implementation of the runtime composite model shown in FIG. 23 in the form of a wholesale or accountant paid model.
Figure 26:
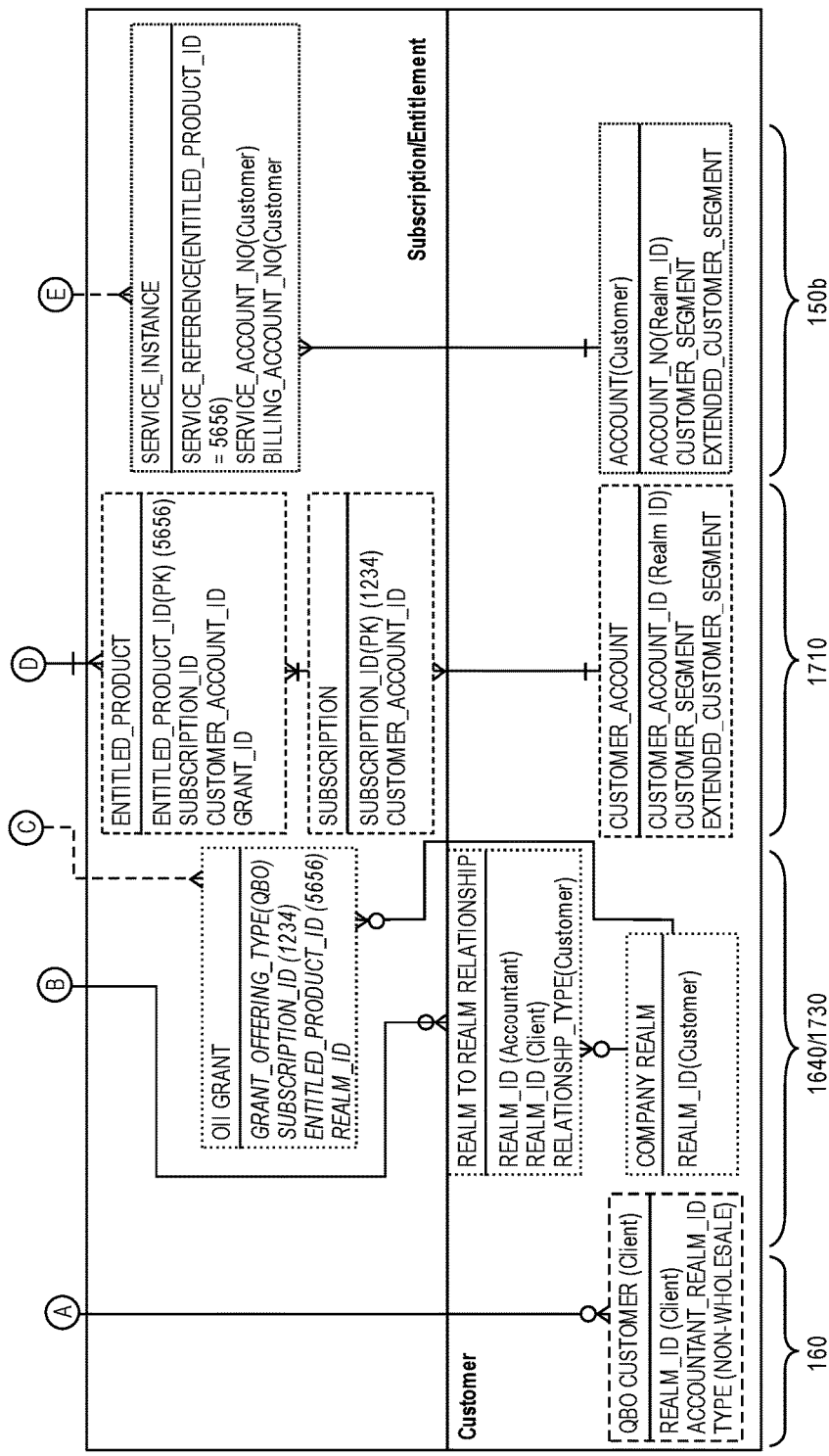

FIGS. 24-26 illustrate instances or implementations of the runtime composite model 1760/2300 shown in FIG. 23 for Direct 2210*a*, Direct-Affiliated 2210*b* and Accountant Paid or Wholesale 2210*c*, and further illustrate how components thereof extend across multiple computing system components including. FIGS. 23 and 24A-C also illustrate models reflecting results of the customer first signing up with the host system, generation of a Realm ID by the access control system 1730 for the customer, calling the subscription management database 1710 (WEBS) to create an account, subscription and entitlement defining what the customer will be allowed to access for the account/customer, which is instantiated at runtime for the customer, and a grant being created by the access control system 1730 such that when the customer logs into the computer software product 160 to which the customer is subscribed, the computer software product 160 calls the access control system 1730 (OII Grant) regarding whether access is to be provided to the customer, and the access control system 1730 returns grant data to the requesting computer software product 160. The customer is then allowed to access the computer software product 160 if so permitted by the access control system 1730.

FIG. 24 illustrates an instance or implementation of the runtime composite model 1760/2300 shown in FIG. 23 to illustrate a "Direct" model 2210*a*/2400 of the runtime composite model 1760, FIG. 25 illustrates an instance or implementation of the runtime composite model 1760/2400 shown in FIG. 23 to illustrate a "Direct-affiliated" runtime composite model 2210*b*/2500, and FIG. 26 illustrates an instance or implementation of the runtime composite model 1760/2300 shown in FIG. 23 to illustrate a "Wholesale" or "Accountant Paid" runtime composite model 2210*c*/2600. In these models 2400, 2500, 2600, the Grant element is modified depending on whether Direct, Direct-Affiliated or Wholesale applies.

For example, in FIG. 24, the Realm_ID in the Grant element may identify a Client or Accountant (in cases in which the accountant is the customer), in FIGS. 25-26, the Realm_ID is "Client" to indicate that the client (not the accountant) is the owner of the entitlement and is the entity accessing the computer software product, and in FIG. 26 for the "wholesale" situation in which the accountant is the entitlement owner and the client is granted access to the software product via the accountant's subscription (in contrast to Direct and Direct-Affiliated), the Billing_Realm_ID in the Grant element of the runtime composite model for the access control system 1730 indicates that the "Accountant" is to be billed or invoiced, Billing_Account_No in the Service_Instance element of the runtime composite model for the billing system (BRM) also indicates the accountant, whereas the Service_Account_No identifies the client to indicate that client is the one using or accessing the computer software product 160.

Figure 27A:
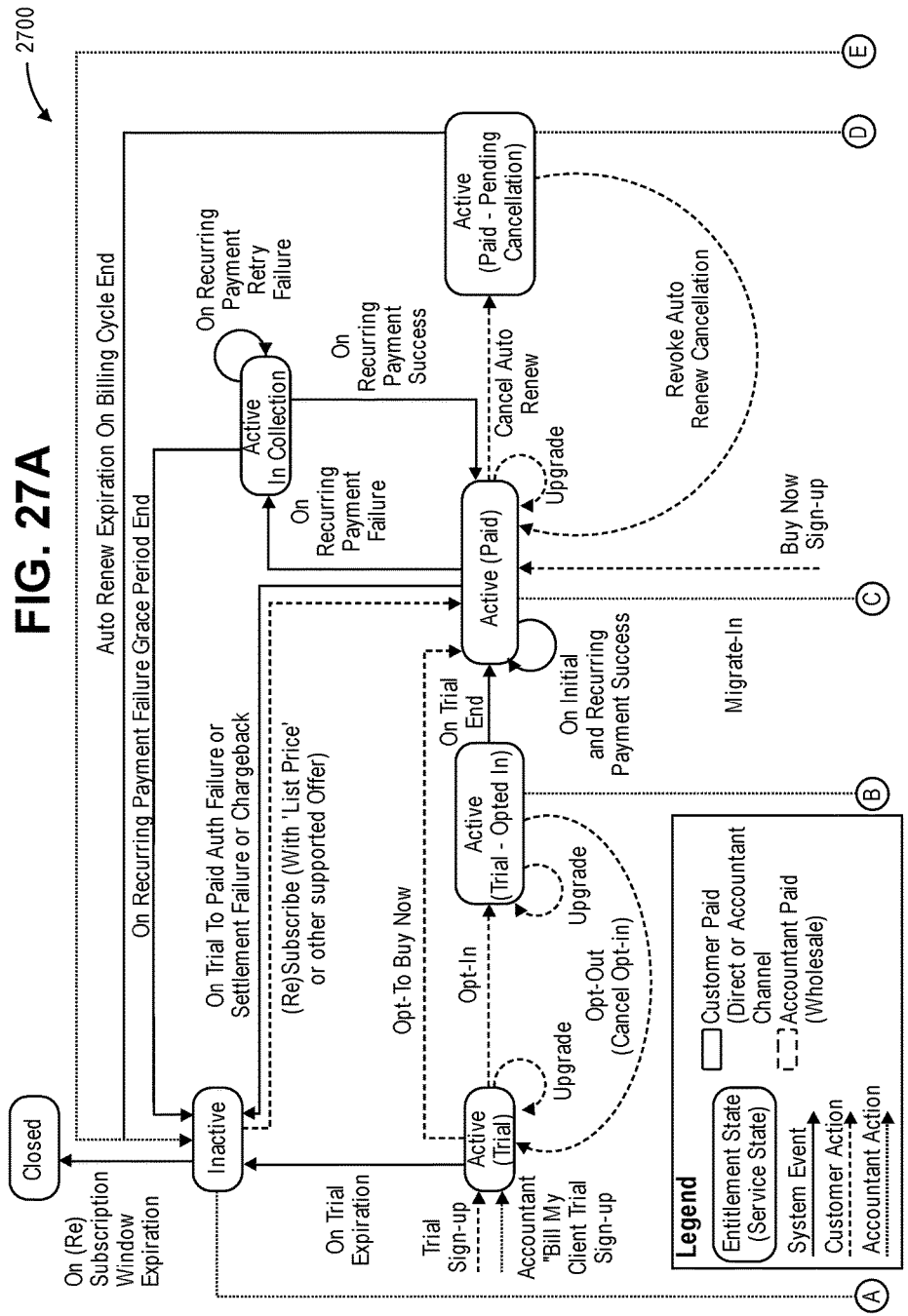
FIGS. 27A-B is a system flow diagram illustrating how a wholesale or accountant paid model of a runtime composite model can be integrated with elements of FIG. 19 according to one embodiment to account for direct, direct-affiliated and wholesale or accountant paid model instances of the runtime composite model.
Figure 27B:
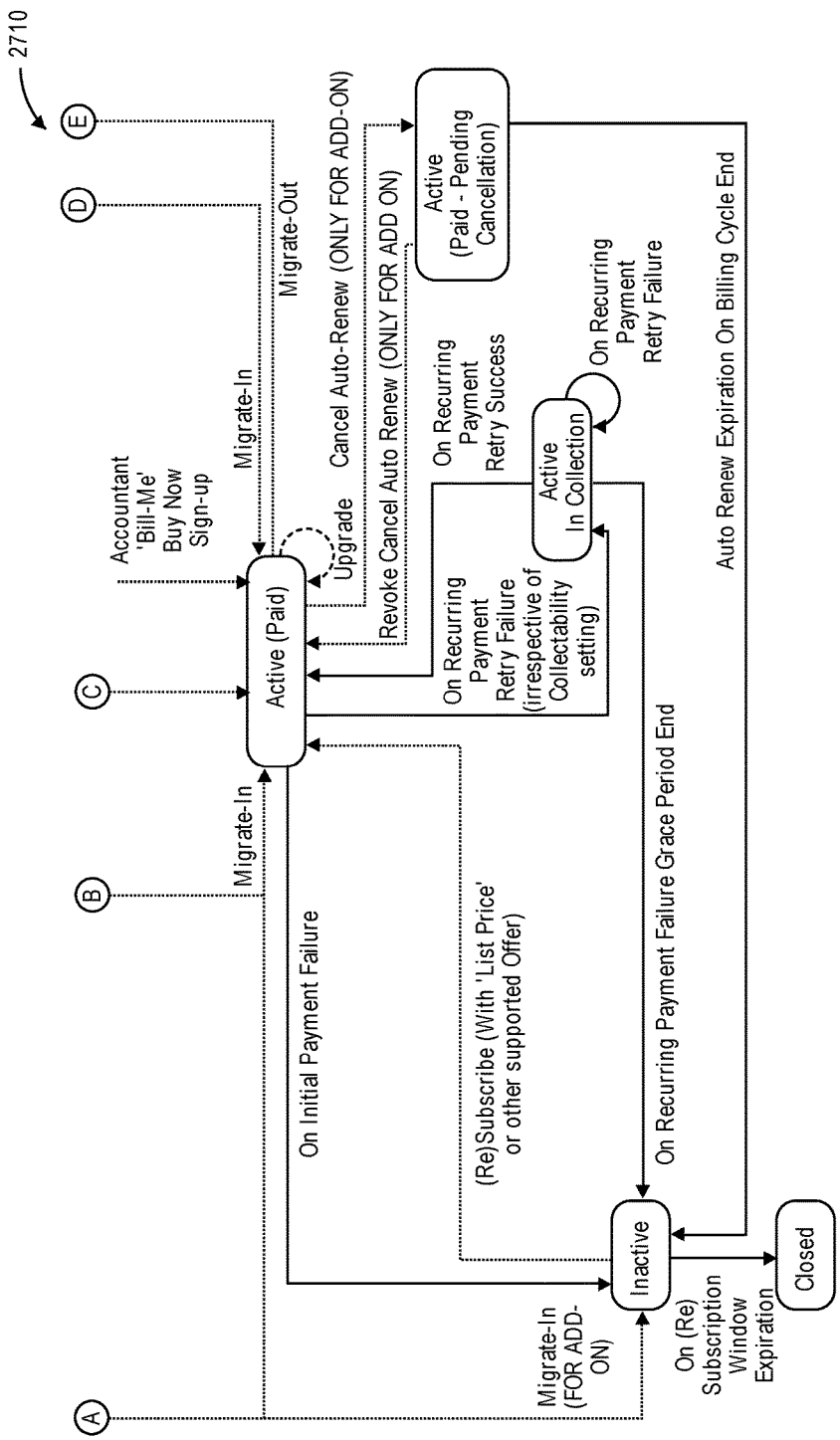

Referring to FIGS. 27A-B, which is FIG. 19 discussed above with supplemental entitlement and service state flows incorporating the accountant paid or wholesale model (FIG. 26) of a runtime composite model constructed according to one embodiment. More specifically, FIG. 19 (and the top portion 2700 or FIG. 27A) are for instances when Direct and Direct-Affiliated apply, and the added/bottom portion 2710 in FIG. 27B show the entitlement-service state and transitions for the wholesale situation in which the accountant is the entitlement owner, the client of the accountant is granted access to the computer software product, the host bills or invoices the accountant, and the accountant invoices or bills the client, and further represents migrating in to the wholesale model 2210*c*, migrating out from the wholesale model 2210*c* and whether such changes are executed in response to a system event, an accountant action or a customer action. As shown in FIG. 26, no trials are allowed in the wholesale model of the runtime composite model 1760, in contrast to direct and direct-affiliated.

Referring to FIG. 28, in one or more embodiments, runtime computing systems may utilize a determined or derived grant status to include in a response to a request by a computer program product 160 to allow the customer access to the computer program product 160. Embodiments utilize a combination of the accountant grant status 1732*a* ("a" referring to "accountant" grant status) based on entitlement-state 1851—service state 1852 as previously described to determine whether a customer's grant status 1732*c* ("c" referring to "customer"), or multiple customers, should be effectively modified while not actually modifying customer grant status. Effective modification may involve modifying the accountant's grant status 1732*a* rather than a client grant status 1732 and using the accountant's grant status 1732 when responding to the access request. Effective modification may involve using pre-determined criteria such as selecting the lowest ranked grant status 1732*l* ("l" referring to lower or lowest ranked grant status) of the accountant's grant status and the client's grant status 1732*c* (or those of multiple clients), which serves as the basis for determining whether an accountant grant status 1732*a* is modified.

In this manner responses reflecting a grant status are generated and provided in response to the computer software product response, while customer grant status 1732*c* modifications or changes are reduced or eliminated while the access control system 1730 still responds to access requests from the computer software product 160, thus reducing computing sources consumed and improving system scalability as more customer grants 1731 and access requests are processed. This may involve tens, hundreds or thousands of customers, grants 1731 and grant statuses 1732 (e.g., for each customer, when "migrate in" and each time "migrate out" or when there is a change to enticement-service state, such as in and out of "active" status) such that, for example, a response may be generated for thousands of customers requesting access to the computer software product by instead modifying a single accountant grant status 1732a instead.

Thus, embodiments provide grant data in response to access requests by determining a logical grant status 1732d ("d" referring to "determined") based on the combination of the accountant grant status 1732a and the customer grant status 1732c, and this logical grant status determination can be used to update a single grant status 1732a of the accountant (rather than potentially thousands of client grant statuses 1732c), which is then utilized as a grant status returned by the access control system 1730 to the requesting computer software product 610. In this manner, a grant status 1732c of a customer is effectively modified using the determined or derived grant status 1732d and reduces the number of grant status modifications that would otherwise be performed.

For example, with reference to FIG. 28, a grant status 1732a of the accountant is based on a first instance of or a first integrated entitlement-service state model 1850 for an accountant entitlement state data 1851 specifying access by an accountant to a subscription of a computer software product 160 of the host and service state data 1852 specifying permissible accountant actions involving the subscription based at least in part upon the entitlement state data 1851. The grant status 1732c of the accountant's customer is based on a second instance of or a second integrated entitlement-service state model 1850 for a customer entitlement and includes entitlement state data 1851 specifying access by a customer to a subscription of a computer software product 160 of the host and service state data 1852 specifying permissible customer actions involving the subscription based at least in part upon the entitlement state data 1851. As shown in FIG. 28, a grant status 1732a of an accountant may be Active, e.g., Active-Paid or Active—In Cancellation which is ranked lower than Active-Paid, Inactive-Paid, or Closed. These states are based on the first or accountant instance of the entitlement-service state model 1850. Similarly, the grant status 1732c of a customer may be "Active-Paid," Active—Pending Cancellation, Inactive-Paid, or Closed based on the second or customer instance of the entitlement-service state model 1850.

As discussed with reference to FIG. 18, different states correspond to different levels of access (e.g., full, read only, no access) and permissible actions, and may thus be ranked based on these or other attributes. For example, Active (e.g., Active Paid) may be ranked higher than Active-In Cancellation, which may be ranked higher than Inactive-Paid, which may be ranked higher than Closed. It will be understood that this is one exemplary ranking and that rankings may involve other states or access parameters.

Thus, when the access control system 1730 receives a request from the computer software product 610 regarding customer access to the computer software product 1730, the grant status 1732a for the accountant and the grant status 1732c for the customer are determined, and the logical grant status is derived or determined based on both grant statuses 1732a, 1732c. The derived or determined grant status 1732d may be the same as or different than at least one of the accountant and customer grant statuses 1732a, 1732c. If they are the same, then the determined grant status can be the same and returned by the access control system 1730 in response to the computer software product's access request.

If the grant statuses are different or have a different ranking, then the determined grant status 1732d is the lower ranked grant status 1732l, and when the accountant's grant status has the higher ranking, the accountant's grant status 1732a may be may be modified to a lower ranking and used for the access control system's response such that the accountant's grant status 1732a (rather than larger numbers of client grant statuses) are modified and used for the response or the lower ranked grant status 1732l is used for the response.

Thus, embodiments provide for a type of grant status modification/reduction without having to modify a larger number of higher ranked customer grant statuses. This may result in returning a lower ranked grant status or modifying an accountant grant status rather than modifying all or a majority of customer grant statuses, which may eliminate the need to execute larger numbers of customer grant status updates For example, if a grant status 1732a of the accountant is inactive and the grant status 1732c of the customer is active such that the accountant's grant status 1732a is ranked lower than the client's grant status 1732c, the access control system 1730 generates the response to the request to include the determined grant status 1732d of inactive, thus effectively modifying the higher ranked "active" grant status of the customer 1732c without actually modifying or reducing the client's "active" grant status 1732c to inactive.

As another example, the accountant's grant status 1732a may be active, whereas the customer's grant status 1732c is inactive. In this case, the access control system 1730 can modify the accountant's grant status 1732 from active to inactive, and respond to the computer software product's request with "inactive" and without modifying or reducing any client grant status 1732c.

Thus, in embodiments in which a e client grant status 1732c being ranked higher than the accountant grant status 1732a such that the accountant grant status 1732a is the "lower ranked' grant status 1732l, which is provided in the access control system's response to the offering applications' request, thus resulting in effective modification to a higher ranked client grant status 1732c without having to make any actual modification to a higher ranked client grant status 1732c.

As another example, if a grant status 1732c of the client is inactive and the grant status 1732a of the accountant is active, the access control system 1730 generates the response to the request to include the determined grant status 1732d of inactive. As a further example, the grant status 1732 of the accountant may be closed and a grant status 1732c the customer may be active. In this case, the access control system 1730 generates a response to the request to include the determined grant status of closed without modifying or reducing the client's grant status 1732c from inactive to closed. Thus, embodiments involve including a lower ranked grant status 1732l or modifying an accountant's grant status 1732a to a lower ranked status for the access control system's 1730 response to the offering application's' access request.

Figure 29:
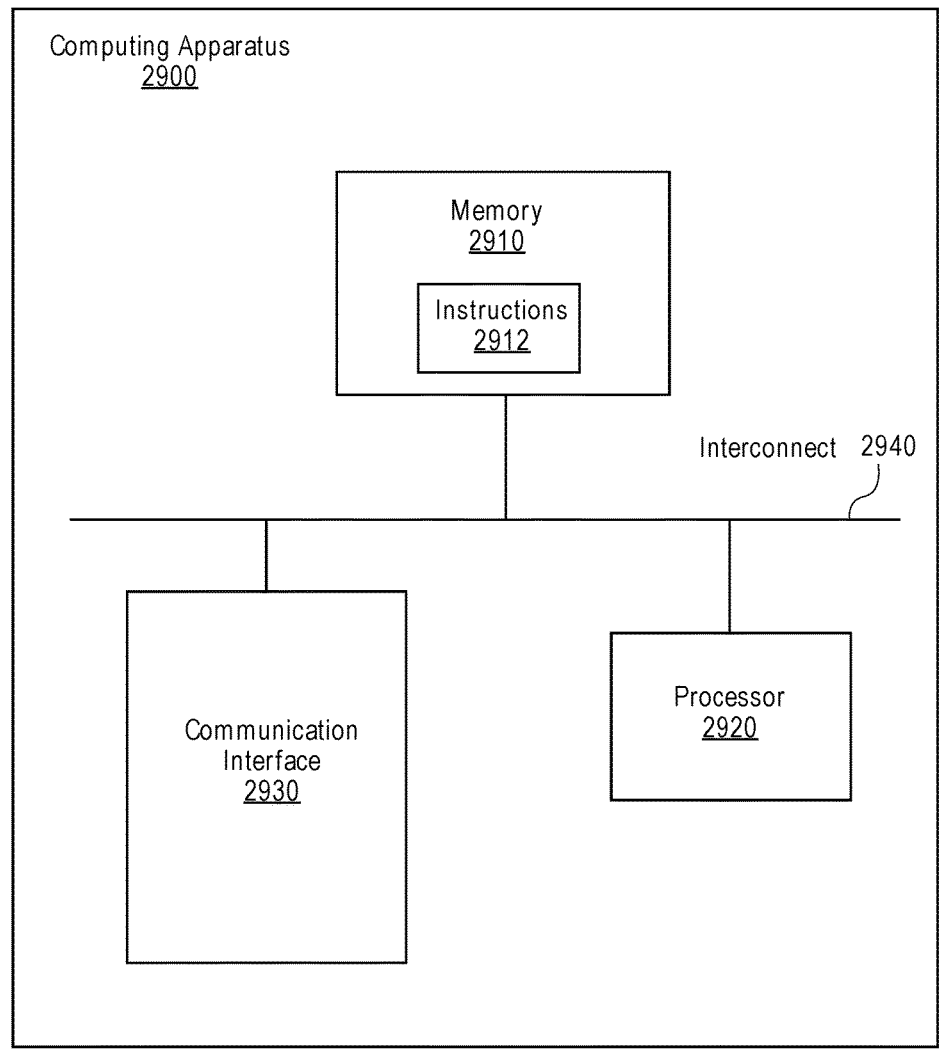
FIG. 29 is a block diagram of components of a computer system that may be programmed or configured to execute embodiments.

FIG. 29 generally illustrates certain components of a computing device 2700 that may be utilized or that that system components include for execution of various computer instructions according to embodiments, e.g., as part of the ICS system 310a or as a spoke computing system 150. For example, the computing device may include a memory 2910, program instructions 2912, a processor or controller 2920 to execute instructions 2912, a network or communications interface 2930, e.g., for communications with a network or interconnect 2940 between such components.

The memory 2910 may be or include one or more of cache, RAM, ROM, SRAM, DRAM, RDRAM, EEPROM and other types of volatile or non-volatile memory capable of storing data. The processor unit 2920 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2940 may include a system bus, LDT, PCI, ISA, or other types of buses, and the communications or network interface may, for example, be an Ethernet interface, a Frame Relay interface, or other interface. The network interface 2930 may be configured to enable a system component to communicate with other system components across a network which may be a wireless or various other networks. It should be noted that one or more components of computing device 2900 may be located remotely and accessed via a network. Accordingly, the system configuration provided in FIG. 29 is provided to generally illustrate how embodiments may be configured and implemented, and it will be understood that embodiments may also involve communications through one or more networks between a user computer and a computer hosting system embodiments of on-line or cloud based tax return preparation applications.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2920 performs steps or executes program instructions 2912 within memory 2910 and/or embodied on the carrier to implement method embodiments.

Although particular embodiments have been shown and described with reference to FIGS. 1-29, it should be understood that the above discussion is not intended to limit the scope of these embodiments and that embodiments may be utilized in various other ways.

For example, it will be understood that while certain components of the entitlement-monetization model have been described as being reusable for other purposes, examples of model elements that may be re-used include: Product elements, records, tables or objects (e.g. QBO, Payroll), Feature Set elements, records, tables or objects 504 (QBO Essentials), Feature elements, records, tables or objects 506, including entitlement limits if applicable (QBO Essentials Feature Set), Charge elements, records, tables or objects 508 (QBO Essentials ROW USD Monthly recurring), Discount elements, records, tables or objects 512 (30 Percent Discount, Monthly Recurring), Package Component elements, records, tables or objects 516 (Composed of Charge, Feature Set, Discount) and Package elements, records, tables or objects 514 (QBO Essentials ROW USD Monthly Buy Now—30 Percent Off For 12 Months).

Further, while certain embodiments have been described with reference to design time software product configuration reflected in a generated offer, embodiments may be utilized to add a new Product 502 (which may involve cloning an existing product are starting with a new previously unreleased product), adding or editing values for the Product 502, prompting a user (administrator) to add lower level objects to complete the configuration like Entitlements, Entitlement Attributes, Charge Offers, etc., create a new Discount 512, which may involve defining a generic discount promotion container (which is tied to a Product 502—e.g. QBO), creating a new Package 514, which may involve selecting a Product 502 that has already been defined (e.g., QBO), Feature Set 504/Entitlement Definition (Essentials), Charge 508 (QBO Essentials ROW USD Monthly Recurring), Discount 512 (30% Off, Monthly Recurring) to define new Package 514, or creating a new Offer 518, which may involve presenting a list of Packages 514 to select, followed by data entry of offer level attributes like name, description, effective dates, adding to Transitions 512 to indicate what other offers to which a new offer can transition.

As another example, depending on system configurations, mapping and/or enrichment for publication to spoke computing systems may be may not be necessary depending on how the system is configured and how interfaces to billing and revenue recognition systems are implemented.

Moreover, spoke computing systems may be in network communication with the computing system or database hosing the entitlement-monetization model while at least one spoke computing system is in communication with a customer computer through a network, or spoke computing systems may be managed by the same host or host computer and in communication with a customer computer through a network.

Further, while embodiments involving a runtime integrated or hybrid entitlement-service state model have been described, it will be understood that the integrated data model including entitlement and monetization definitions and the integrated state model including entitlement state and serviced state data can execute independently of each other such that different embodiments of a design time integrated data model ca be used with a runtime integrated state model, and different embodiments or versions of a runtime integrated state model can be used with a design time integrated data model. Moreover, this flexibility also results in reusability of model elements or portions thereof within a data model, as well as sharing of model element data between design time and runtime data models.

Thus, while embodiments and variations of the many aspects of the invention have been disclosed and described herein, such disclosure is provided for purposes of explanation and illustration only. Thus, various changes and modifications may be made without departing from the scope of the claims.

Further, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computing system, comprising:
one or more processors;
a memory storing program instructions executable by the one or more processors;
a computer database comprising a runtime composite model;
a communications interface coupled to each of the memory, the one or more processors, and the computer database; and
an access control system in communication with the computer database through the communications interface; and
wherein the runtime composite model includes:
a first instance of an integrated entitlement-service state model including first state data specifying access by an accountant to a subscription of a computer software product and second state data specifying permissible accountant actions involving the subscription based at least in part upon the first state data, and
a second instance of the integrated entitlement-service state model including first state data specifying access by a customer of the accountant to the subscription of the computer software product and second state data specifying permissible customer actions involving the subscription based at least in part upon the first state data of the second instance; and
wherein the access control system is configured to:
generate, by the one or more processors, a first grant for the accountant based on the first instance of the entitlement-service state model, the first grant comprising a first grant status,
generate, by the one or more processors, a second grant for the customer based on the second instance of the entitlement-service state model, the second grant comprising a second grant status,
receive, through the communications interface, a request from the computer software product by the customer to access the computer software product,
determine, by the one or more processors, a grant status based at least in part upon the first grant status and the second grant status, and
transmit, through the communications interface, the determined grant status to the computer software product in response to the request, wherein the customer is allowed to access the computer software product through the communications interface based at least in part upon the determined grant status.

2. The computing system of claim 1, wherein elements of the runtime composite model are distributed across the computer database and the access control system, wherein an element of the runtime composite model of the access control system specifies the first grant for the accountant and the second grant for the customer.

3. The computing system of claim 1, further comprising a computerized billing system.

4. The computing system of claim 3, wherein elements of the runtime composite runtime model are distributed across the computer database, the access control system and the computerized billing system.

5. The computing system of claim 4, wherein an element of the runtime composite model for the computerized billing system identifies the accountant as responsible to the host for the customer's access.

6. The computing system of claim 1, the runtime composite model comprising:
a first model that is selected or activated by the one or more processors when the customer is specified as an entitled owner of the subscription to the computer software product and the customer is responsible to the host for access to the computer software product,
a second model that is selected or activated by the one or more processors when the customer is specified as the entitled owner of the subscription to the computer software product, the customer is responsible to the host for access to the computer software product, and the customer has affiliated with an accountant, and
a third model that is selected or activated by the one or more processors when the accountant is specified as the entitled owner of the subscription to the computer software product, and the accountant is responsible to the host for the customer's access to the computer software product.

7. The computing system of claim 6, wherein the runtime composite model is structured for:
a first migration or transition from the second model to the third model in response to a pre-determined action by the accountant, and
a second migration or transition from the third model to the second model in response to a pre-determined action by the accountant,
wherein the access control system is configured to modify, by the one or more processors, at least one of the first grant and the second grant based at least in part upon an update to the computer database reflecting the first migration or the second migration or transition.

8. The computing system of claim 7, wherein the one or more processors perform a structuring of the runtime composite model to preclude migration or transition from the third model to the first model and to preclude migration or transition from the first model to the third model.

9. The computing system of claim 7, wherein the one or more processors perform a structuring of the runtime composite model to allow a migration or transition from the first model to the second model in response to a pre-determined action by the accountant or a pre-determined action by the customer, wherein the access control system is configured to modify, by the one or more processors, at least one of the first grant and the second grant based at least in part upon an update to the database reflecting the migration or transition.

10. The computing system of claim 1, wherein the access control system is configured to receive the request generated by the computerized financial management system in response to the customer opening or attempting to log into the computer software product through a customer-facing user interface of the computing system.

11. The computing system of claim 10, wherein neither the database nor the access control system are accessible by the client through a client facing application.

12. The computing system of claim 1, wherein the access control system is configured to determine the grant status by being configured to
perform, by the one or more processors, a comparison of the first grant status and the second grant status;
and when an accountant grant status and a client grant status differ,
select, by the one or more processors, one of the first grant status and the second grant status as the determined grant status based on pre-determined criteria,
else when the first grant status and the second grant status are the same, select, by the one or more processors, either of the first grant status and the second grant status as the determined grant status.

13. The computing system of claim 12, wherein the pre-determined criteria is which of the first grant status and the second grant status is a lower ranking grant status such that the access control system is configured to select, by the one or more processors, the lower ranking grant status of one of the first grant status and the second grant status as the determined grant status.

14. The computing system of claim 13, wherein the first grant status of the accountant is the lower ranking grant status, and the access control system is configured to return, by the one or more processors, the determined grant status comprising the first grant status to the computer software product in response to the request such that the access control system is configured to modify, by the one or more processors, the second grant status of the second grant of the customer.

15. The computing system of claim 13, wherein the second grant status of the customer is the lower ranking grant status, wherein the access control system is configured to return, by the one or more processors, the determined grant status comprising the second grant status to the computer software product in response to the request to modify, by the one or more processors, the first grant status of the first grant of the accountant.

16. The computing system of claim 12, wherein multiple customers of the accountant are subscribed to the computer software product, and the access control system is configured to:
   generate, by the one or more processors, respective grants for respective customers, respective grants including respective grant statuses,
   determine, by the one or more processors, the grant status applicable to a plurality of grants of respective customers by being configured to:
      perform respective first grant status customer grant status comparisons;
      and for each comparison involving the first grant status of the accountant being a lower ranking grant status compared to a customer grant status,
         select, by the one or more processors, the first grant status as the determined grant status that is returned to the computer software product in response to respective requests to modify respective grant statuses of respective customers,
      and for each comparison involving the first grant status of the accountant being a higher ranking grant status compared to a customer grant status, select, by the one or more processors, respective customer grant statuses as respective determined grant statuses that are returned to the computer software product in response to respective requests.

17. The computing system of claim 16, wherein the access control system is configured to effectively modify, by the one or more processors, all customer grant statuses to the lower grant status of the first grant status.

18. The computing system of claim 16, wherein the access control system is configured to modify, by the one or more processors, a majority of customer grant statuses to the lower grant status of the first grant status.

19. The computing system of claim 12, wherein the first grant status of the accountant is inactive and the second grant status of the customer is active, and the access control system is configured to generate, by the one or more processors, the response to the request to include the determined grant status as being inactive without modifying the client's grant status to inactive.

20. The computing system of claim 12, wherein the first grant status of the accountant is closed and the second grant status of the customer is active, the access control system being configured to generate, by the one or more processors, a response to the request to include the determined grant status of closed without modifying the client's grant status to closed.

21. The computing system of claim 12, wherein the second grant status of the customer is inactive and the first grant status of the accountant customer is active, the access control system being configured to generate, by the one or more processors, the response to the request to include the determined grant status of inactive.

22. The computing system of claim 1, wherein when an accountant grant status and a client grant status differ, the access control system is configured to:
   modify, by the one or more processors, the grant status of the accountant, wherein the determined grant status is based on the accountant's modified grant status, wherein the one or more processors modify the customer's grant status by modifying the accountant's grant status.

23. The computing system of claim 1, wherein an element of the runtime composite model for the second grant specifies that the customer can access the computer software product and the accountant is responsible to the host for the customer's access.

* * * * *